(12) United States Patent
Okada et al.

(10) Patent No.: US 7,841,609 B2
(45) Date of Patent: Nov. 30, 2010

(54) STEP DEVICE FOR VEHICLE

(75) Inventors: Hiroki Okada, Okazaki (JP); Ryoichi Fukumoto, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 12/676,202

(22) PCT Filed: Nov. 13, 2008

(86) PCT No.: PCT/JP2008/070651

§ 371 (c)(1),
(2), (4) Date: Mar. 3, 2010

(87) PCT Pub. No.: WO2009/066601

PCT Pub. Date: May 28, 2009

(65) Prior Publication Data

US 2010/0164197 A1    Jul. 1, 2010

(30) Foreign Application Priority Data

Nov. 22, 2007  (JP) .............................. 2007-303195
Nov. 22, 2007  (JP) .............................. 2007-303196

(51) Int. Cl.
*B60R 3/00* (2006.01)
(52) U.S. Cl. ...................................... 280/166; 280/163
(58) Field of Classification Search ................. 280/163, 280/166
See application file for complete search history.

(56) References Cited

U.S. PATENT DOCUMENTS 5,090,715 A * 2/1992 Nakajima et al. ........... 280/166

6,406,045 B1 * 6/2002 Farkash ................... 280/164.1

(Continued)

FOREIGN PATENT DOCUMENTS

JP          57-134979 U      8/1982

(Continued)

OTHER PUBLICATIONS

International Search Report (PCT/ISA/210) issued on Feb. 4, 2009 by the Japanese Patent Office in its capacity as the International Searching Authority in International Application No. PCT/JP2008/070651.

(Continued)

*Primary Examiner*—J. Allen Shriver, II
*Assistant Examiner*—Katy Meyer
(74) *Attorney, Agent, or Firm*—Buchanan Ingersoll & Rooney PC

(57) ABSTRACT

The present invention provides a vehicle step device, capable of enhancing operability of a step having an elevating function to enhance ingress/egress ease into and from the vehicle. The step device includes an opening/closing mechanism that operates in synchronization with opening and closing operations of a slide door, and a step moving mechanism that transmits power of the opening and closing operations of the slide door through the opening/closing mechanism to a movable step, thereby moving the movable step. The step moving mechanism includes a slide lever for moving the movable rails forward and backward, X arms each having first and second arms and provided between each movable rail and the movable step, and a vertically moving lever that moves the first end of the first arm with respect to the movable rails to vertically move the movable step.

7 Claims, 50 Drawing Sheets

U.S. PATENT DOCUMENTS

| | | | |
|---|---|---|---|
| 6,612,596 B2 * | 9/2003 | Jeon et al. | 280/166 |
| 6,659,485 B2 * | 12/2003 | Ueno | 280/166 |
| 6,830,257 B2 * | 12/2004 | Leitner | 280/166 |
| 7,111,859 B2 * | 9/2006 | Kim | 280/166 |
| 7,318,596 B2 * | 1/2008 | Scheuring et al. | 280/166 |
| 7,377,531 B2 * | 5/2008 | Fabiano et al. | 280/163 |
| 7,469,916 B2 * | 12/2008 | Watson | 280/166 |
| 2003/0042700 A1 | 3/2003 | Ueno | |
| 2008/0224438 A1 | 9/2008 | Okada et al. | |
| 2008/0238019 A1 | 10/2008 | Okada et al. | |
| 2008/0238020 A1 | 10/2008 | Okada et al. | |
| 2009/0309325 A1 | 12/2009 | Okada et al. | |

FOREIGN PATENT DOCUMENTS

| | | |
|---|---|---|
| JP | 58-104750 U | 7/1983 |
| JP | 60-58555 U | 4/1985 |
| JP | 60-058556 U | 4/1985 |
| JP | 62-099456 U | 6/1987 |
| JP | 62-125641 U | 8/1987 |
| JP | 62-125642 U | 8/1987 |
| JP | 62-150243 U | 9/1987 |
| JP | 63-149244 A | 6/1988 |
| JP | 3-033744 U | 4/1991 |
| JP | 4-003870 Y2 | 2/1992 |
| JP | 8-230526 A | 9/1996 |
| JP | 9-188197 A | 7/1997 |
| JP | 11-011218 A | 1/1999 |
| JP | 2003-72466 A | 3/2003 |
| JP | 2003-127776 A | 5/2003 |
| JP | 2004-114957 A | 4/2004 |
| JP | 2004-124446 A | 4/2004 |
| JP | 2004-175339 A | 6/2004 |
| JP | 2004-216060 A | 8/2004 |
| JP | 2007-22143 A | 2/2007 |
| JP | 2007-022144 A | 2/2007 |
| WO | WO 2008/133266 A1 | 11/2008 |

OTHER PUBLICATIONS

English translation of International Preliminary Report on Patentability (Form PCT/IB/373) and Written Opinion (Form PCT/ISA/237) issued Jun. 8, 2010 in corresponding PCT/JP2008/070651.

English translation of International Preliminary Report on Patentability (Form PCT/IB/373) and Written Opinion (Form PCT/ISA/237) issued on May 26, 2009 in PCT/JP2007/071517.

* cited by examiner

ACCOMMODATED STATE

SLIDE PROJECTING STATE

LOWERED STATE

Fig. 27  ELEVATED AND ACCOMMODATED STATE

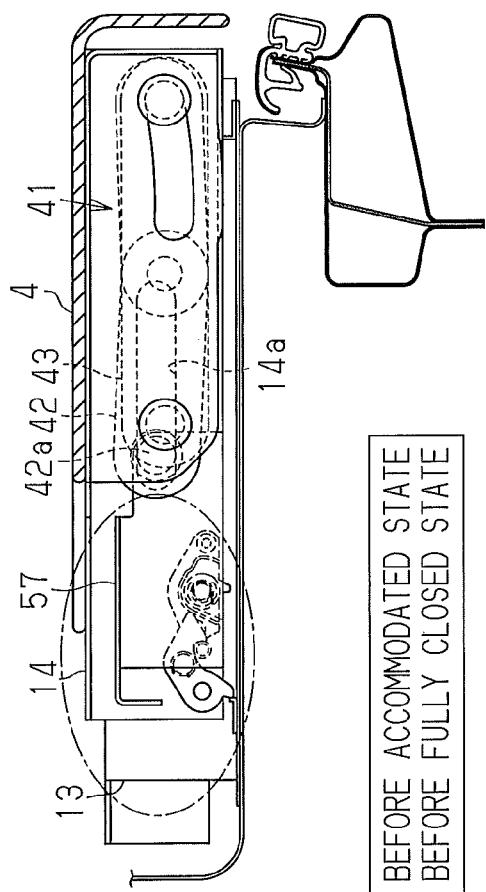
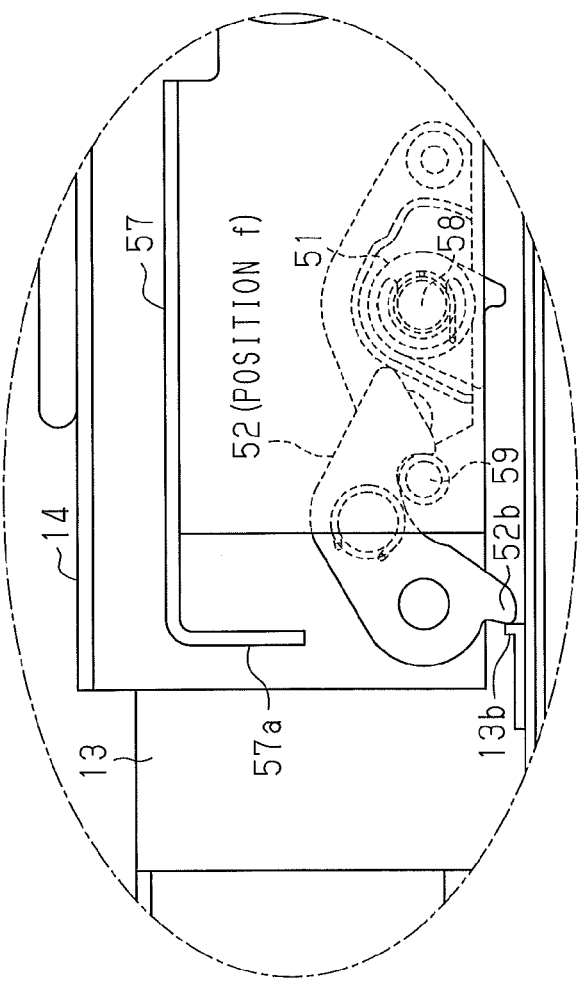
Fig.28
IMMEDIATELY BEFORE ACCOMMODATED STATE
IMMEDIATELY BEFORE FULLY CLOSED STATE

LOWERING-STARTING STATE

LOWERED STATE

SLIDE PROJECTING STATE 1, 2

Fig.44 UPWARD MOVEMENT-COMPLETED AND SLIDE CONNECTION STATE

SLIDE PROJECTING STATE 2

STATE WHERE THE CONNECTION WITH
THE MOVABLE RAIL IS CANCELLED FOR LOWERING

LOWERED STATE

ACCOMMODATED STATE

SLIDE PROJECTING STATE

LOWERED STATE

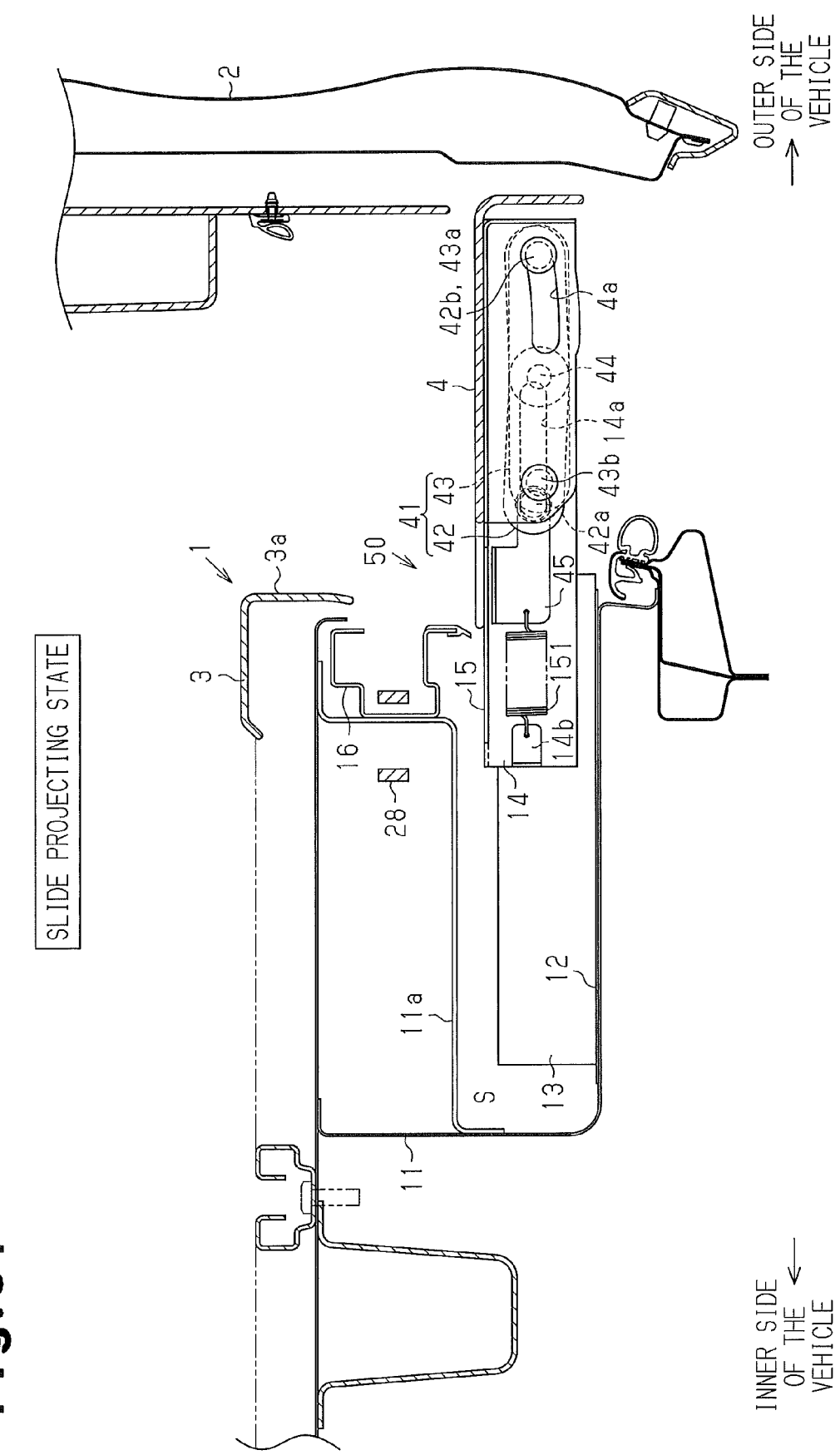

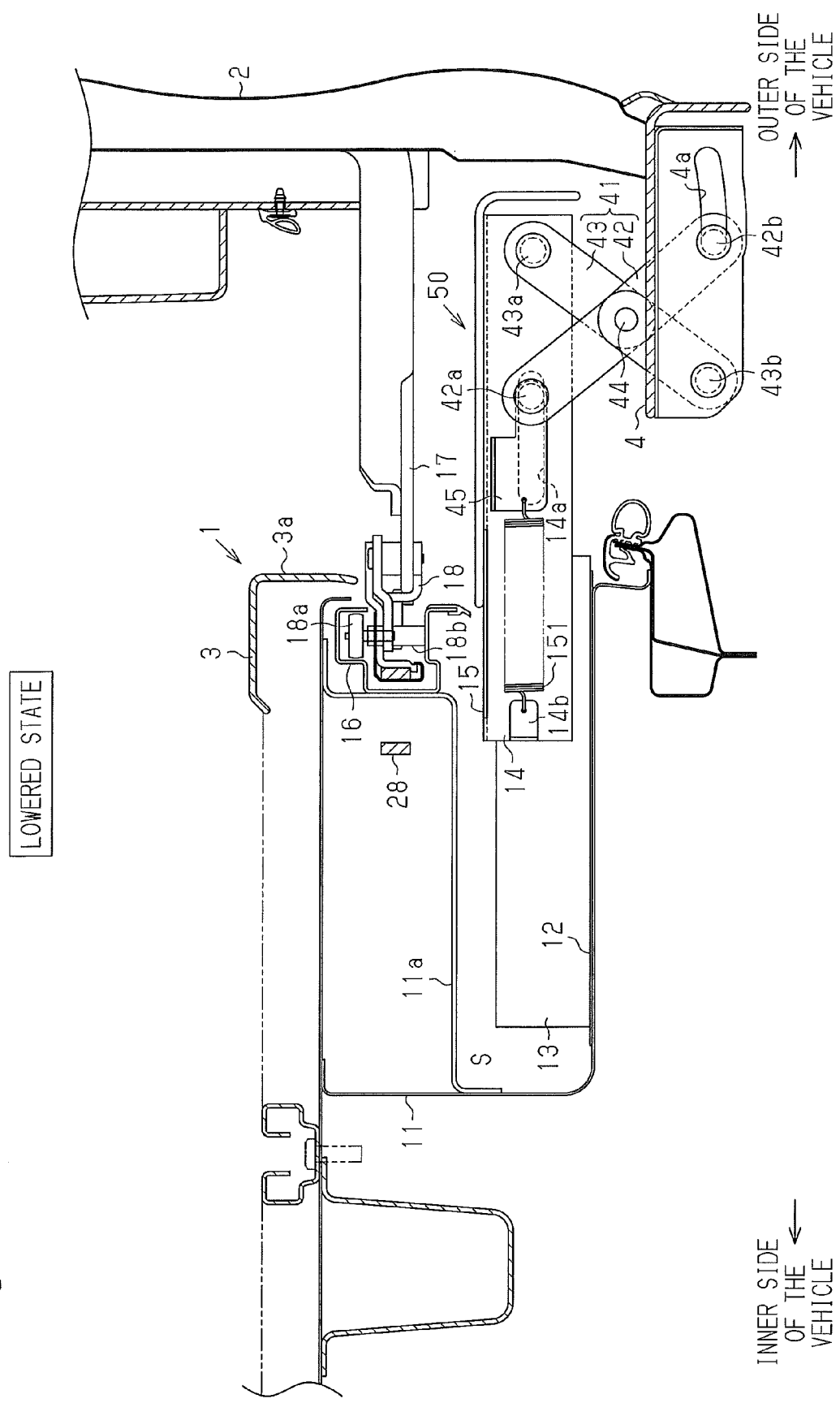

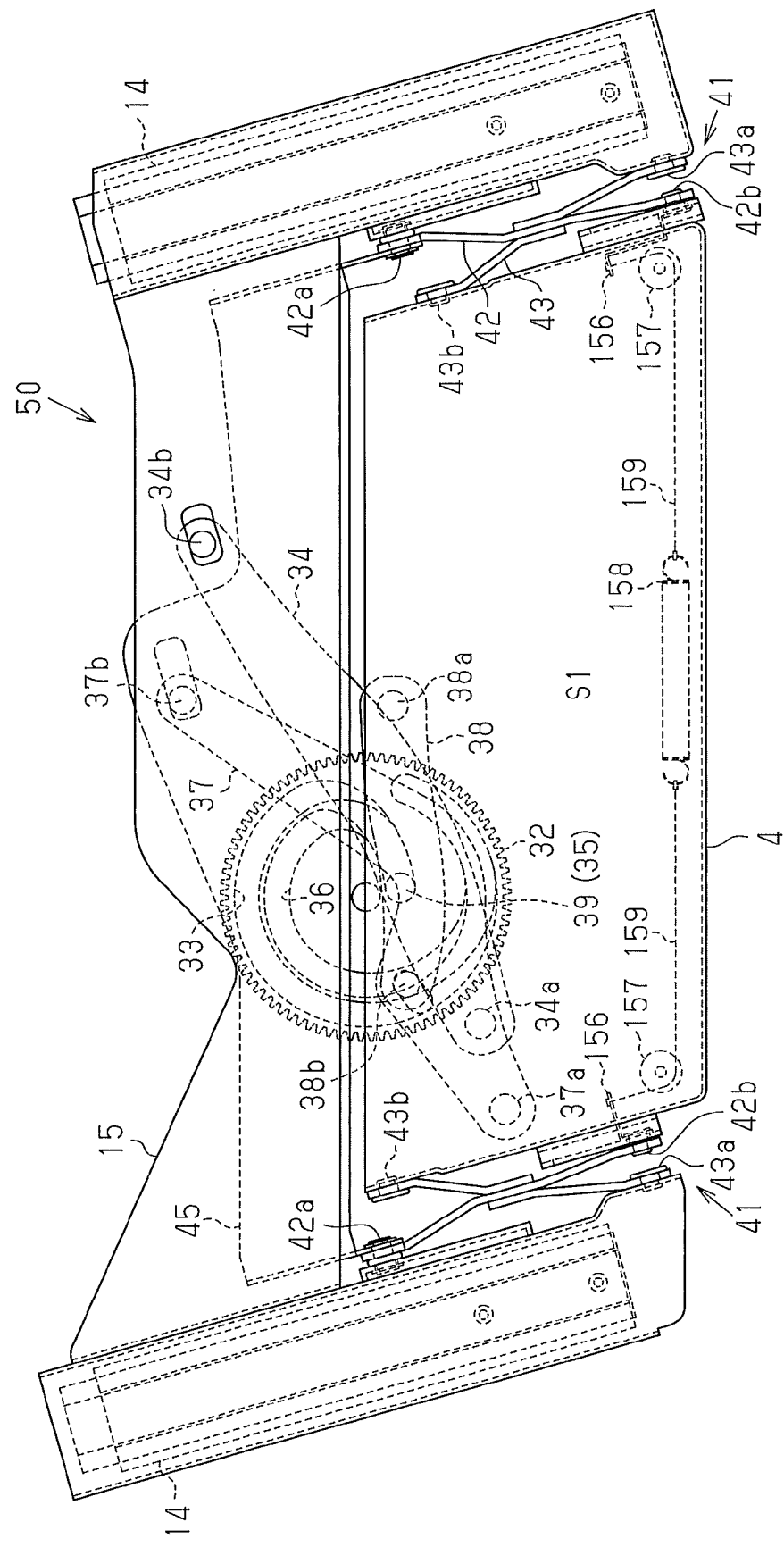

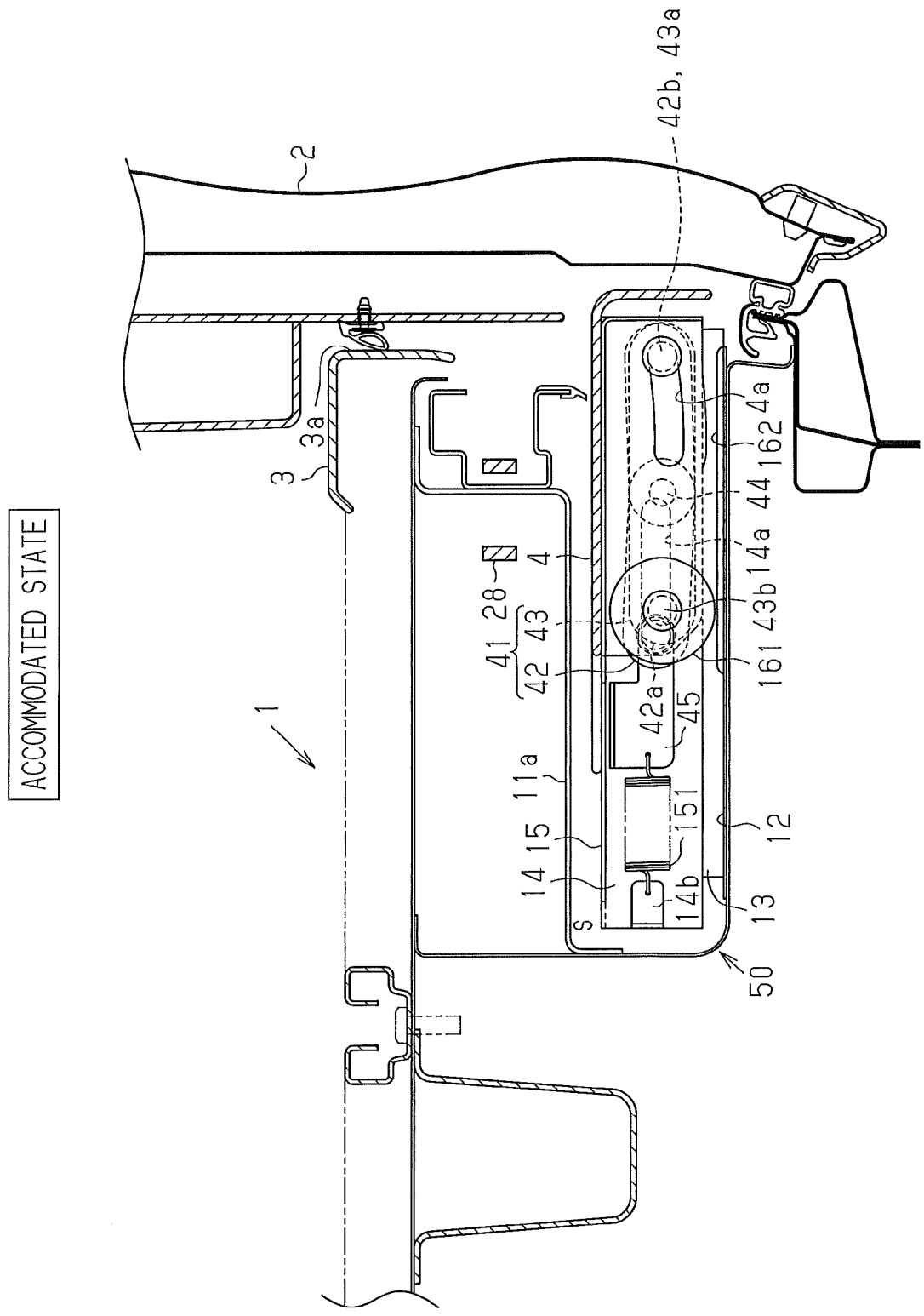

STEP DEVICE FOR VEHICLE

FIELD OF THE INVENTION

The present invention relates to a step device for a vehicle.

BACKGROUND OF THE INVENTION

Generally, in a vehicle such as a minivan, the height of the floor of the vehicle from the ground is set relatively high. Therefore, an entrance of the vehicle is provided with a step having a lower height than the floor of the vehicle. Patent Document 1 describes a vehicle step device that includes a movable step having not only a slide function but also an elevating function for further enhancing ingress/egress ease into or from the vehicle. When the entrance is opened by a vehicle door, the movable step is moved to a position closer to the ground, thereby reducing a vertical difference between the movable step and the ground, i.e., thereby reducing the height of the first step of a passenger who steps on the movable step from the ground at the time of getting on the vehicle, and the height of the last step of a passenger who steps on the ground from the movable step at the time of getting off the vehicle.

However, although the vehicle step device described in Patent Document 1 includes the movable step for making it possible for aged people or people with lower limb disabilities to easily get on or off the vehicle, it is necessary to manually deploy the movable step. Therefore, for example, when there is no helper, a person who gets on or off the vehicle must operate the step in a state where the person bends his or her knees at the time of getting on the vehicle or the person extends his or her hand to the step located lower than a floor surface of the vehicle at the time of getting off the vehicle. That is, an action that is more difficult than ingress/egress motion is required.

Patent Document 1: Japanese Laid-Open Patent Publication No. 2003-72466

DISCLOSURE OF THE INVENTION

It is an objective of the present invention to provide a step device for a vehicle, capable of enhancing operability of a step having an elevating function for enhancing ingress/egress ease into and from the vehicle.

To achieve the foregoing objective and in accordance with one aspect of the present invention, a step device for a vehicle is provided, which device includes a step provided on a vehicle entrance that is opened and closed by a vehicle door, a first transmitting mechanism that is operated in synchronization with opening and closing operations of the vehicle door, and a second transmitting mechanism that transmits, to the step, power of the opening and closing operations of the vehicle door transmitted through the first transmitting mechanism, thereby moving the step. The second transmitting mechanism includes a movable member, a slide lever, an arm mechanism, and a vertically moving lever. The movable member can move forward and backward with respect to a vehicle body. The slide lever moves the movable member forward and backward. The arm mechanism has first and second arms that are provided between the movable member and the step and turnably connected to each other at their central portions in their longitudinal directions. The first and second arms each include a first end connected to the movable member and a second end connected to the step. The vertically moving lever moves the first end of the first arm with respect to the movable member, thereby vertically moving the step.

BRIEF DESCRIPTION OF THE DRAWINGS

FIG. 28 is a cross-sectional view showing action of the vehicle step device shown in FIG. 17 and its enlarged view;

FIG. 54 is a cross-sectional view of the vehicle step device according to the fifth embodiment of the present invention, taken along line 6-6 in FIG. 2;

FIG. 55 is a cross-sectional view of the vehicle step device according to the fifth embodiment of the present invention, taken along line 7-7 in FIG. 3;

FIG. 56 is a plan view of a step moving mechanism in a vehicle step device according to a sixth embodiment of the present invention; and FIG. 57 is a cross-sectional view of a vehicle step device according to a modification of the present invention, taken along line 5-5 in FIG. 1.

DETAILED DESCRIPTION OF THE PREFERRED EMBODIMENTS

First Embodiment

A first embodiment according to the present invention will be described below in accordance with the drawings.

Figure 17:
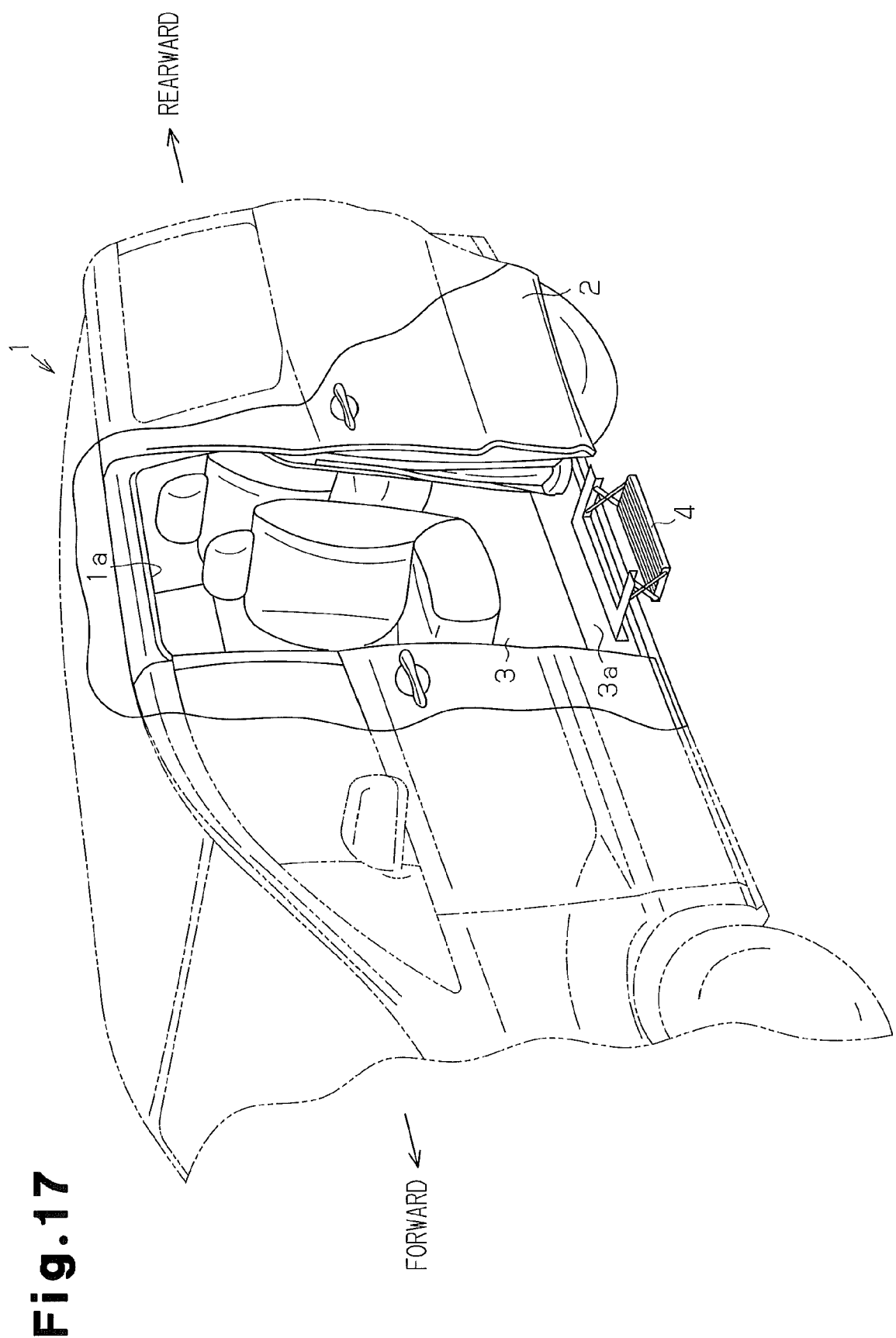
FIG. 17 is a schematic diagram showing a vehicle to which the present invention is applied.

FIG. 17 is a schematic diagram showing a vehicle such as an automobile to which the invention is applied. As shown in FIG. 17, a door opening 1*a* as an entrance is formed in a side of a vehicle body 1, which forms a main body of the vehicle. The door opening 1*a* is opened and closed by a slide door 2 as a vehicle door which moves in the front-rear direction of the vehicle. The vehicle floor 3 has a difference in level 3*a* at a location facing the door opening 1*a*. The vehicle floor 3 is provided at its lower side with a movable step 4 as a step that can vertically move between an ascent position near a lower end of the door opening 1*a* and a descent position that is lower than the ascent position and is moved forward and backward (projects and retracts) in a widthwise direction of the vehicle from the difference in level 3*a*.

Figure 1:
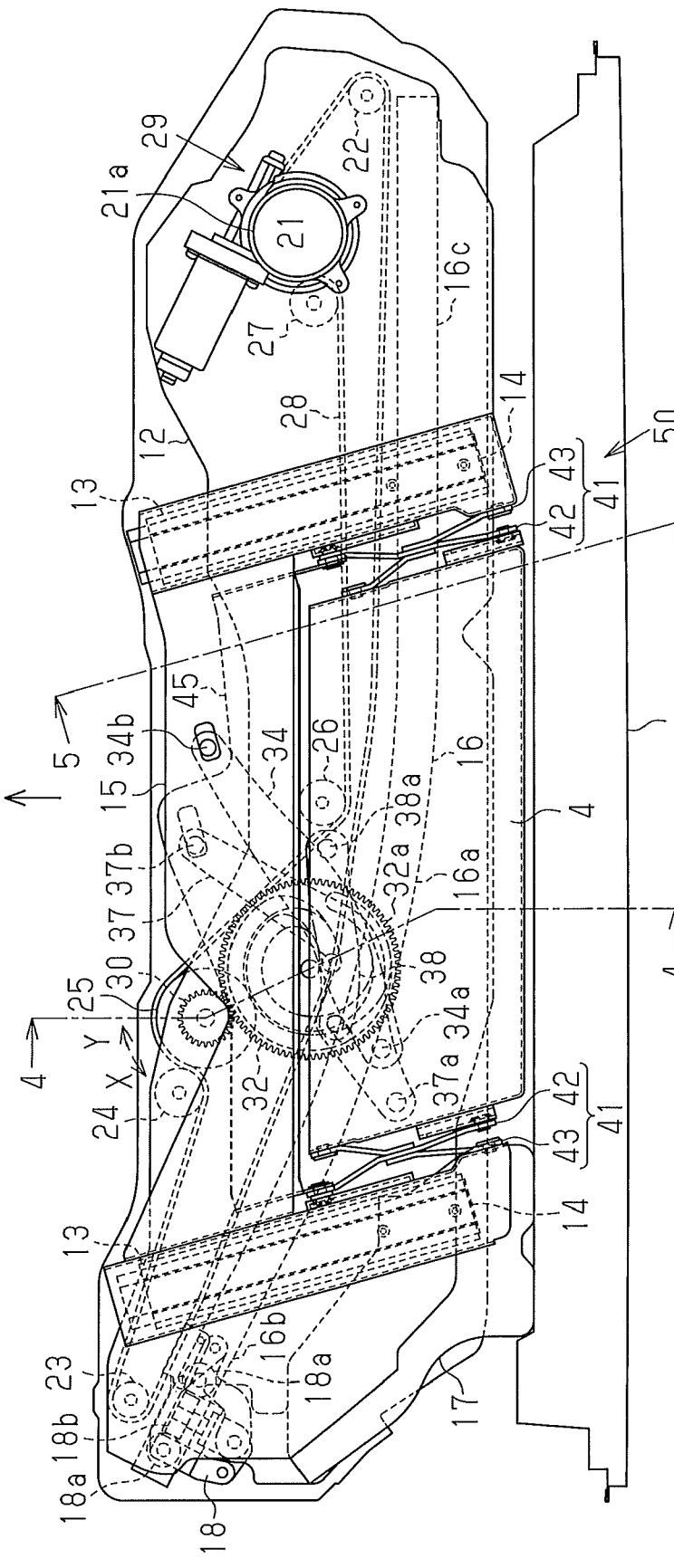
FIG. 1 is a plan view of a vehicle step device according to a first embodiment of the present invention in a state where a movable step is retracted.
Figure 2:
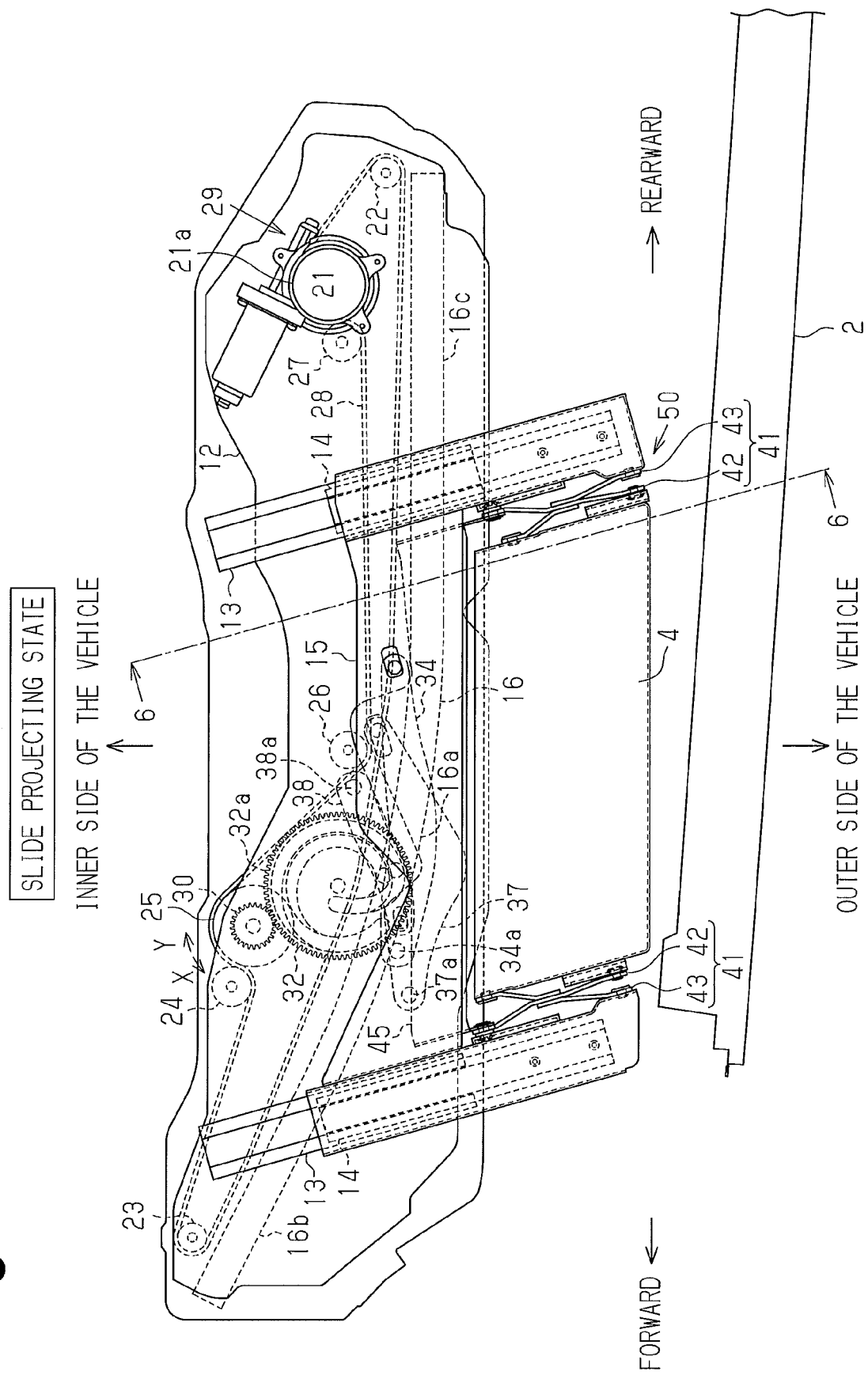
FIG. 2 is a plan view of the vehicle step device shown in FIG. 1 in a state where the movable step is projected.
Figure 3:
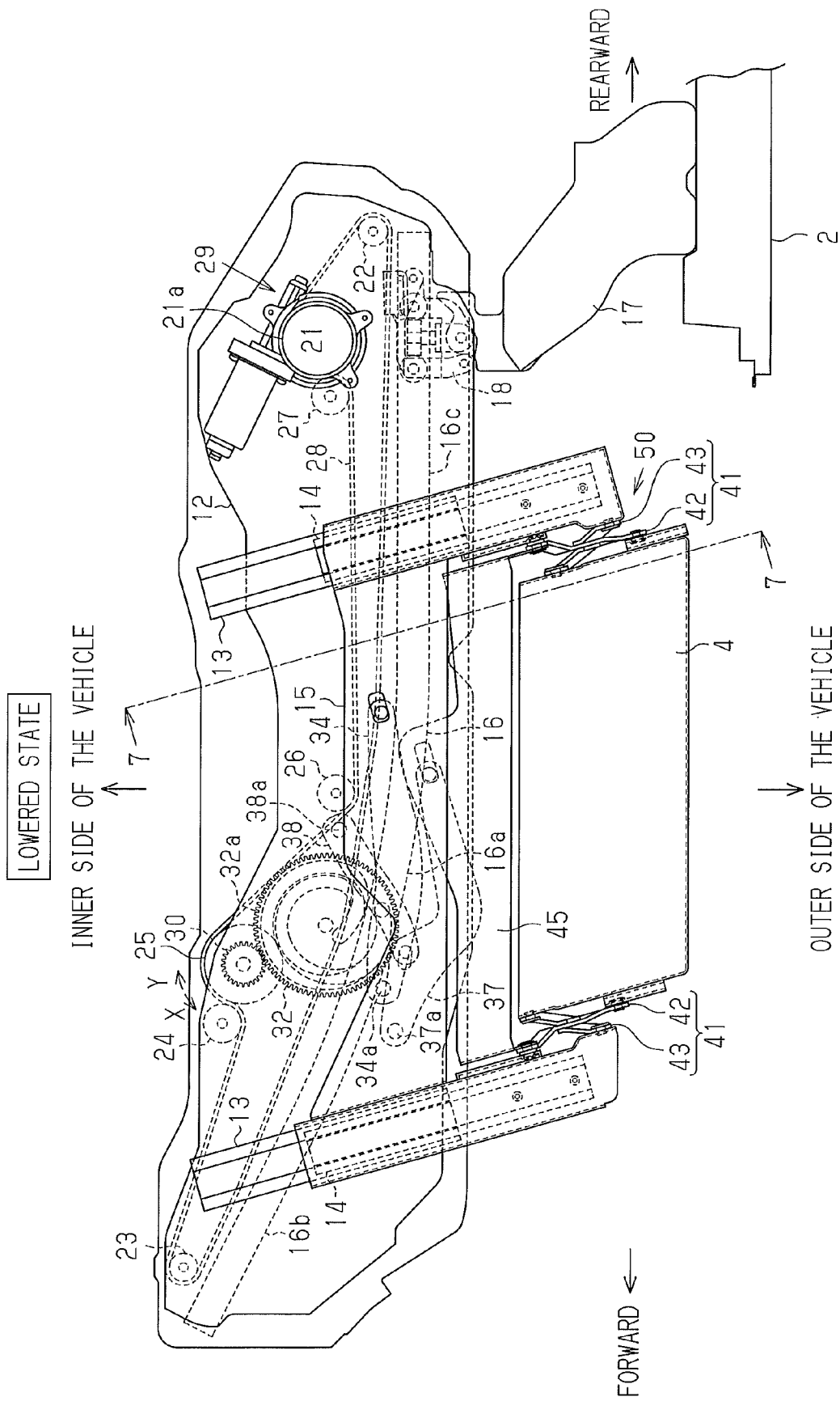
FIG. 3 is a plan view showing the vehicle step device shown in FIG. 1 in a state where the movable step is lowered.
Figure 4:
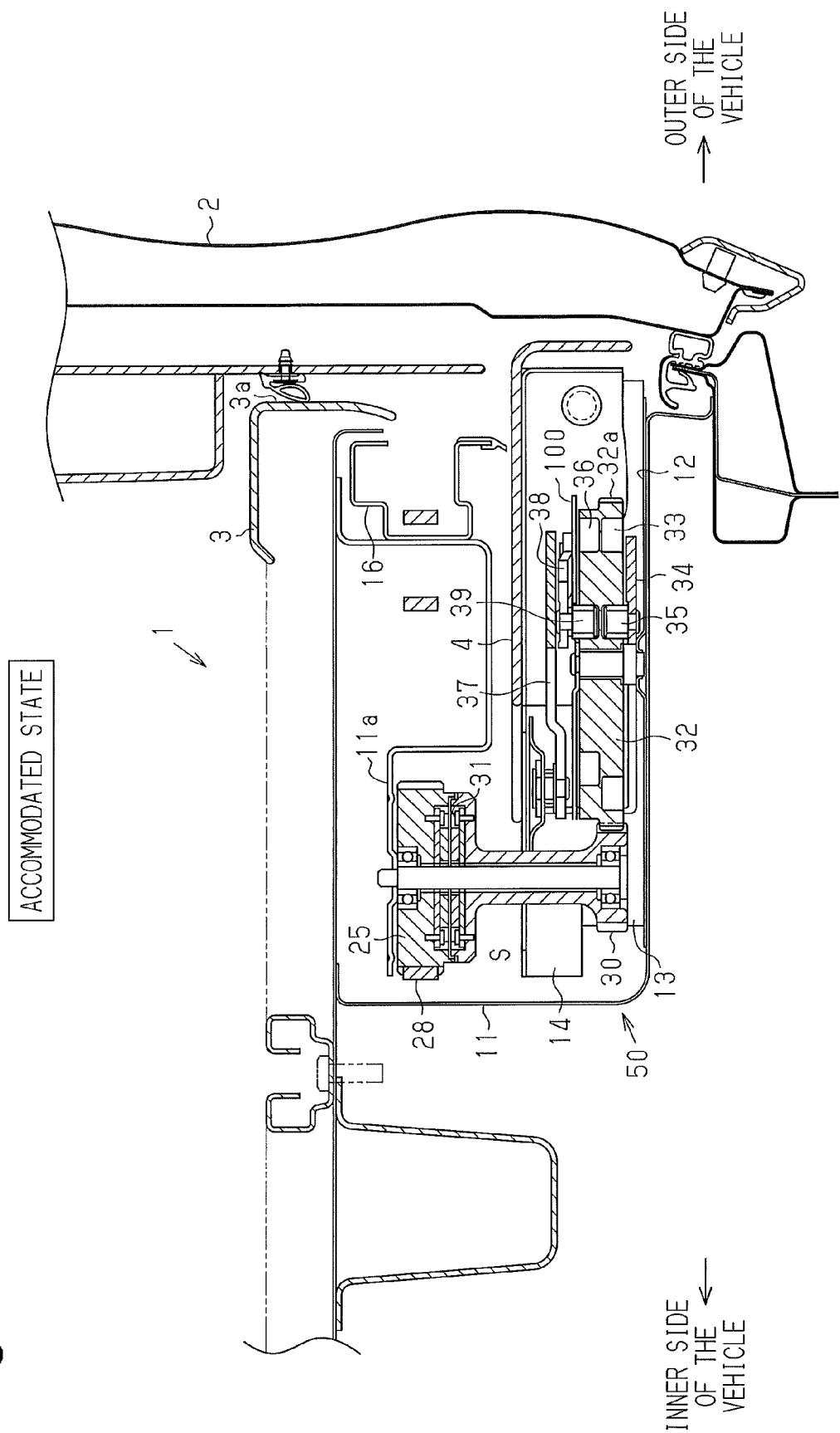
FIG. 4 is a cross-sectional view taken along line 4-4 in FIG. 1.
Figure 5:
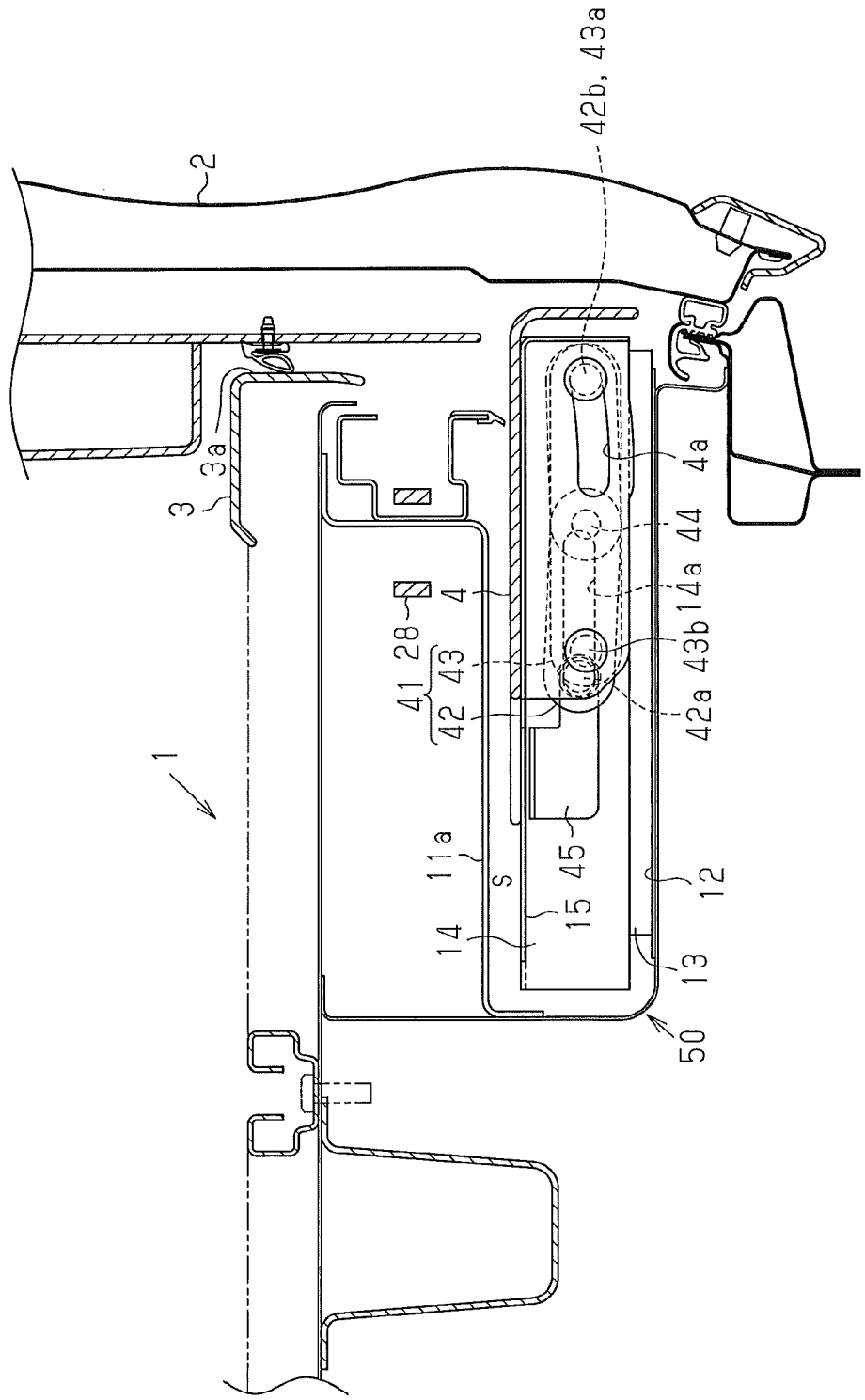
FIG. 5 is a cross-sectional view taken along line 5-5 in FIG. 1.
Figure 6:
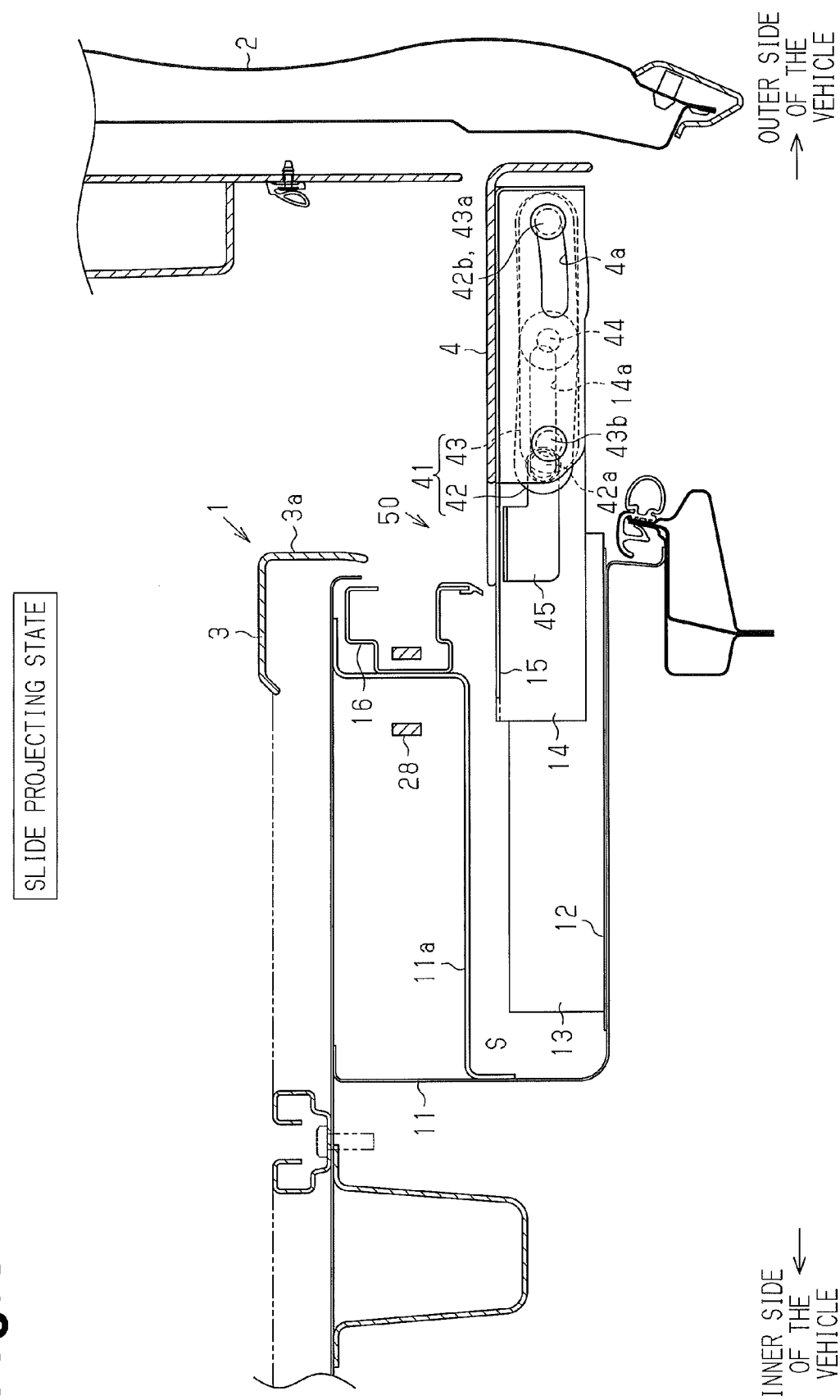
FIG. 6 is a cross-sectional view taken along line 6-6 in FIG. 2.
Figure 7:
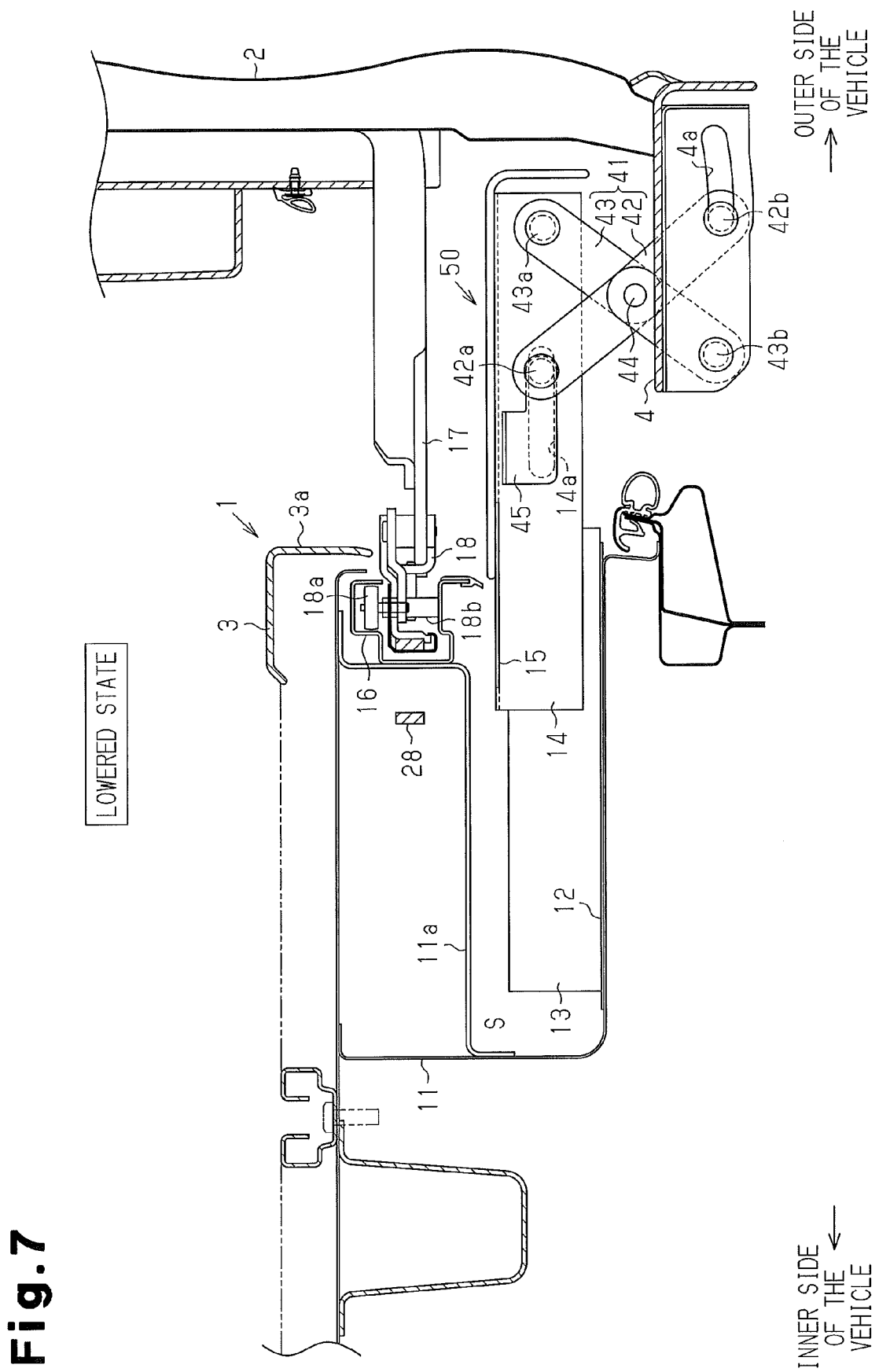
FIG. 7 is a cross-sectional view taken along line 7-7 in FIG. 3.

Next, description will be given of structures of details concerning opening and closing operations of the slide door 2, as well as a moving operation of the movable step 4 with reference to FIGS. 1 to 16. FIGS. 1 and 3 are plan views of the slide door 2 in its fully opened state and its fully closed state, respectively. FIG. 2 is a plan view of the movable step 4 in a state immediately after the projecting motion thereof is completed (slide projecting state). In these drawings, upper and lower sides correspond to an inner side (vehicle-inner side) and an outer side (vehicle-outer side) in the widthwise direction of the vehicle, and left and right sides correspond to front and rear sides of the vehicle. FIGS. 4 and 5 are cross-sectional views taken along line 4-4 and line 5-5 in FIG. 1. FIG. 6 is a cross-sectional view taken along line 6-6 in FIG. 2 and FIG. 7 is a cross-sectional view taken along line 7-7 in FIG. 3.

As shown in FIGS. 4 to 7, a box-like case 11 which opens toward outside of the vehicle is fixed in the vehicle body 1 below the vehicle floor 3 and a metal plate step panel 12 is provided on an inner surface of the bottom wall of the case 11. A support panel 11*a* is fixed to the case 11. The support panel 11*a* divides the interior of the case 11 at an intermediate portion in its height direction. An accommodation space S is formed below the support panel 11*a*.

A pair of fixed rails 13 (see FIGS. 1 to 3) extending so as to incline by a slight angle with respect to the widthwise direction of the vehicle are fixed to the step panel 12, and movable rails 14 as movable members are slidably supported by the fixed rails 13. Both movable rails 14, for example, are connected to each other by a metal plate slide panel 15.

An elongated hole 14*a* extending in the longitudinal direction is formed in an inner side surface of an intermediate portion of each movable rail 14 in its longitudinal direction. A pair of arms 42 and 43, i.e., first and second arms 42 and 43 which are turnably connected to each other at their central portions form an X arm 41 as a link mechanism. A first end 42*a* of the first arm 42 is rotatably connected to each movable rail 14 such that the first end 42*a* can move along the elongated hole 14*a*. A first end 43*a* of the second arm 43 is rotatably connected to an inner side surface of the distal end (vehicle-outer side end) of each movable rail 14 in its longitudinal direction. Central portions of the arms 42 and 43 in the longitudinal direction are rotatably connected to each other by a pin 44. The first arm 42, which is disposed on both movable rails 14, is rotatably connected to a metal plate vertically moving panel 45 at the first end 42*a*. That is, when the vertically moving panel 45 moves along the longitudinal direction of the elongated hole 14a, the first end 42a of each arm 42 connected to the vertically moving panel 45 slides along the elongated hole 14a so as to vary the distance between the first ends 42a and 43a of the arms 42 and 43.

An elongated hole 4a extending in the longitudinal direction of each movable rail 14 is formed in a side surface of a vehicle-outer side end of the movable step 4. A second end 42b of the first arm 42 is rotatably connected to the movable step 4 such that the second end 42b can move along the elongated hole 4a. Further, a second end 43b of the second arm 43 is rotatably connected to a side surface of a vehicle-inner side end of the movable step 4. Therefore, when the first end 42a of each arm 42 moves toward the vehicle-outer side along the elongated hole 14a together with the vertically moving panel 45, the X arm 41 "opens", that is, the second ends 42b and 43b of the arms 42 and 43 move downward, and the movable step 4 connected to the second ends 42b and 43b moves downward (see FIG. 7). On the other hand, when the first end 42a of each arm 42 moves toward the vehicle-inner side along the elongated hole 14a together with the vertically moving panel 45, the X arm 41 "closes", that is, the second ends 42b and 43b of the arms 42 and 43 move upward, and the movable step 4 connected to the second ends 42b and 43b moves upward (see FIG. 6).

A guide rail 16 is disposed on the support panel 11a above the fixed rails 13 and the like. The guide rail 16 guides an opening/closing operation of the slide door 2. More specifically, as shown in FIG. 1, the guide rail 16 has a curving portion 16a located at a middle portion of the guide rail 16 in its longitudinal direction and also includes an inclined portion 16b inclined inward in the widthwise direction of the vehicle at the front end of the curving portion 16a and a straight portion 16c extending rearward of the vehicle at the rear end of the curving portion 16a.

On the other hand, the slide door 2 is provided at its lower portion with an arm 17 projecting inward of the vehicle, and a roller support member 18 is turnably connected to the distal end of the arm 17. That is, the slide door 2 is connected to the roller support member 18 through the arm 17. The roller support member 18 includes a pair of guide rollers 18a, and a load roller 18b disposed between the guide rollers 18a. Each guide roller 18a includes a rotation axis extending in a height direction of the vehicle (in a direction perpendicular to the sheet of FIG. 1). The load roller 18b includes a rotation axis extending in a direction perpendicular to a plane including the rotation axes of both guide rollers 18a. Each guide roller 18a is attached to the guide rail 16 such that the guide roller 18a can roll and the roller support member 18 is supported by the load roller 18b such that the roller support member 18 can roll on the support panel 11a (vehicle body 1).

Therefore, when the guide rollers 18a are guided by the guide rail 16, the slide door 2 slides and moves in the front-rear direction of the vehicle so as to open and close the door opening 1a. The load of the slide door 2 is supported by the load roller 18b. Especially, when the guide rollers 18a are guided toward the front end (inclined portion 16b) of the guide rail 16, the slide door 2 is pushed outward of the vehicle immediately after the slide door 2 opens from its fully closed state, or the slide door 2 is pulled inward of the vehicle immediately before the slide door 2 is fully closed. With this, the slide door 2 can be disposed such that rearward sliding motion thereof is permitted when the slide door 2 opens, and the slide door 2 is flush with a side surface of the vehicle body 1 when the slide door 2 is fully closed.

A mechanism for opening and closing the slide door 2 is mounted on the support panel 11a and the step panel 12 inside the guide rail 16 in the vehicle. More specifically, the support panel 11a includes a slide door drive unit 21 as an electric drive source, a plurality of idle gears 22, 23, 24, 25, 26 and 27 sequentially disposed in the clockwise direction from the slide door drive unit 21, and a drive belt 28 that is wound around an output gear 21a of the slide door drive unit 21 and the idle gears 22 to 27 so as to mesh with the output gear 21a and the idle gears 22 to 27. The idle gears 22 to 27 and the drive belt 28 constitute an opening/closing mechanism 29 as a first transmitting mechanism.

The slide door drive unit 21 is fixed to the support panel 11a and rotates an output gear 21a thereof. The idle gears 22 to 27 are rotatably supported by the support panel 11a. The idle gears 23 and 22 are disposed near the front end and the rear end of the guide rail 16, respectively. The idle gear 25 is disposed inward of the vehicle at an intermediate location between the idle gears 22 and 23. An appropriate idle gear (not shown) with which the drive belt 28 meshes is disposed near the curving portion 16a between the idle gears 22 and 23.

The distal end of the roller support member 18 is fixed to the drive belt 28 along the guide rail 16 between the idle gears 22 and 23. The distal end of the roller support member 18 is disposed near the idle gear 23, i.e., near the front end of the guide rail 16 in the fully closed state shown in FIG. 1. The distal end of the roller support member 18 is disposed near the idle gear 22, i.e., near the rear end of the guide rail 16 in the fully opened state shown in FIG. 3.

Therefore, when the slide door drive unit 21 rotates the output gear 21a in the counterclockwise direction in FIGS. 1 to 2, the drive belt 28 moves in the direction of arrow X while rotating the idle gears 22 to 27. At this time, the idle gear 25 rotates in the counterclockwise direction in the drawing. The slide door 2 connected to the drive belt 28 through the roller support member 18 and the like moves rearward of the vehicle along the guide rail 16 and opens the door opening 1a.

On the other hand, when the slide door drive unit 21 rotates the output gear 21a in the clockwise direction in FIGS. 2 and 3, the drive belt 28 moves in the direction of arrow Y while rotating the idle gears 22 to 27. At this time, the idle gear 25 rotates in the clockwise direction in the drawing. The slide door 2 connected to the drive belt 28 through the roller support member 18 moves forward of the vehicle along the guide rail 16 and closes the door opening 1a.

As shown in FIG. 4, a gear 30 disposed below the idle gear 25 and coaxially with the idle gear 25 is rotatably supported by the step panel 12. A torque limiter 31 which limits, to a given value, the torque that can be transmitted between the idle gear 25 and the gear 30 is provided between the idle gear 25 and the gear 30. A disk-like plate cam 32 is rotatably supported by the step panel 12. A gear portion 32a that meshes with the gear 30 is formed on an outer periphery of the plate cam 32.

Therefore, the idle gear 25 rotates the gear 30 integrally with the idle gear 25 through the torque limiter 31 when the torque transmitted to the gear 30 is limited to the given value, thereby rotating the plate cam 32.

Figure 8:
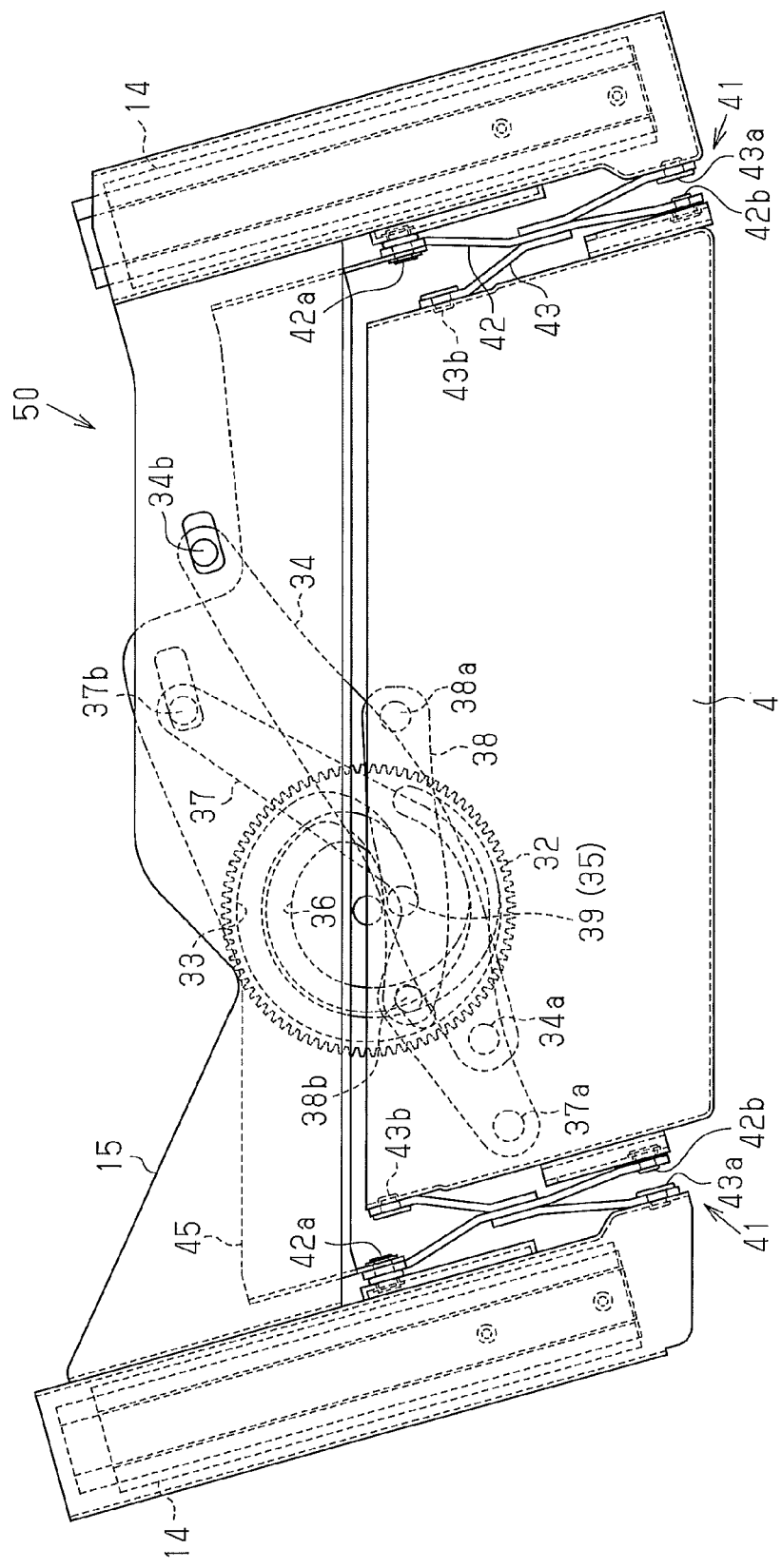
FIG. 8 is an enlarged plan view of a step moving mechanism in the vehicle step device shown in FIG. 1.
Figure 9:
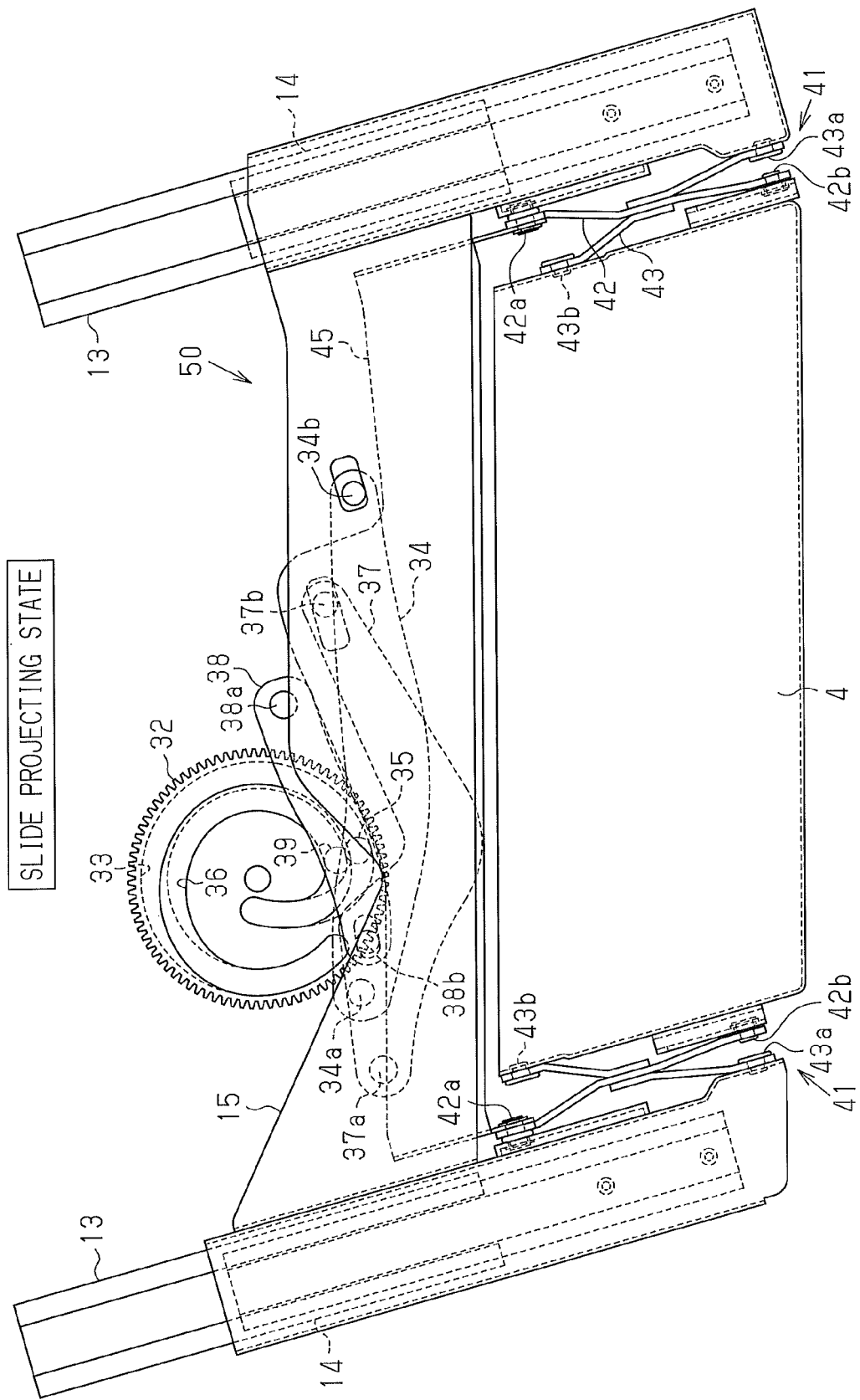
FIG. 9 is an enlarged plan view of the step moving mechanism in the vehicle step device shown in FIG. 2.
Figure 10:
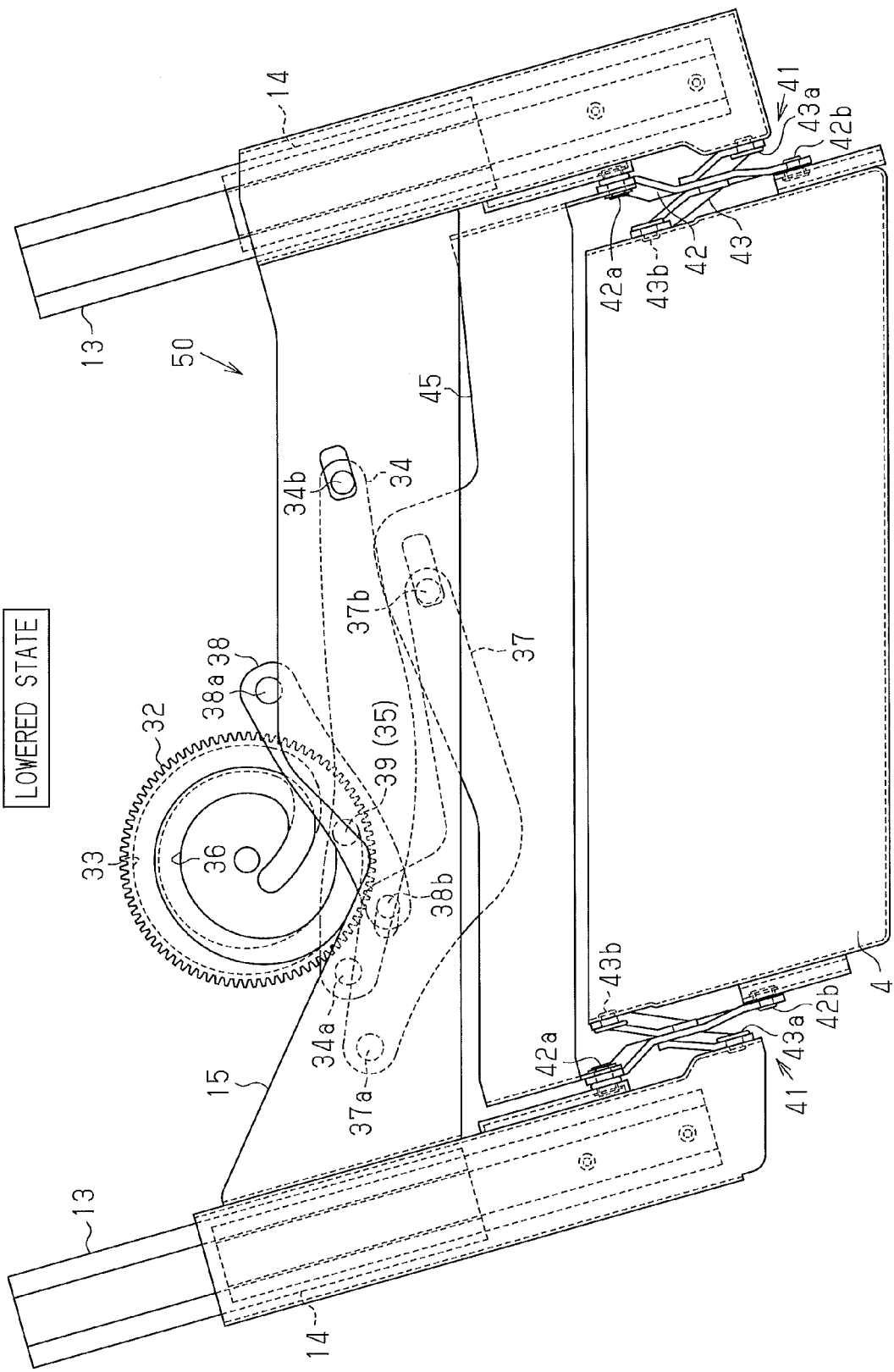
FIG. 10 is an enlarged plan view of the step moving mechanism in the vehicle step device shown in FIG. 3.
Figure 11:
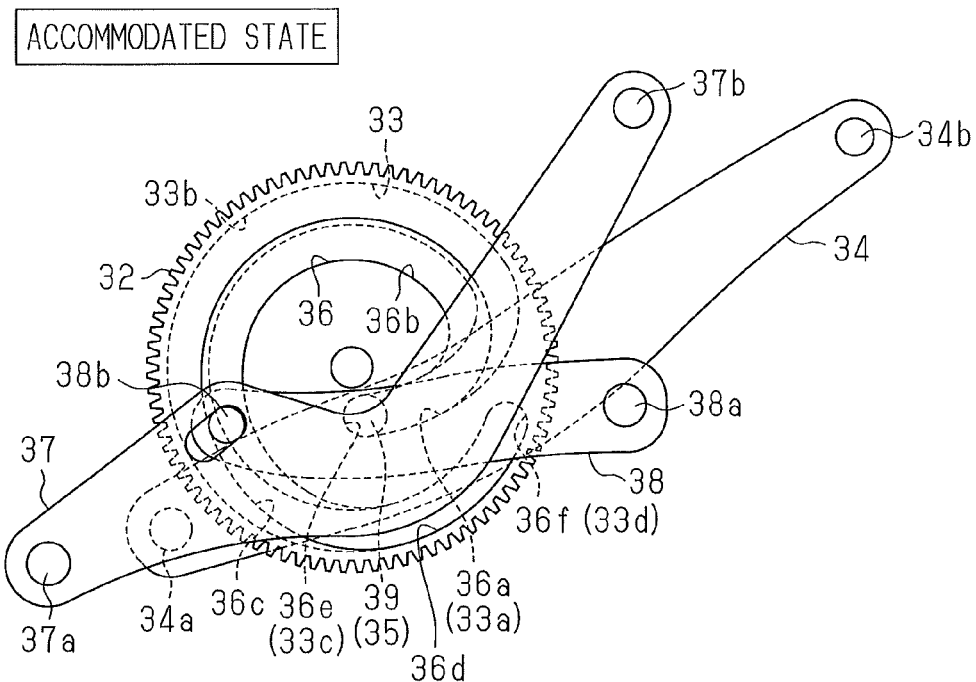
FIG. 11 is an enlarged plan view of cams and levers in the vehicle step device shown in FIG. 1.
Figure 12:
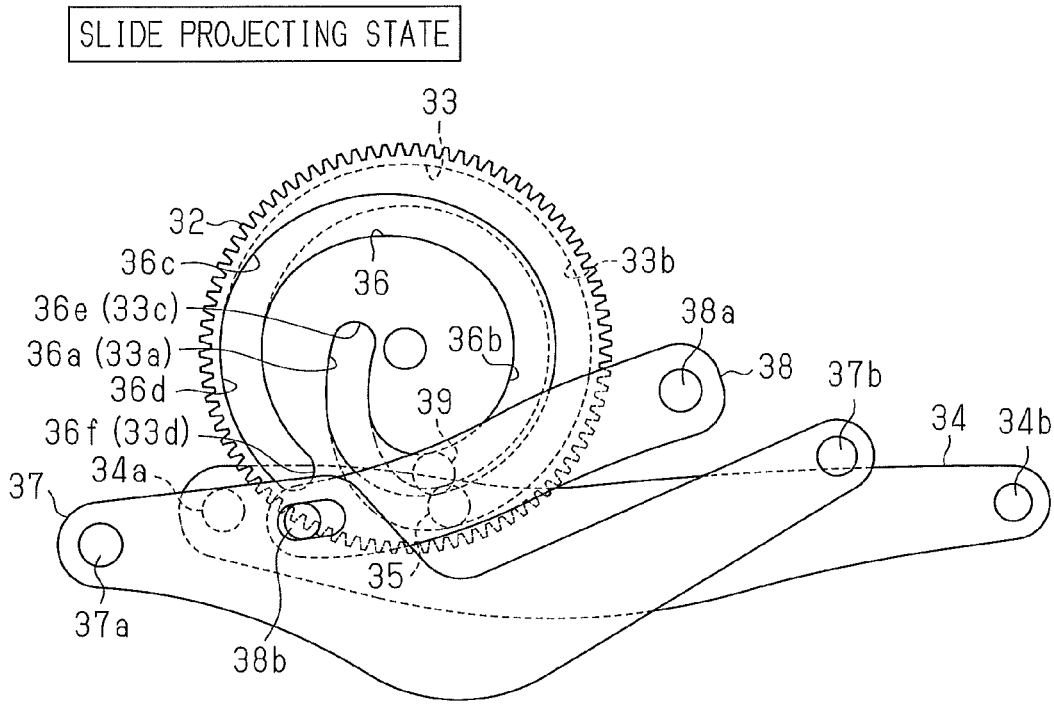
FIG. 12 is an enlarged plan view of the cams and the levers in the vehicle step device shown in FIG. 2.
Figure 13:
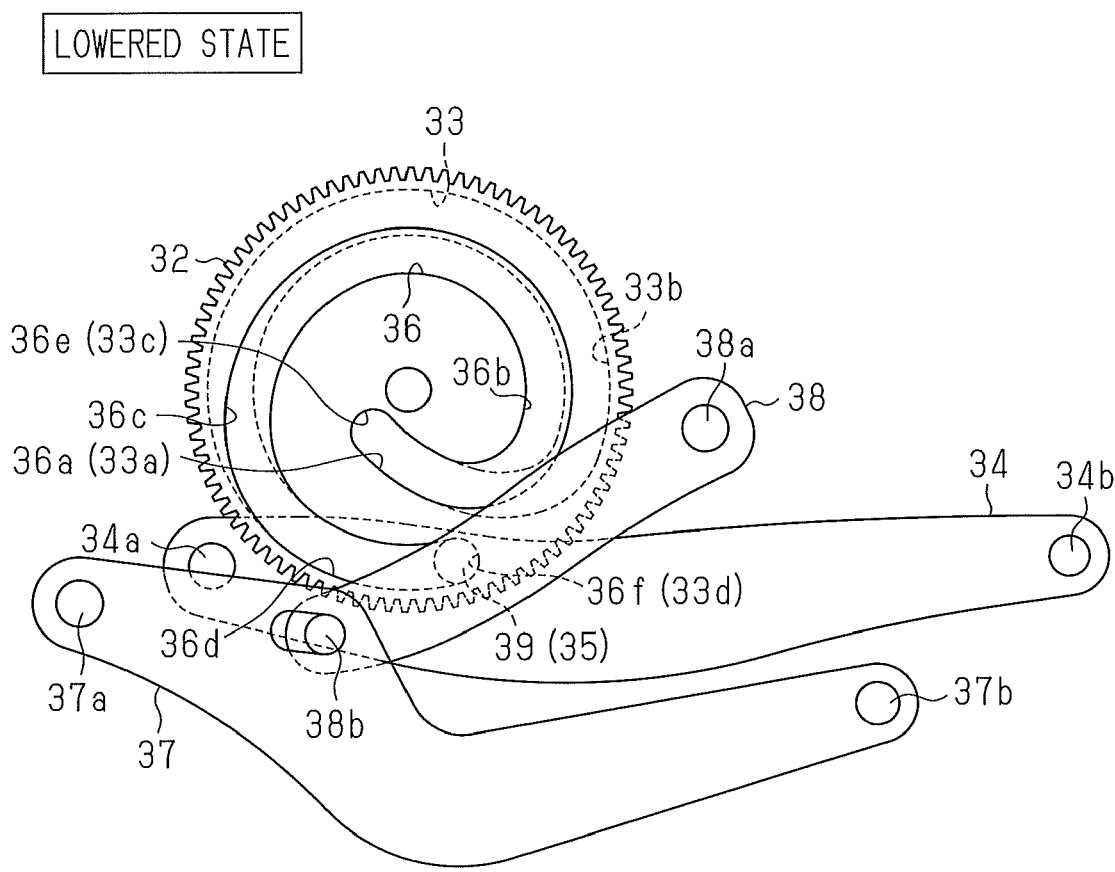
FIG. 13 is an enlarged plan view of the cams and the levers in the vehicle step device shown in FIG. 3.
Figure 14:
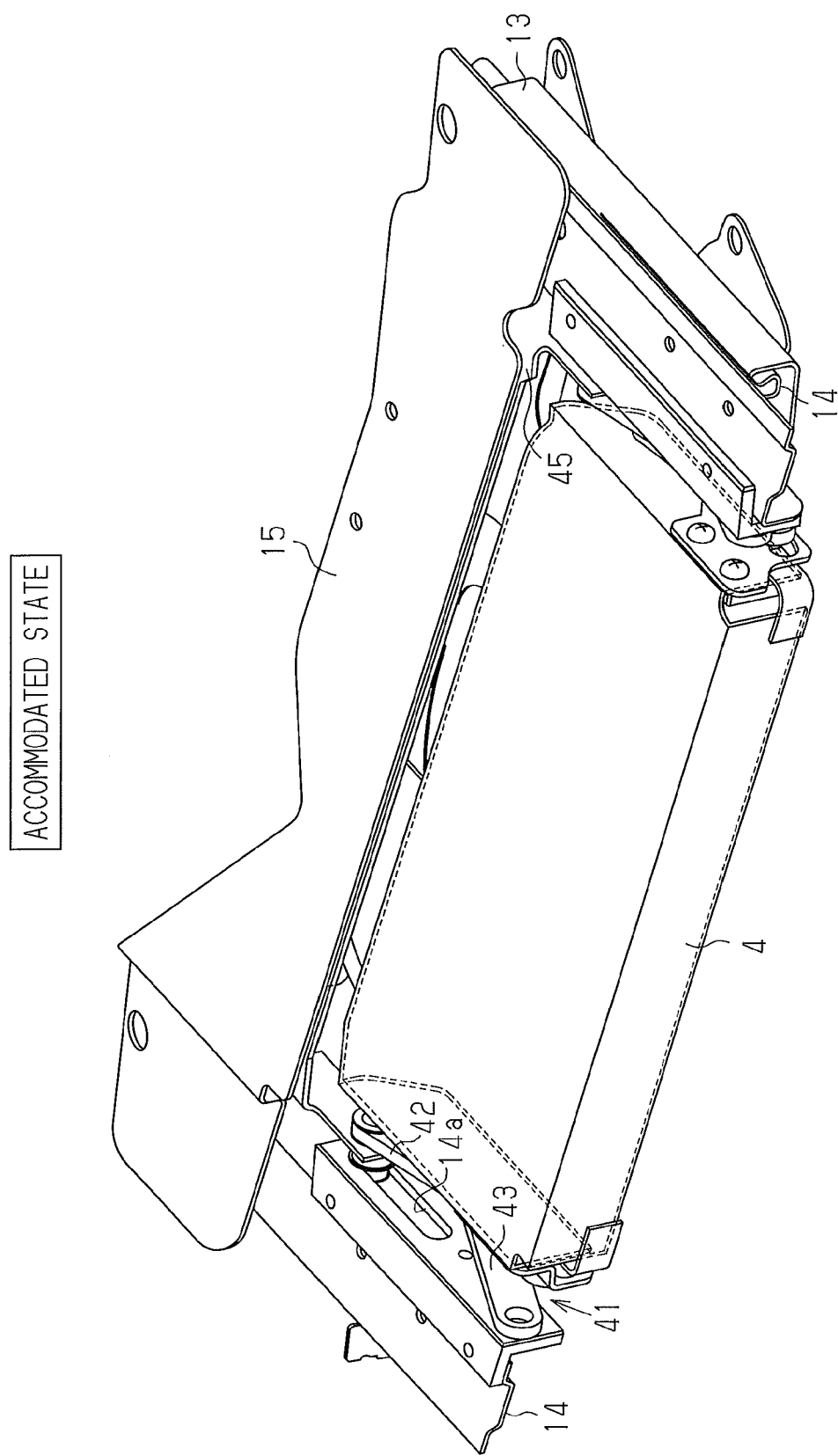
FIG. 14 is a perspective view of the movable step of the vehicle step device shown in FIG. 1.
Figure 15:
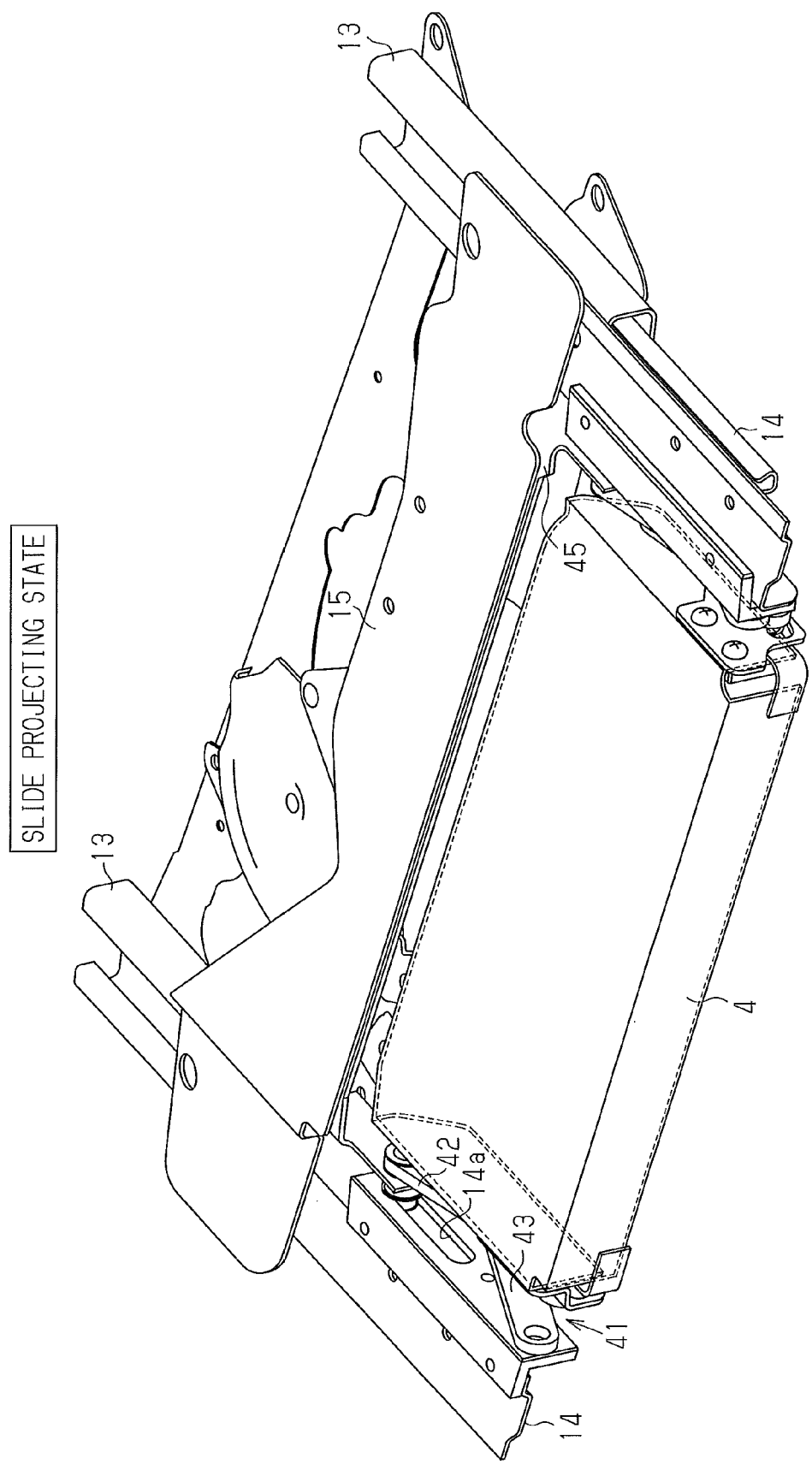
FIG. 15 is a perspective view of the movable step of the vehicle step device shown in FIG. 2.
Figure 16:
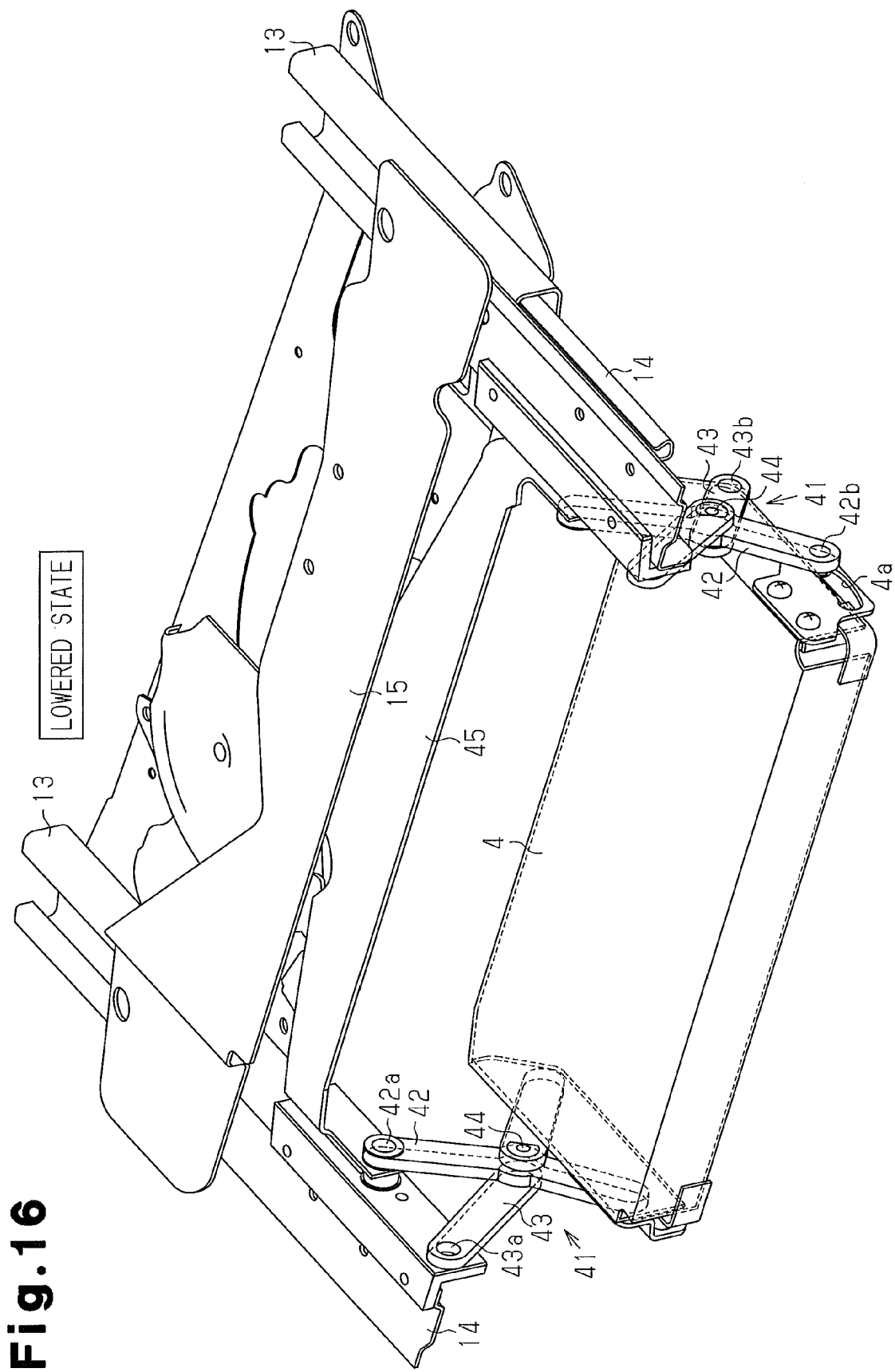
FIG. 16 is a perspective view of the movable step of the vehicle step device shown in FIG. 3.

FIGS. 8 to 10 are enlarged plan views of a step moving mechanism 50 shown in FIGS. 1 to 3, respectively. FIGS. 11 to 13 are enlarged plan views of the cams and levers shown in FIGS. 1 to 3, respectively. As shown in these drawings, a groove cam 33 is formed on a lower surface of the plate cam 32. The groove cam 33 includes a first recess 33a extending to have a radius that is varied with respect to a rotation axis of the plate cam 32 and a second recess 33b extending in an arcuate form to have a given radius with respect to the rotation axis of the plate cam 32. The second recess 33b is connected to the first recess 33a.

A first end 34a of an elongated slide lever 34 is rotatably connected to the step panel 12. A second end 34b of the slide lever 34 is rotatably connected to the slide panel 15 so as to permit the slide panel 15 to move along the longitudinal direction of the fixed rails 13. Therefore, when the slide lever 34 turns around the first end 34a, the slide panel 15 connected to the second end 34b is pushed or pulled, and the slide panel 15 moves along the fixed rails 13 together with the movable rails 14.

A bush 35 as a second follower member accommodated in the groove cam 33 is fixed to a longitudinal intermediate portion of the slide lever 34. The bush 35 is set such that the bush 35 is located at a termination 33c of the first recess 33a when the slide door 2 is in the fully closed position (see FIGS. 1 and 11) and the bush 35 is located at a termination 33d of the second recess 33b when the slide door 2 is in the fully opened position (see FIGS. 3 and 13). That is, the bush 35 is set such that when movement of the slide door 2 from the fully closed position to the fully opened position is completed, the movement of the bush 35 from the termination 33c of the first recess 33a to the termination 33d of the second recess 33b is completed.

Further, the bush 35 is set such that when the slide door 2 reaches its predetermined open/close position (door opening degree position) at which a passenger of the vehicle can get on or off the vehicle, the bush 35 is located at a connection between the first and second recesses 33a and 33b (see FIGS. 2 and 12). When the bush 35 is located in the first recess 33a (see FIGS. 11 and 12), the plate cam 32 rotates and with this, the groove cam 33 (first recess 33a) pushes the bush 35, thereby turning the slide lever 34 around the first end 34a. As described above, as the slide lever 34 turns, the slide panel 15 is pushed or pulled, and the slide panel 15 is moved along the fixed rails 13 together with the movable rails 14. At this time, the movable step 4 connected to the movable rails 14 through the X arms 41 is brought in or out (moved forward and backward).

Further, when the bush 35 is located in the second recess 33b (see FIGS. 12 and 13), the groove cam 33 (second recess 33b) limits movement of the bush 35, i.e., movement of the bush 35 in a radial direction with respect to the rotation axis of the plate cam 32, thereby limiting the turning motion of the slide lever 34 around the first end 34a caused by rotation.

A groove cam 36 is formed in an upper surface of the plate cam 32. The groove cam 36 includes a first recess 36a extending to have a radius that is varied with respect to the rotation axis of the plate cam 32, a second recess 36b that extends continuously from the first recess 36a in an arcuate form such that the second recess 36b has a given radius with respect to the rotation axis of the plate cam 32, a third recess 36c that extends continuously from the second recess 36b in a curved form such that the third recess 36c has a radius gradually increasing from the rotation axis of the plate cam 32, and a fourth recess 36d that extends continuously from the third recess 36c in an arcuate form such that the fourth recess 36d has a given radius with respect to the rotation axis of the plate cam 32. As viewed from above, positions of terminations 36e and 36f of the first and fourth recesses 36a and 36d match with the positions of terminations 33c and 33d of the first and second recesses 33a and 33b of the groove cam 33, respectively.

The plate cam 32 is covered with a plate cam bracket 100 (see FIG. 4) and a first end 37a of an elongated vertically moving lever 37 is rotatably connected to the plate cam bracket 100. A second end 37b of the vertically moving lever 37 is rotatably connected to the vertically moving panel 45 so as to permit the vertically moving panel 45 to move along the longitudinal direction of the fixed rails 13 and the like. A first end 38a of an elongated lever 38 is rotatably connected to the plate cam bracket 100 and a second end 38b of the lever 38 is rotatably connected to the vertically moving lever 37 in the vicinity of the first end 37a. Therefore, when the lever 38 turns around the first end 38a, the vertically moving lever 37 connected to the second end 38b turns around the first end 37a, the vertically moving panel 45 connected to the second end 37b is pushed or pulled, and is moved along the elongated holes 14a of the movable rails 14.

A bush 39 as a first follower member accommodated in the groove cam 36 is fixed to a longitudinal intermediate portion of the lever 38. The bush 39 is set such that when the slide door 2 is in the fully closed position, the bush 39 is located at the termination 36e of the first recess 36a (see FIGS. 1 and 11), and when the slide door 2 is in the fully opened position, the bush 39 is located at the termination 36f of the fourth recess 36d (see FIGS. 3 and 13). That is, the bush 39 is set such that when movement of the slide door 2 from the fully closed position to the fully opened position is completed, movement of the bush 39 from the termination 36e of the first recess 36a to the termination 36f of the fourth recess 36d is completed.

Further, the bush 39 is set such that when the slide door 2 reaches its predetermined open/close position (door opening degree position) at which a passenger of the vehicle can get on or off the vehicle, the bush 39 is located at a connection between the first and second recesses 36a and 36b (see FIGS. 2 and 12). When the bush 39 is located in the first recess 36a (see FIGS. 11 and 12), the plate cam 32 rotates and with this, the groove cam 36 (first recess 36a) pushes the bush 39, thereby turning the lever 38 around the first end 38a, and turning the vertically moving lever 37 around the first end 37a through the lever 38. At this time, the vertically moving panel 45 is pushed or pulled, and is moved along the fixed rails 13. In the present embodiment, the moving amount of the vertically moving panel 45 at this time is set such that the moving amount matches with the moving amount of the movable rails 14, which moves at the same time along the fixed rails 13. Therefore, the vertically moving panel 45 moves substantially integrally with the movable rails 14 at this time and does not move along the elongated holes 14a. That is, the distance between the first ends 42a and 43a of each X arm 41 (arms 42 and 43) is constant, and the movable step 4 is not moved vertically.

When the bush 39 is located in the second recess 36b (see FIG. 12), the groove cam 36 (second recess 36b) limits movement of the bush 39, i.e., movement in the radial direction with respect to the rotation axis of the plate cam 32. With this, the plate cam 32 limits the turning motion of the vertically moving lever 37 and the lever 38 around the first ends 37a and 38a caused by rotation. When the bush 39 is located in the third recess 36c, the plate cam 32 rotates and with this, the groove cam 36 (third recess 36c) pushes the bush 39, thereby turning the lever 38 around the first end 38a, and turning the vertically moving lever 37 around the first end 37a through the lever 38. The vertically moving panel 45 is pushed or pulled, and is moved along the elongated holes 14a of the movable rails 14. The movable rails 14 are held stopped. As described above, the distance between the first ends 42a and 43a of the arms 42 and 43 is increased or reduced at this time, and the movable step 4 is moved vertically.

The vertically moving lever 37, which turns around the first end 37a as the lever 38 is turned around the first end 38a, is connected to the lever 38 at a location closer to the first end 37a than the bush 39 so as to increase the moving amount of the second end 37b connected to the vertically moving panel 45.

When the bush 39 is located in the fourth recess 36d, the groove cam 36 (fourth recess 36d) limits movement of the bush 39, i.e., movement of the bush 39 in the radial direction with respect to the rotation axis of the plate cam 32. With this, the plate cam 32 limits the turning motion of the vertically moving lever 37 and the lever 38 around the first ends 37a and 38a caused by rotation. The movable rails 14, the slide lever 34, the bush 35, the vertically moving lever 37, the lever 38, the bush 39 and the X arms 41 constitute the step moving mechanism 50 as a second transmitting mechanism together with the gear 30 and the plate cam 32.

Here, normal action of the present embodiment will be described. With this normal action, since torque transmitted between the idle gear 25 and the gear 30 is limited by the torque limiter 31, this torque does not exceed a given value.

Assume that the slide door 2 is in the fully closed position and thus the movable step 4 is also pulled into the accommodation space S (accommodated state: see FIGS. 1, 5, 8, 11 and 14). In this state, assume that the drive belt 28 is moved in the direction of arrow X shown in FIGS. 1 to 2 to open the slide door 2. At this time, the idle gear 25 rotates integrally with the gear 30 in the counterclockwise direction in the drawing. The plate cam 32, which meshes with the gear 30, rotates in the clockwise direction in the drawing together with the groove cams 33 and 36. At this time, the bush 35 accommodated in the first recess 33a is pushed by the first recess 33a, and the slide lever 34 to which the bush 35 is fixed turns around the first end 34a in the clockwise direction in the drawing. The slide panel 15 connected to the second end 34b of the slide lever 34 projects together with the movable rails 14 along the fixed rails 13. Simultaneously, the bush 39 accommodated in the first recess 36a is pushed by the first recess 36a, the lever 38 to which the bush 39 is fixed turns around the first end 38a in the counter clockwise direction in the drawing, and the vertically moving lever 37 connected to the second end 38b turns around the first end 37a in the clockwise direction in the drawing. The vertically moving panel 45 connected to the second end 37b of the vertically moving lever 37 projects along the fixed rails 13 substantially integrally with the movable rails 14. The movable step 4 connected to the movable rails 14 through the X arms 41 projects without vertically moving.

When the slide door 2 reaches the predetermined open/close position at which a passenger of the vehicle can get on or off the vehicle, the bush 35 enters the second recess 33b from the first recess 33a. Power transmission of the idle gear 25 and the gear 30 to the slide lever 34 through the plate cam 32 is cut, and the projecting operation of the movable step 4 is completed (slide projecting state: see FIGS. 2, 6, 9, 12 and 15). At the same time, the bush 39 enters the second recess 36b from the first recess 36a. Power transmission of the idle gear 25 and the gear 30 to the lever 38 and the vertically moving lever 37 through the plate cam 32 is temporarily cut.

When the slide door 2 is continuously opened in a state where the projecting operation of the movable step 4 is completed, the bush 39 enters the third recess 36c from the second recess 36b. The bush 39 is pushed by the third recess 36c and the lever 38 further turns around the first end 38a in the counterclockwise direction in the drawing. At this time, the vertically moving lever 37 connected to the second end 38b further turns around the first end 37a in the clockwise direction in the drawing, the vertically moving panel 45 connected to the second end 37b is pushed, and the vertically moving panel 45 moves along the elongated holes 14a of the movable rails 14. The movable rails 14 are held stopped. At this time, the distance between the first ends 42a and 43a of the arms 42 and 43 is reduced, the X arm 41 is opened and the movable step 4 moves downward.

When the bush 39 enters the fourth recess 36d from the third recess 36c, power transmission of the idle gear 25 and the gear 30 to the lever 38 through the plate cam 32 is again cut, and the lowering operation of the movable step 4 is completed (lowered state: see FIGS. 3, 7, 10, 13 and 16). The slide door 2 moves to the fully opened position in a state where the lowering operation of the movable step 4 is completed.

Assume that the drive belt 28 is moved in the direction of arrow Y shown in FIG. 3 to close the slide door 2, which is in the fully opened position. At this time, the idle gear 25 rotates integrally with the gear 30 in the clockwise direction in the drawing. The plate cam 32, that meshes with the gear 30, rotates in the counterclockwise direction in the drawing together with the groove cams 33 and 36. At this time, the bushes 35 and 39 accommodated in the recesses 33b and 36d are not pushed by the recesses 33b and 36d of course. That is, at the initial stage of the closing operation of the slide door 2, a force pushing the bushes 35 and 39 does not act and the movable step 4 is not operated.

When the bush 39 enters the third recess 36c from the fourth recess 36d, the bush 39 is pushed by the third recess 36c and the lever 38 turns around the first end 38a in the clockwise direction in the drawing. At this time, the vertically moving lever 37 connected to the second end 38b turns around the first end 37a in the counterclockwise direction in the drawing, the vertically moving panel 45 connected to the second end 37b is pulled, and the vertically moving panel 45 moves along the elongated holes 14a of the movable rails 14. The movable rails 14 are held stopped. At this time, the distance between the first ends 42a and 43a of the arms 42 and 43 is increased, the X arms 41 are closed, and the movable step 4 moves upward.

When the bush 39 enters the second recess 36b from the third recess 36c, power transmission of the idle gear 25 and the gear 30 to the lever 38 through the plate cam 32 is temporarily cut, and the elevating operation of the movable step 4 is completed.

The slide door 2 is continuously closing in a state where the elevating operation of the movable step 4 is completed, and when the slide door 2 reaches the predetermined open/close position at which a passenger of the vehicle cannot get on or off the vehicle (see FIGS. 2, 6, 9, 12 and 15), the bush 35 enters the first recess 33a from the second recess 33b. Power transmission of the idle gear 25 and the gear 30 to the slide lever 34 through the plate cam 32 is connected, and the accommodating operation of the movable step 4 is started. The bush 35 accommodated in the first recess 33a is pushed by the first recess 33a, the slide lever 34 to which the bush 35 is fixed turns around the first end 34a in the counterclockwise direction in the drawing. The slide panel 15 connected to the second end 34b of the slide lever 34 carries out the accommodating operation along the fixed rails 13 together with the movable rails 14. At the same time, the bush 39 accommodated in the first recess 36a is pushed by the first recess 36a, the lever 38 to which the bush 39 is fixed turns around the first end 38a in the clockwise direction in the drawing, and the vertically moving lever 37 connected to the second end 38b turns around the first end 37a in the counterclockwise direction in the drawing. The vertically moving panel 45 connected to the second end 37b carries out the accommodating operation along the fixed rails 13 substantially integrally with the movable rails 14. The movable step 4 connected to the movable rails 14 through the X arms 41 carries out the accommodating operation without vertically moving. At the same time when the accommodating operation of the movable step 4 is completed, the slide door 2 moves to the fully closed position (see FIGS. 1, 5, 8, 11 and 14).

As described above in detail, according to the present embodiment, the following advantages can be obtained.

(1) In the present embodiment, the movable rails 14 (slide panel 15), i.e., the movable step 4, which is supported by the movable rails 14 through the X arms 41, are moved forward and backward (projected and accommodated) by the slide lever 34 in synchronization with the opening/closing operation of the slide door 2. The first ends 42a (vertically moving panel 45) of the first arms 42 of the X arms 41 are moved relative to the movable rails 14 by the vertically moving lever 37, and the movable step 4 is vertically moved. Since the movable step 4 is operated in synchronization with the opening/closing operation of the slide door 2, it becomes unnecessary for a person who gets on or off the vehicle to bend his or her knees to operate the movable step 4 at the time of getting on the vehicle.

(2) In the present embodiment, the opening/closing operation of the slide door 2 and the moving operation of the movable step 4 can be electrically carried out by the slide door drive unit 21.

(3) In the present embodiment, the movable step 4 can be moved vertically in the projecting state of the movable step 4 with an extremely simple structure formed by engagement between the plate cam 32 (groove cam 36) and the bush 39. Therefore, it is possible to reliably prevent such a case that the movable step 4 vertically moves during the forward or backward operation of the movable step 4 (movable rails 14 and slide panel 15) and interferes with the surrounding members.

(4) In the present embodiment, operation (turning motion) of the vertically moving lever 37 caused by vertical movement of the movable step 4 can be carried out indirectly based on the operation of the lever 38 to which the bush 39 is fixed. Thus, it is possible to enhance, for example, flexibility of settings of the moving amount (turning amount) of the vertically moving lever 37 with respect to the moving amount of the bush 39.

(5) In the present embodiment, the plate cam 32 also functions as a member that moves the movable rails 14 (movable step 4) forward and backward and as a member that vertically moves the movable step 4. With this, it is possible to prevent the number of parts from increasing.

Second Embodiment

A second embodiment according to the present invention will be described below based on FIGS. 18 to 32. To reduce the vertically moving lever in size (length), the structure of the second embodiment is different from that of the first embodiment in that the second embodiment has a lock mechanism that connects and disconnects the movable rails 14 (and slide panel 15) and the vertically moving panel with and from each other so that the vertically moving lever does not operate when the movable step 4 projects (slides). In the second embodiment, detailed explanation of the same portions as those of the first embodiment will be omitted.

Figure 23:
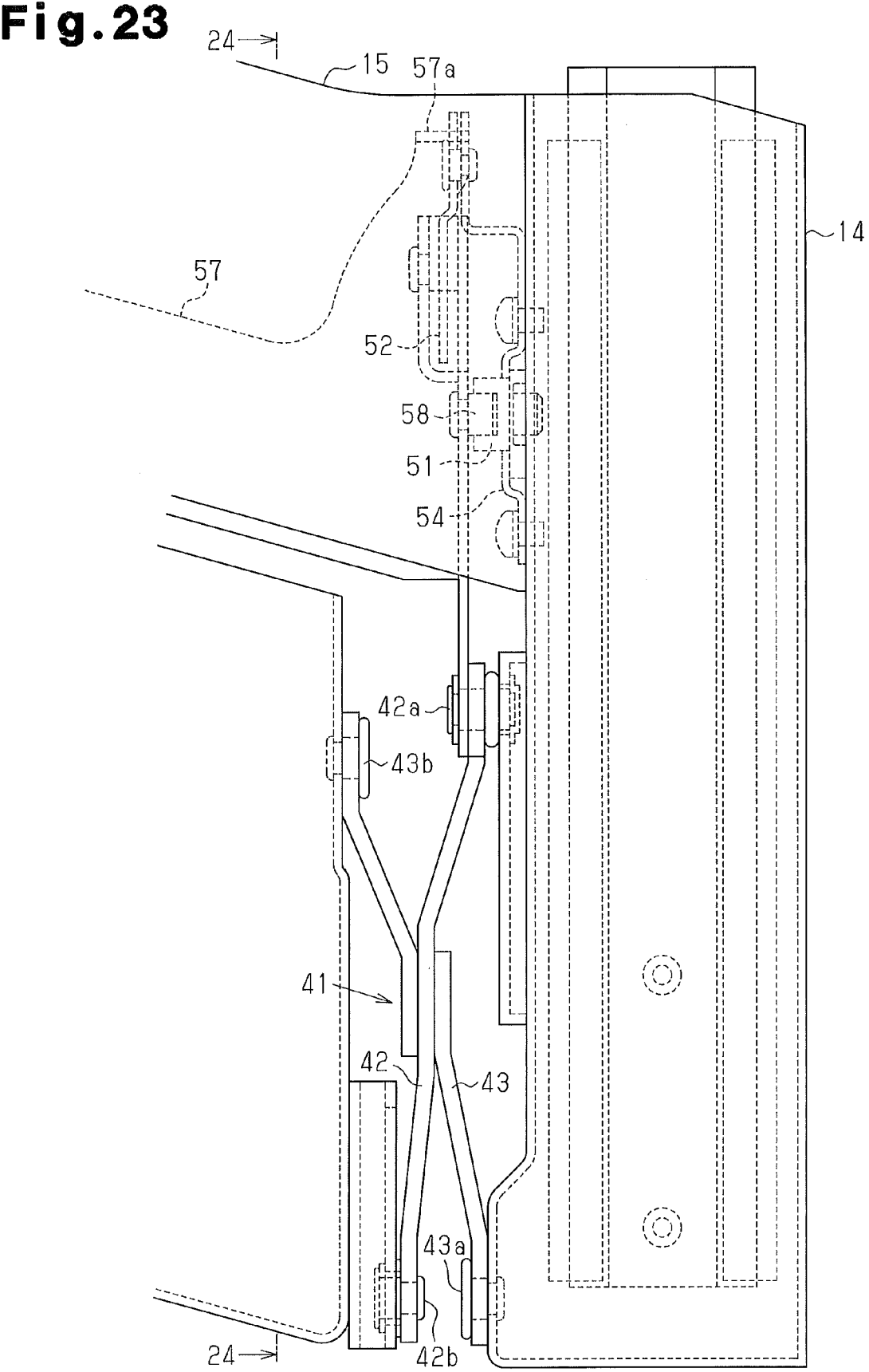
FIG. 23 is an enlarged view of FIG. 18.
Figure 24:
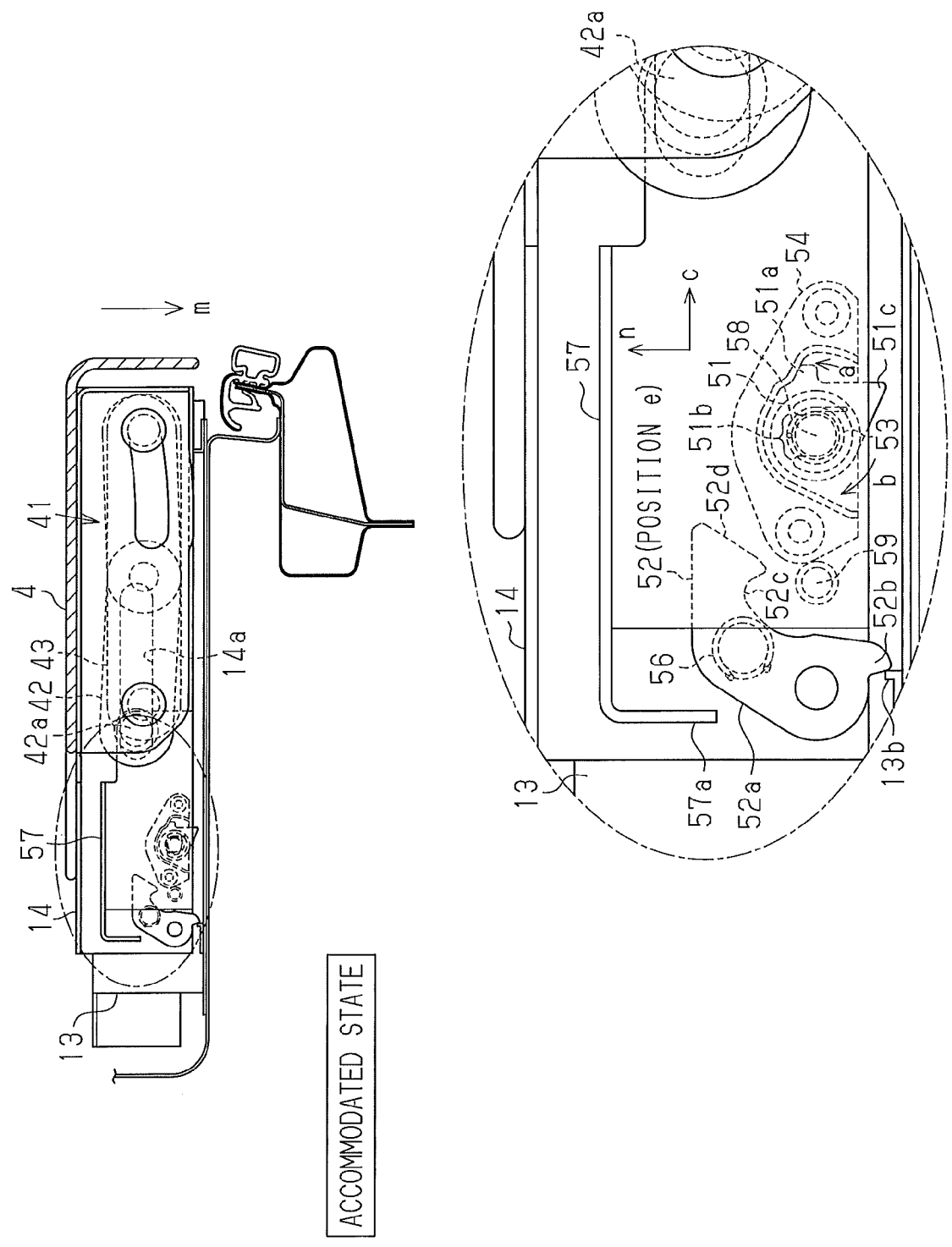
FIG. 24 is a cross-sectional view showing action of the vehicle step device shown in FIG. 17 and its enlarged view.

As shown in FIGS. 23 and 24, in the present embodiment, a U-grooved lock lever 51 and a hook 52 are rotatably connected to an inner side surface of each movable rail 14. The U-grooved lock lever 51 supported by a housing 54 receives a rotation force in the direction of arrow a by a spring 53. Normally, a pawl 51a abuts against the housing 54 and stops. With this, a U-shaped opening 51b is directed to the direction of arrow n. A pawl 51c is in a position where the pawl 51c can abut against a lever 13a (see FIG. 25) that is mounted on the bottom surfaces of the fixed rails 13. Therefore, when the movable step 4 projects, the pawl 51c is pushed by the lever 13a and rotates in the direction of arrow b, and the U-shaped opening 51b is directed in the direction of arrow c.

The hook 52 is in either a position e (see FIG. 24) or a position f (see FIG. 26) by a spring 56. When the hook 52 is in the position e, one side 52a of the hook 52 is in a position where the one side 52a can abut against a pawl 57a of a vertically moving panel 57 that connects both X arms 41 with each other. When the vertically moving panel 57 slides in the direction of arrow c, the pawl 57a pushes the one side 52a of the hook 52, and the hook 52 rotates toward the position f (see FIG. 26). On the other hand, when the hook 52 is in the position f, a pawl 52b of the hook 52 is in a position where the pawl 52b can abut against a lever 13b (see FIG. 28) mounted on the bottom surface of each fixed rail 13. The pawl 52b is pushed by the lever 13b at the time of the accommodating operation of the movable step 4, and the hook 52 rotates toward the position e (see FIG. 24).

The vertically moving panel 57 includes a pin 58 and a pin 59. The pin 58 is fitted to the U-grooved lock lever 51 when the movable step 4 is in an elevated and accommodated state (see FIG. 27). The pin 59 is fitted to an accommodating portion 52c when the hook 52 is in the position f.

Figure 22:
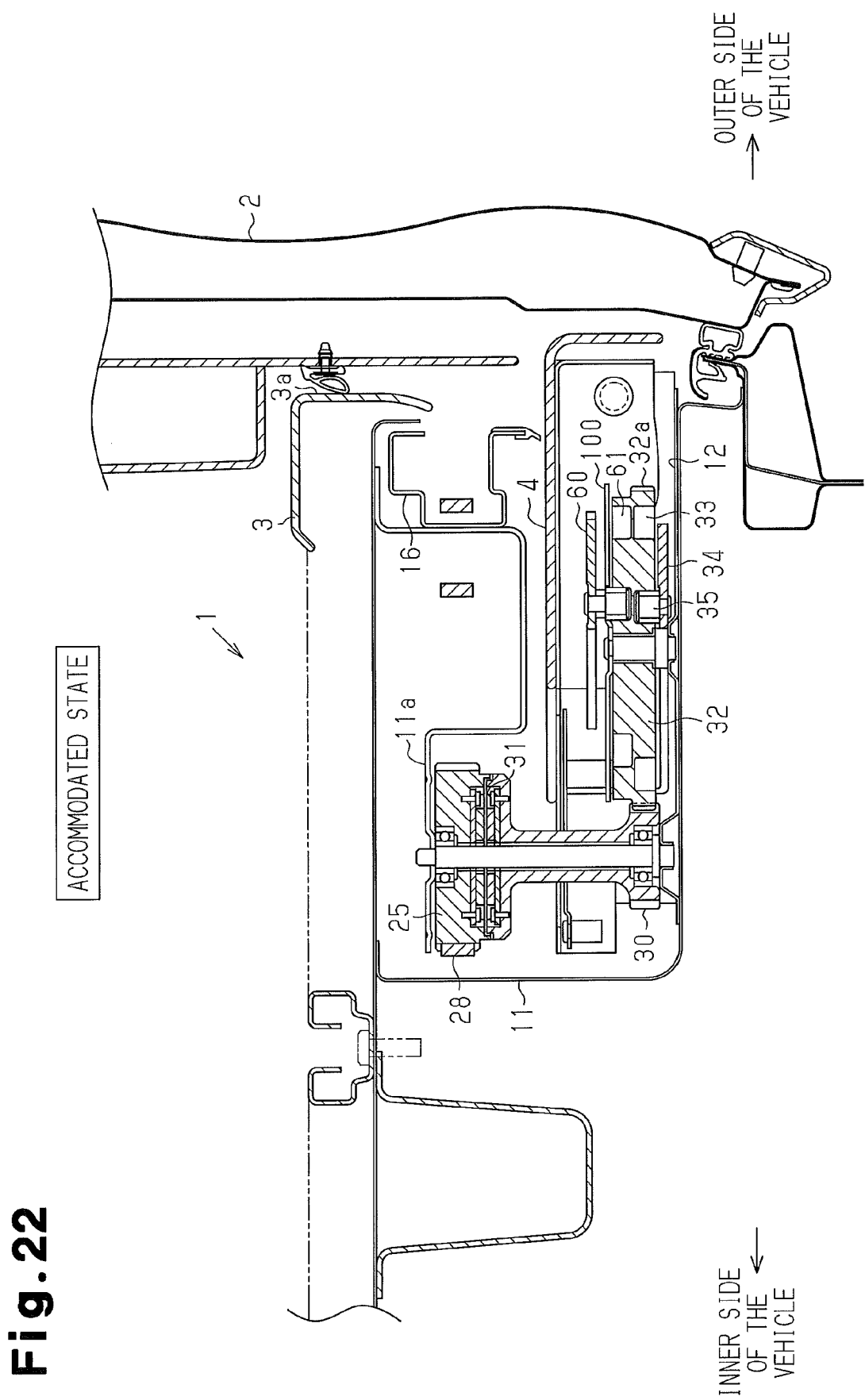
FIG. 22 is a cross-sectional view taken along line 22-22 in FIG. 18.

A vertically moving lever 60 (see FIGS. 29 to 32) that is shortened in the longitudinal direction as compared with the first embodiment is rotatably connected to the plate cam bracket 100 (see FIG. 22). A bush 62 as a first follower member accommodated in a groove cam 61 formed on the plate cam 32 is fixed to a longitudinal intermediate portion of the vertically moving lever 60. The vertically moving panel 57 is provided with a pin 63 at such a location that the pin 63 is separated away from the vertically moving lever 60 when the movable step 4 is in the accommodated state and the pin 63 enters a recess 60a of the vertically moving lever 60 when the movable step 4 is brought into the slide projecting state. The recess 60a of the vertically moving lever 60 includes a pawl 60b that pushes the pin 63 when the movable step 4 moves downward, and a pawl 60c that pushes the pin 63 when the movable step 4 moves upward.

Here, action of the present embodiment will be described.

Figure 18:
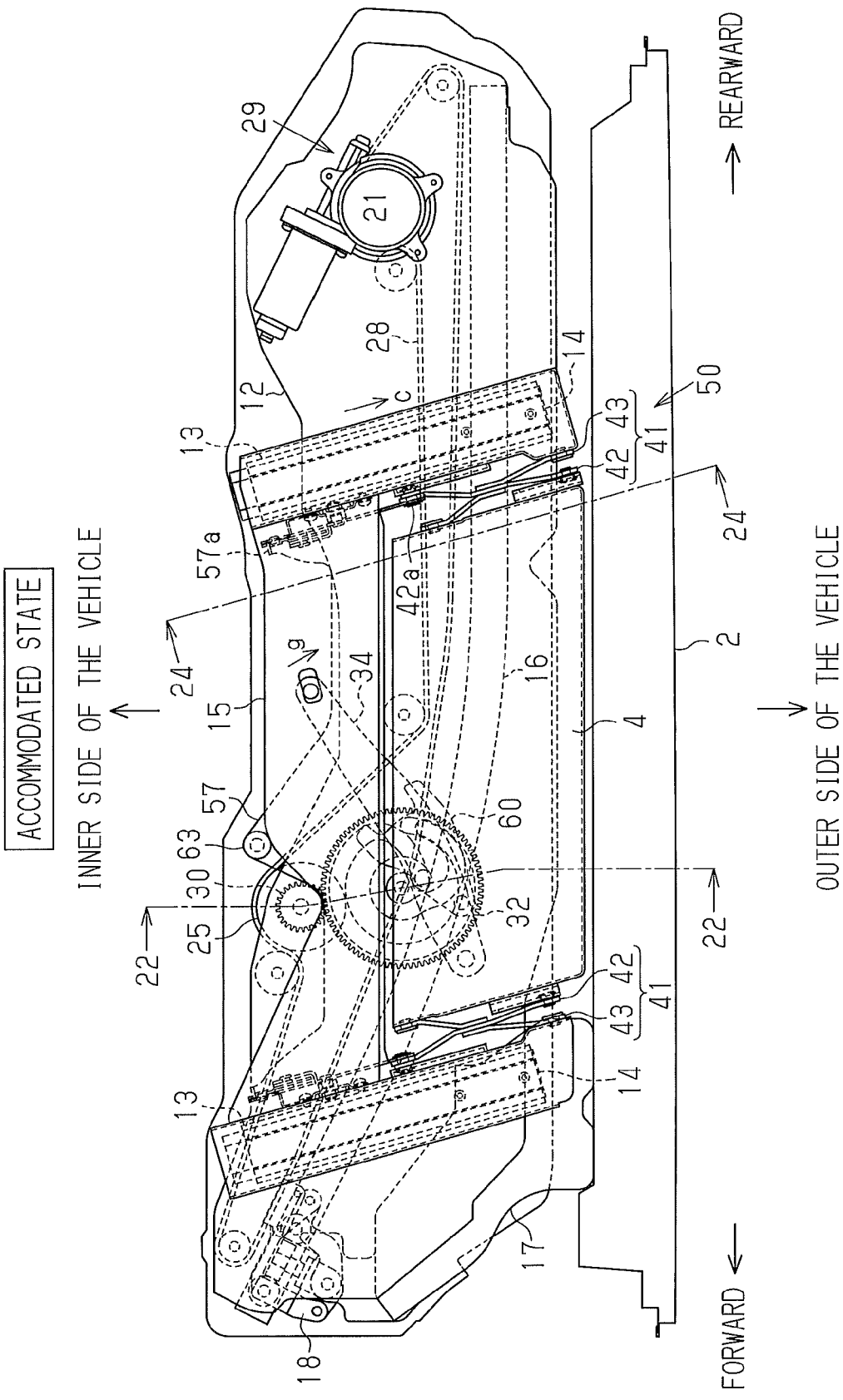
FIG. 18 is a plan view showing a vehicle step device according to a second embodiment of the present invention in a state where a movable step is retracted.
Figure 19:
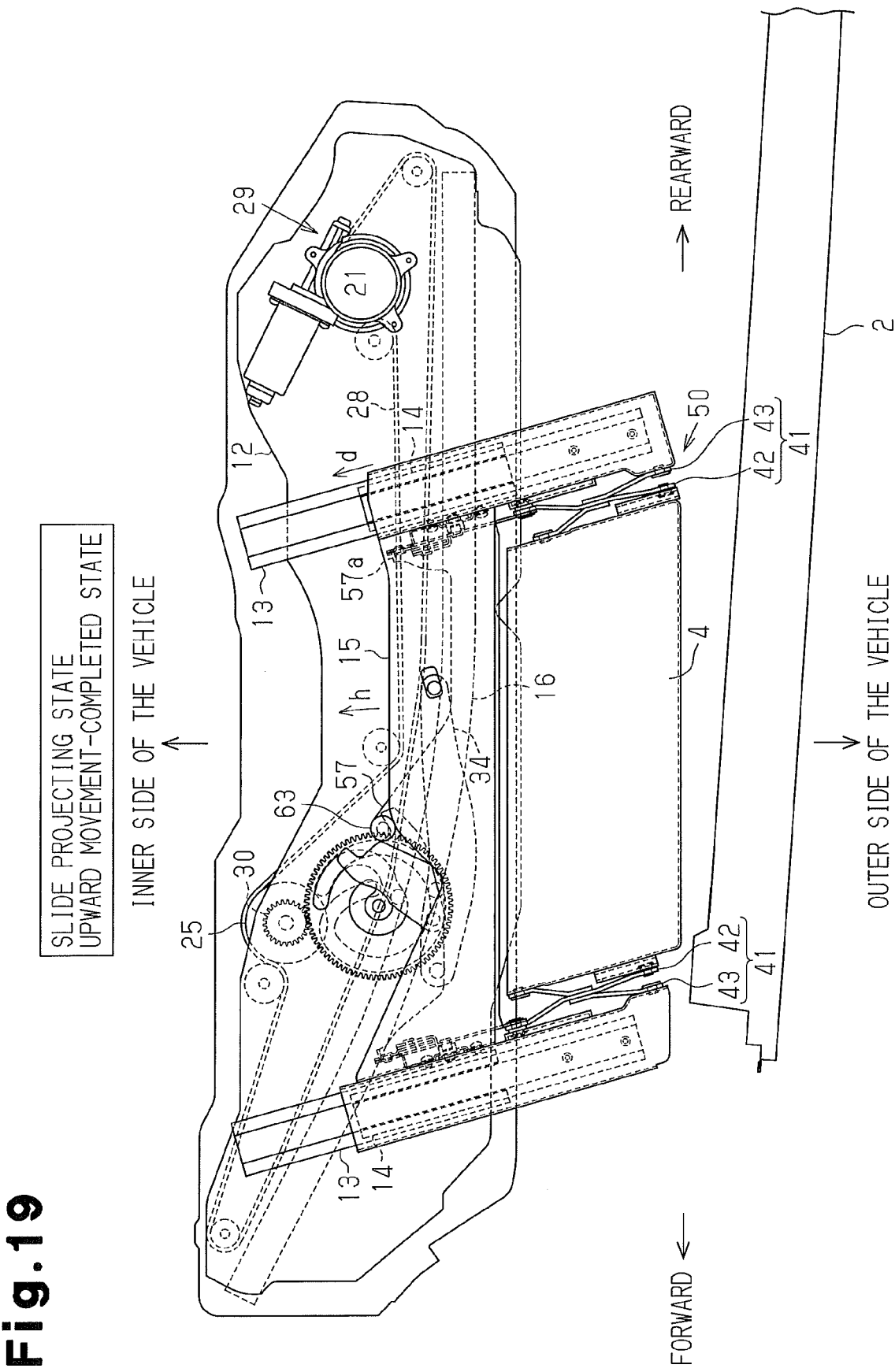
FIG. 19 is a plan view showing the vehicle step device shown in FIG. 17 in a state where the movable step is projected and a state where an upward movement of the movable step is completed.
Figure 20:
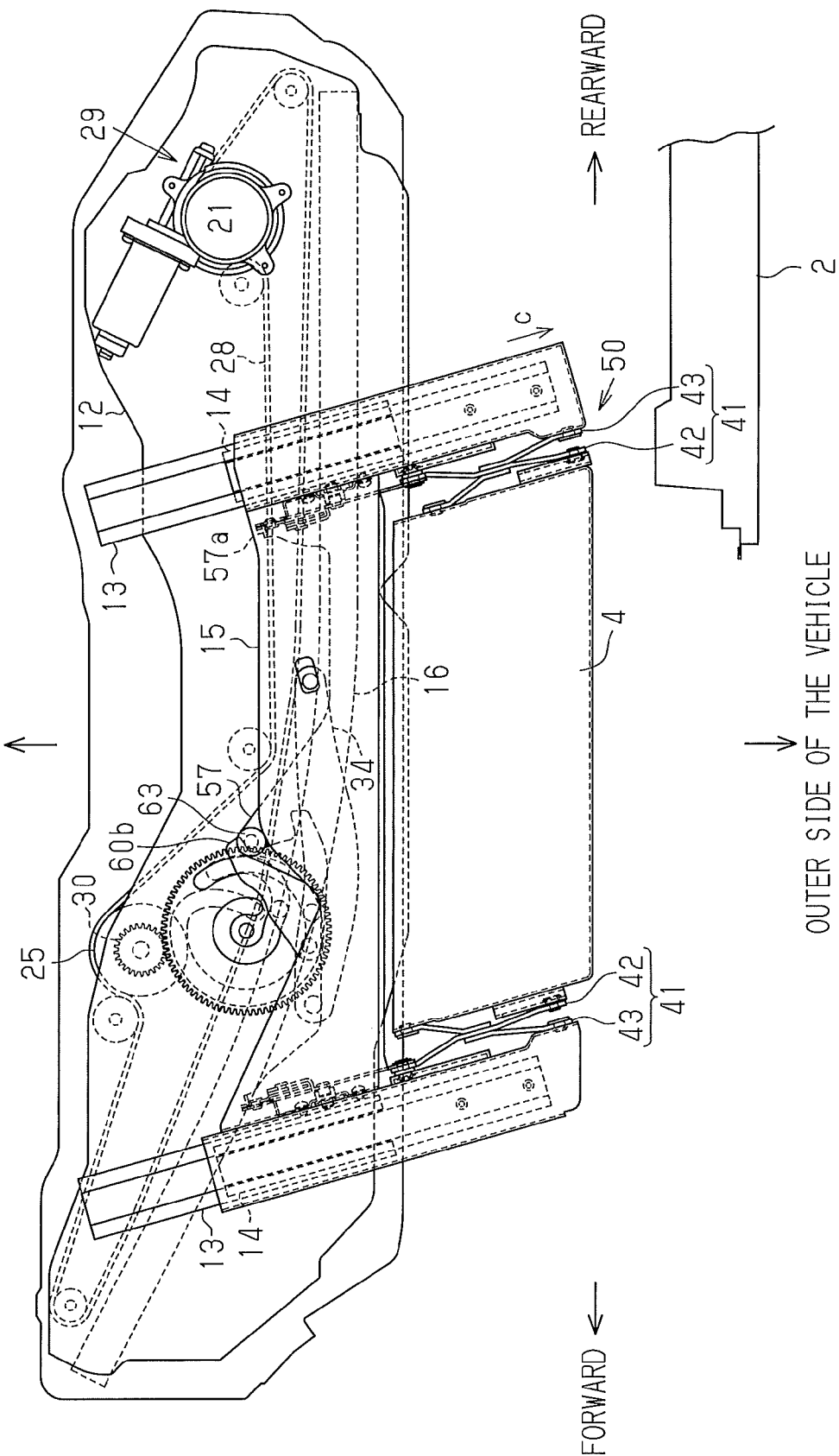
FIG. 20 is a plan view showing the vehicle step device shown in FIG. 17 in a state where a downward movement of the movable step is started.
Figure 21:
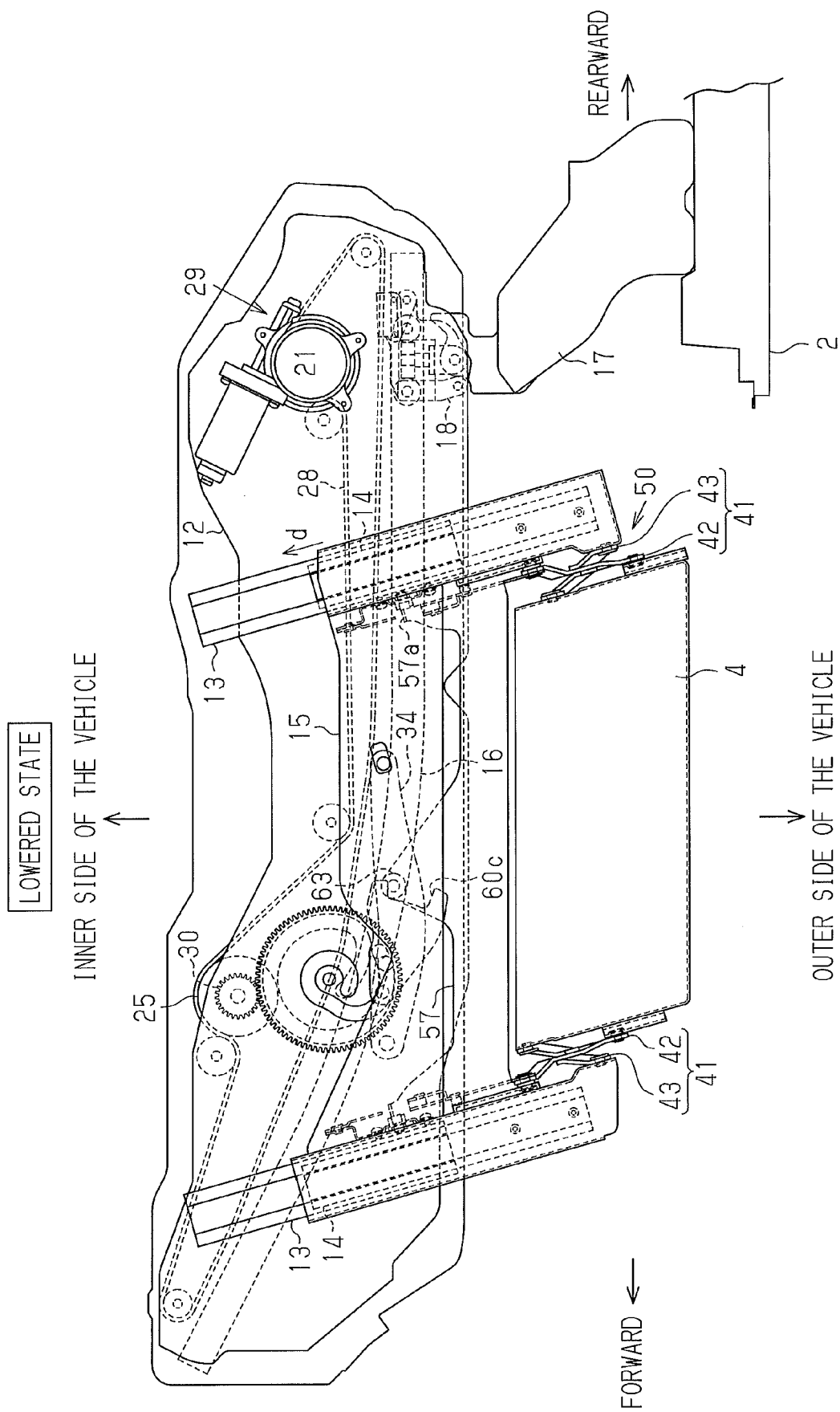
FIG. 21 is a plan view of the vehicle step device shown in FIG. 17 in a state where the movable step is lowered.
Figure 29:
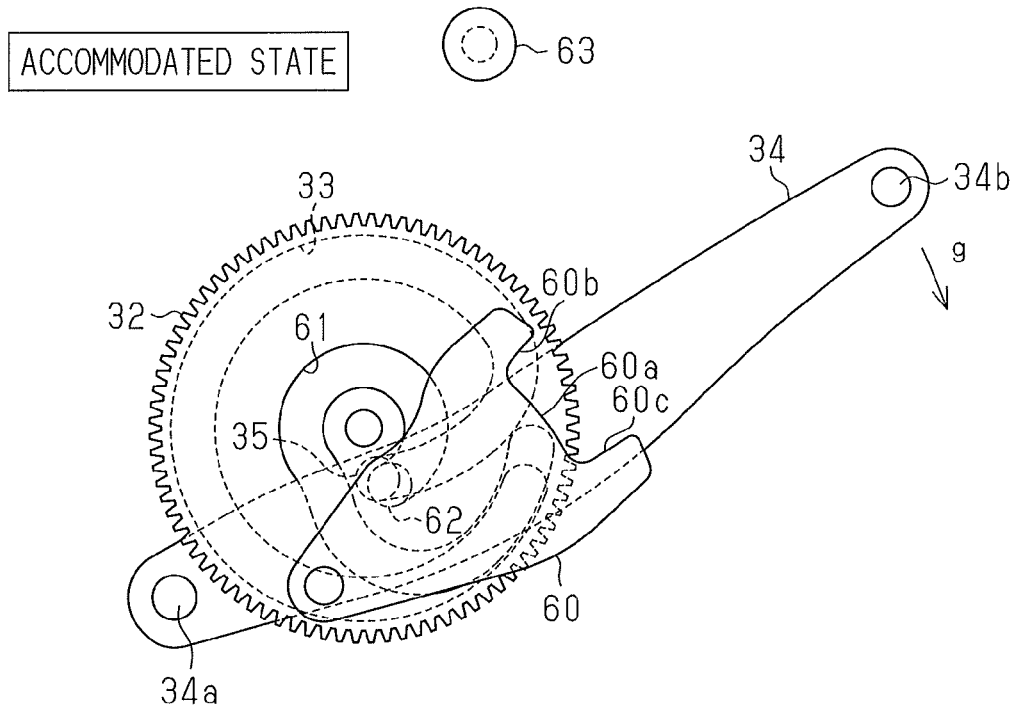
FIG. 29 is an enlarged plan view of cams and levers in the vehicle step device shown in FIG. 18.
Figure 30:
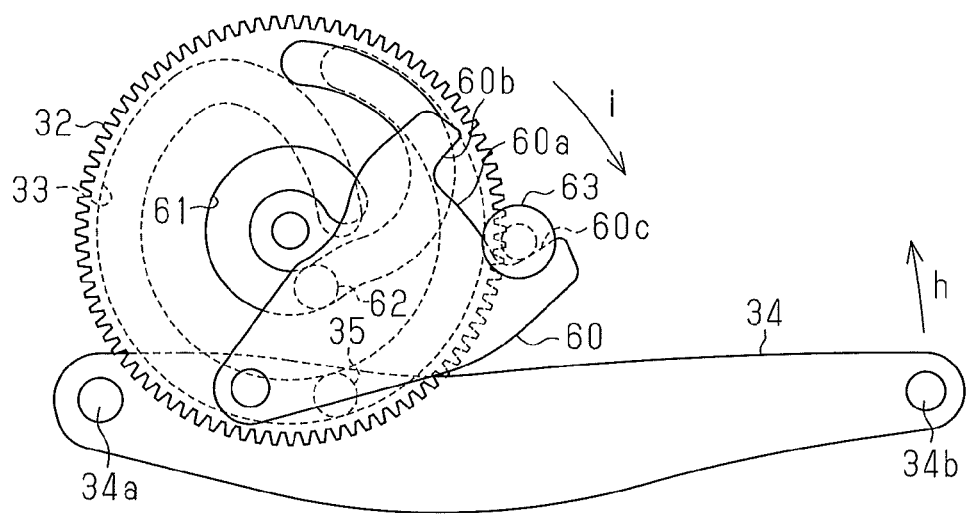
FIG. 30 is an enlarged plan view of the cams and the levers in the vehicle step device shown in FIG. 19.
Figure 31:
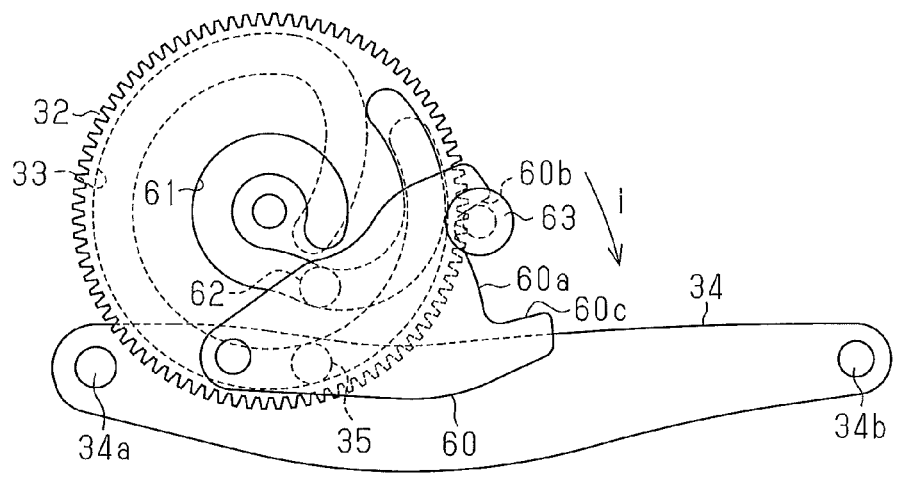
FIG. 31 is an enlarged plan view of the cams and the levers in the vehicle step device shown in FIG. 20.
Figure 32:
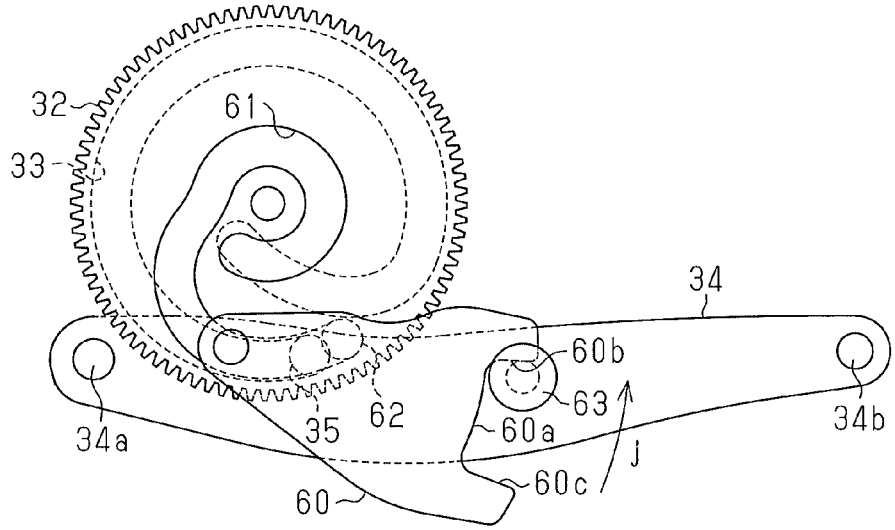
FIG. 32 is an enlarged plan view of the cams and the levers in the vehicle step device shown in FIG. 21.
Figure 33:
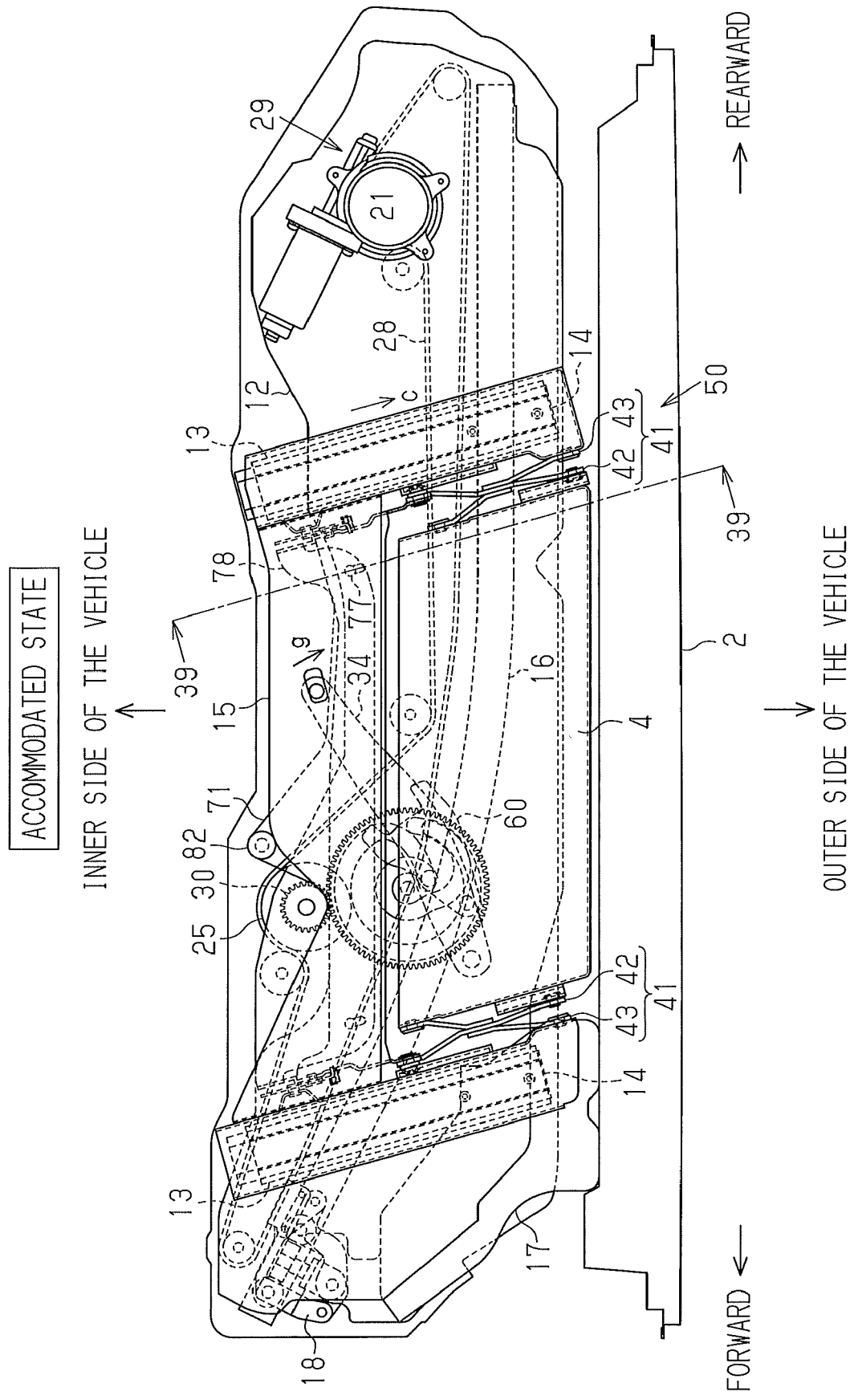
FIG. 33 is a plan view showing a vehicle step device according to a third embodiment of the present invention in a state where a movable step is retracted.
Figure 34:
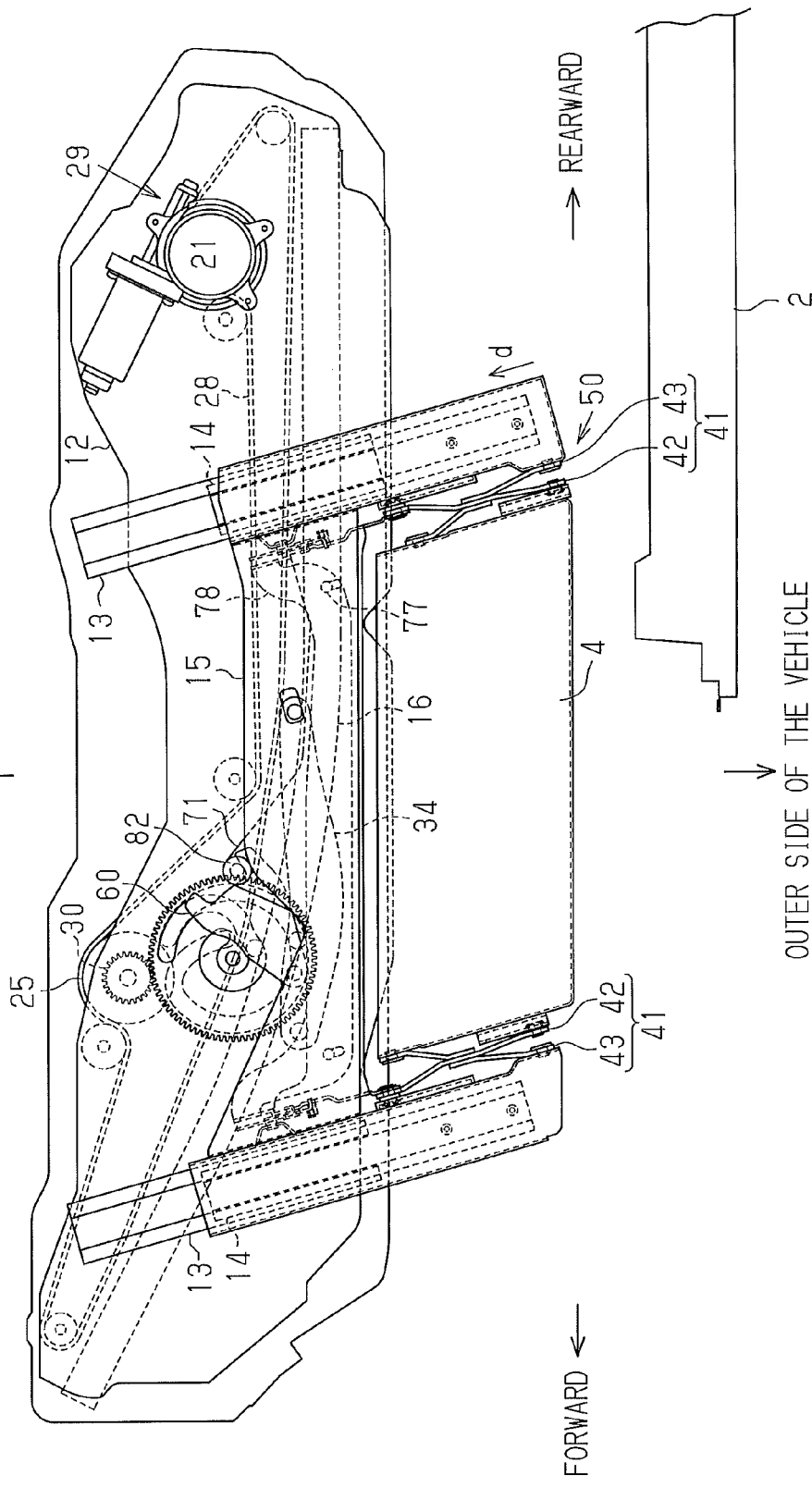
FIG. 34 is a plan view showing the vehicle step device shown in FIG. 33 in a first projecting state of the movable step.
Figure 35:
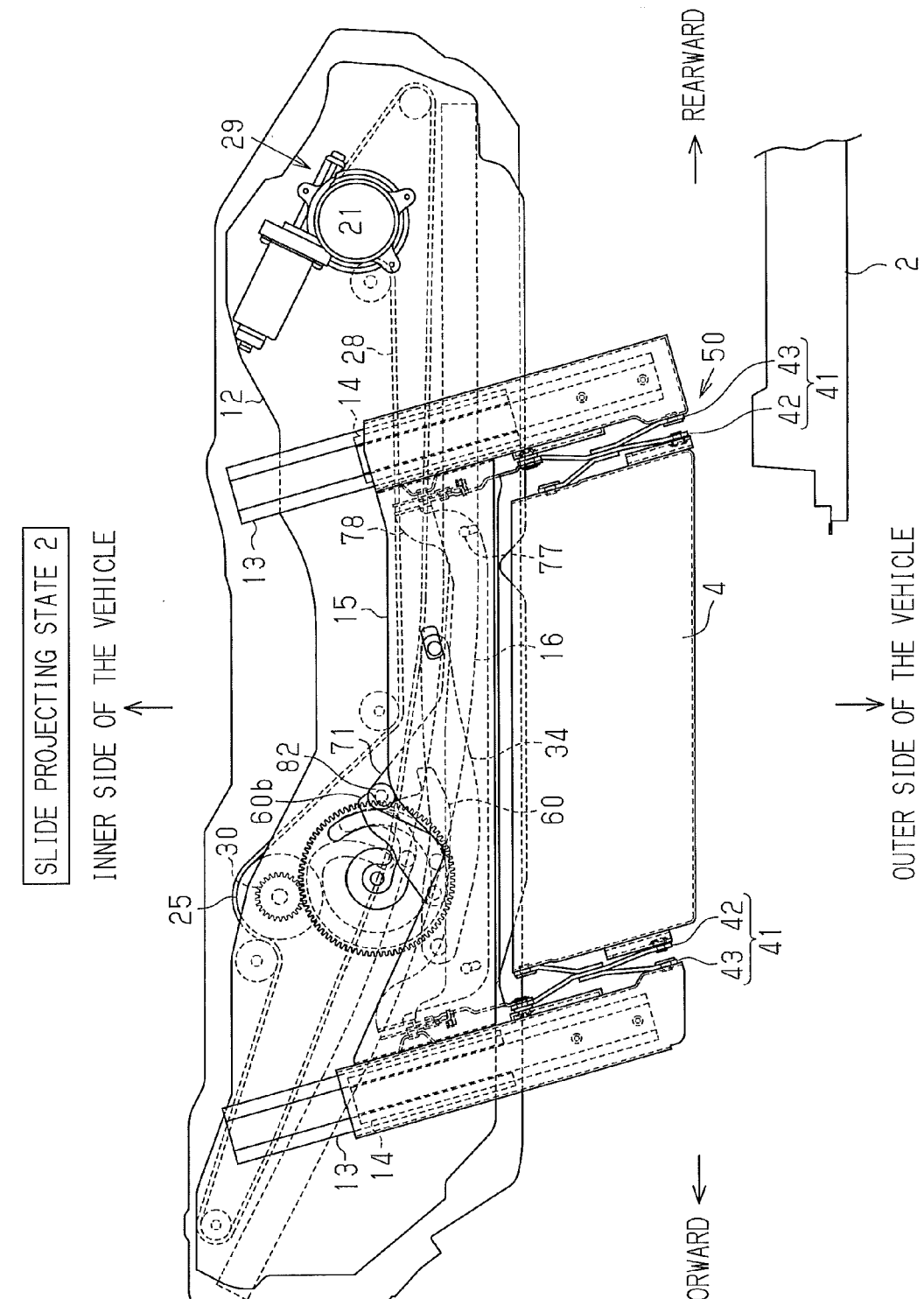
FIG. 35 is a plan view showing the vehicle step device shown in FIG. 33 in a second projecting state of the movable step.
Figure 36:
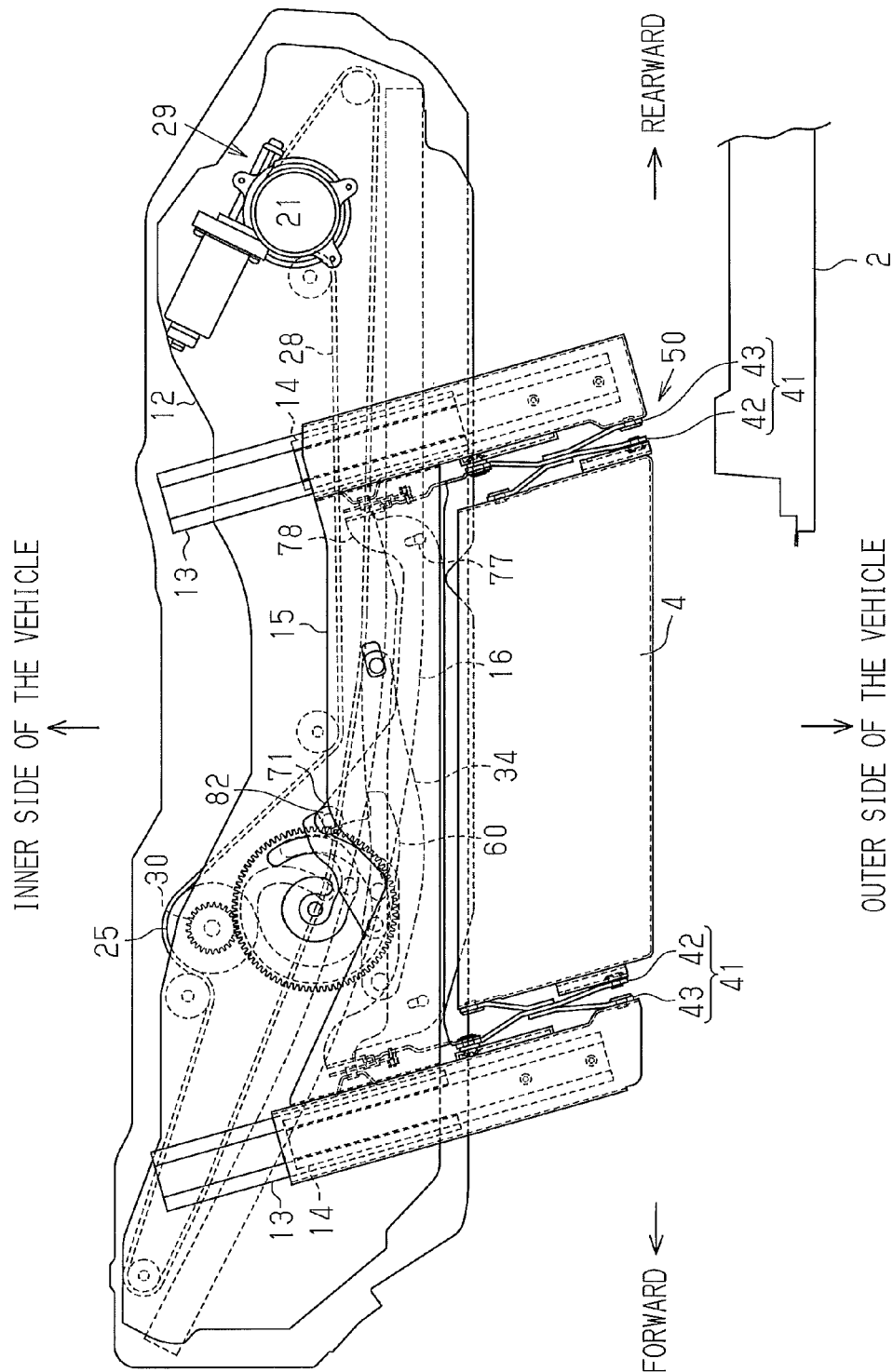
FIG. 36 is a plan view showing the vehicle step device shown in FIG. 33 in a state where the movable step is disconnected.
Figure 37:
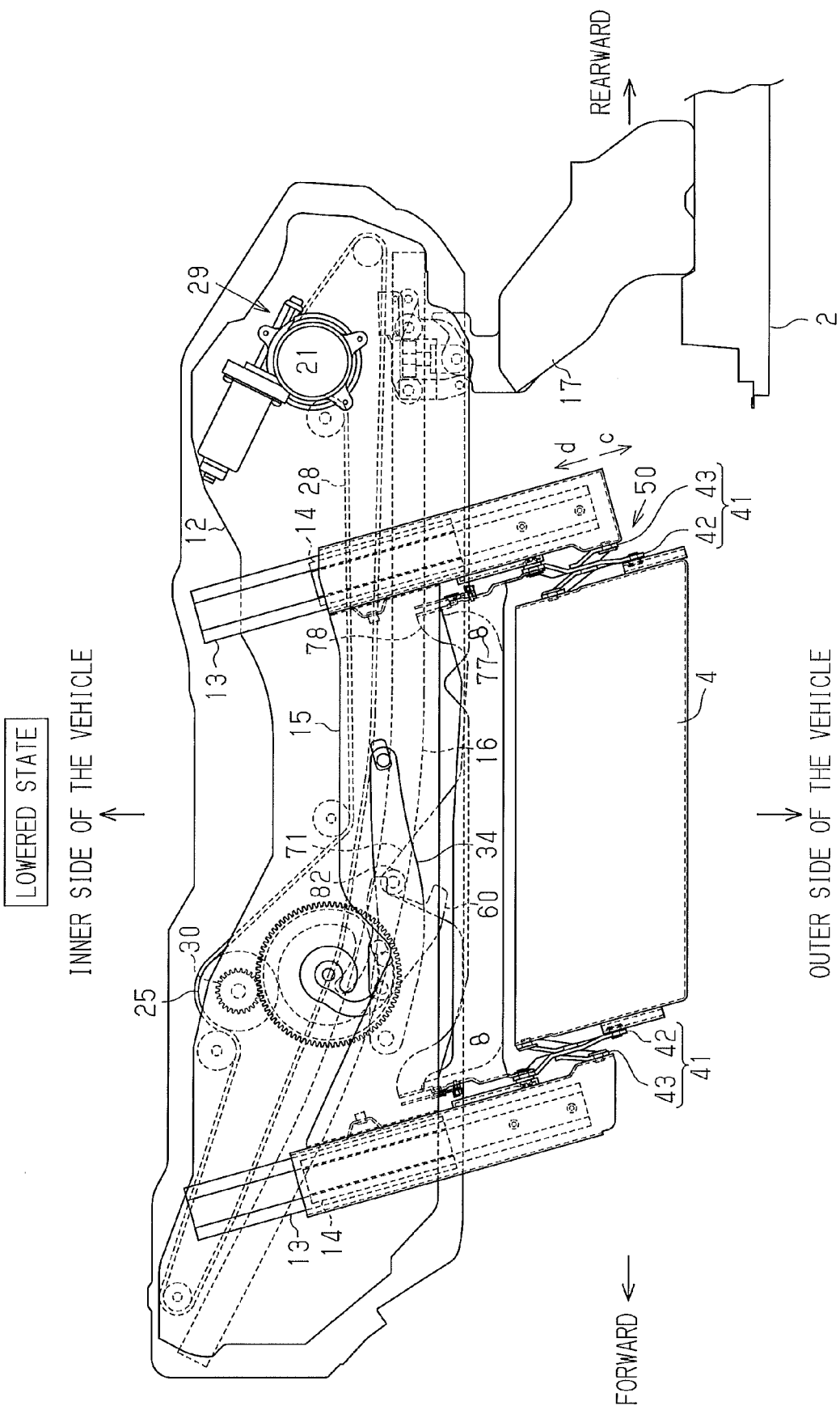
FIG. 37 is a plan view of the vehicle step device shown in FIG. 33 in a state where the movable step is lowered.

First, assume that the movable step 4 is in the accommodated state (see FIGS. 18, 24 and 29). When the slide lever 34 is rotated in the direction of arrow g from this state, the movable rails 14 are pushed and slid in the direction of arrow c. At this time, the movable step 4, which is mounted on the movable rails 14 through the X arms 41, also slides in the direction of arrow c. However, since the pin 58 provided on the vertically moving panel 57 is fitted to the U-grooved lock lever 51 provided on each movable rail 14, the first end 42a of the first arm 42 of the X arm 41, which is connected to the vertically moving panel 57, cannot move relative to the movable rail 14. Therefore, the movable step 4 is not lowered in the direction of arrow m by its own weight.

Figure 25:
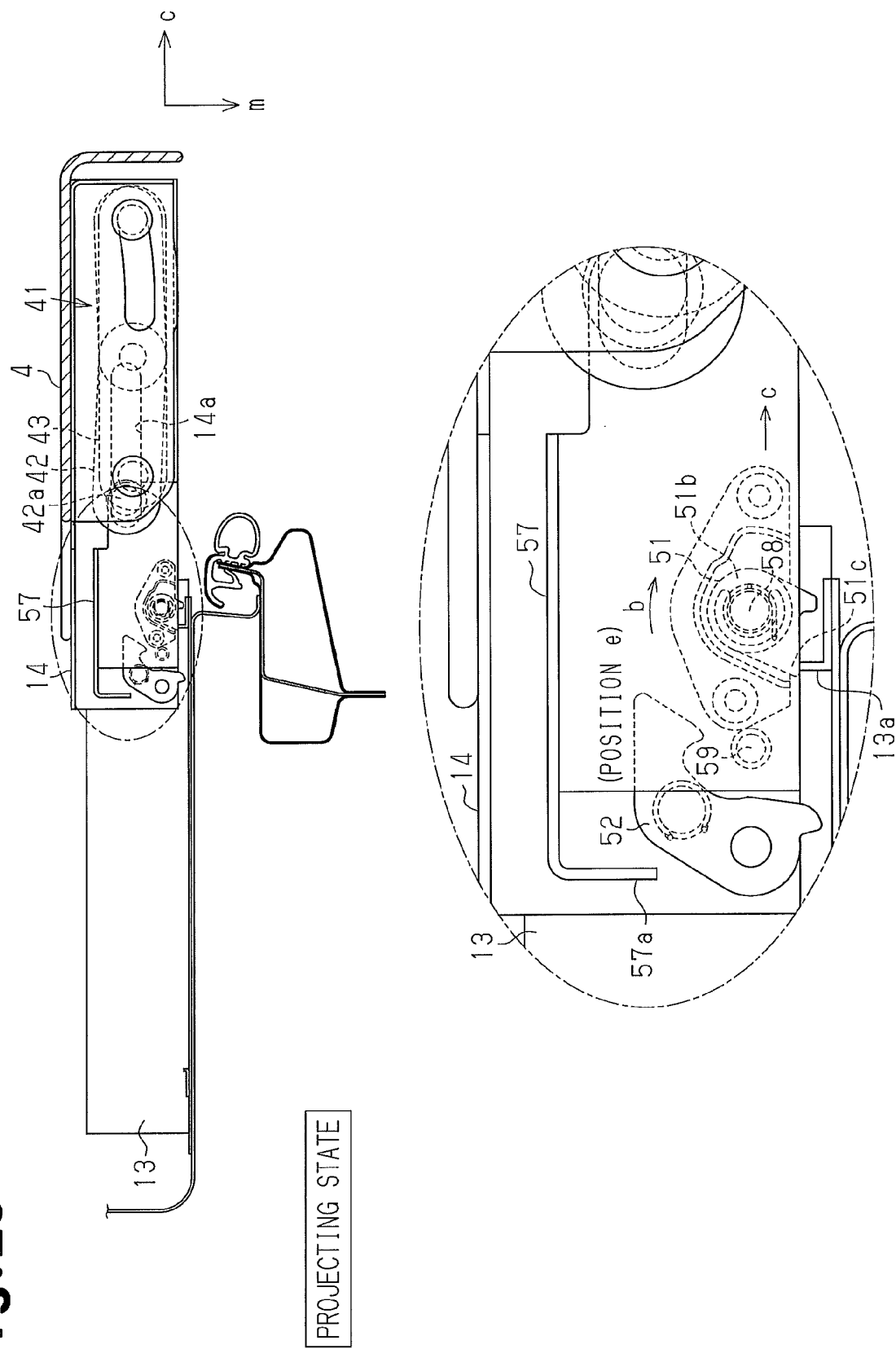
FIG. 25 is a cross-sectional view showing action of the vehicle step device shown in FIG. 17 and its enlarged view.
Figure 26:
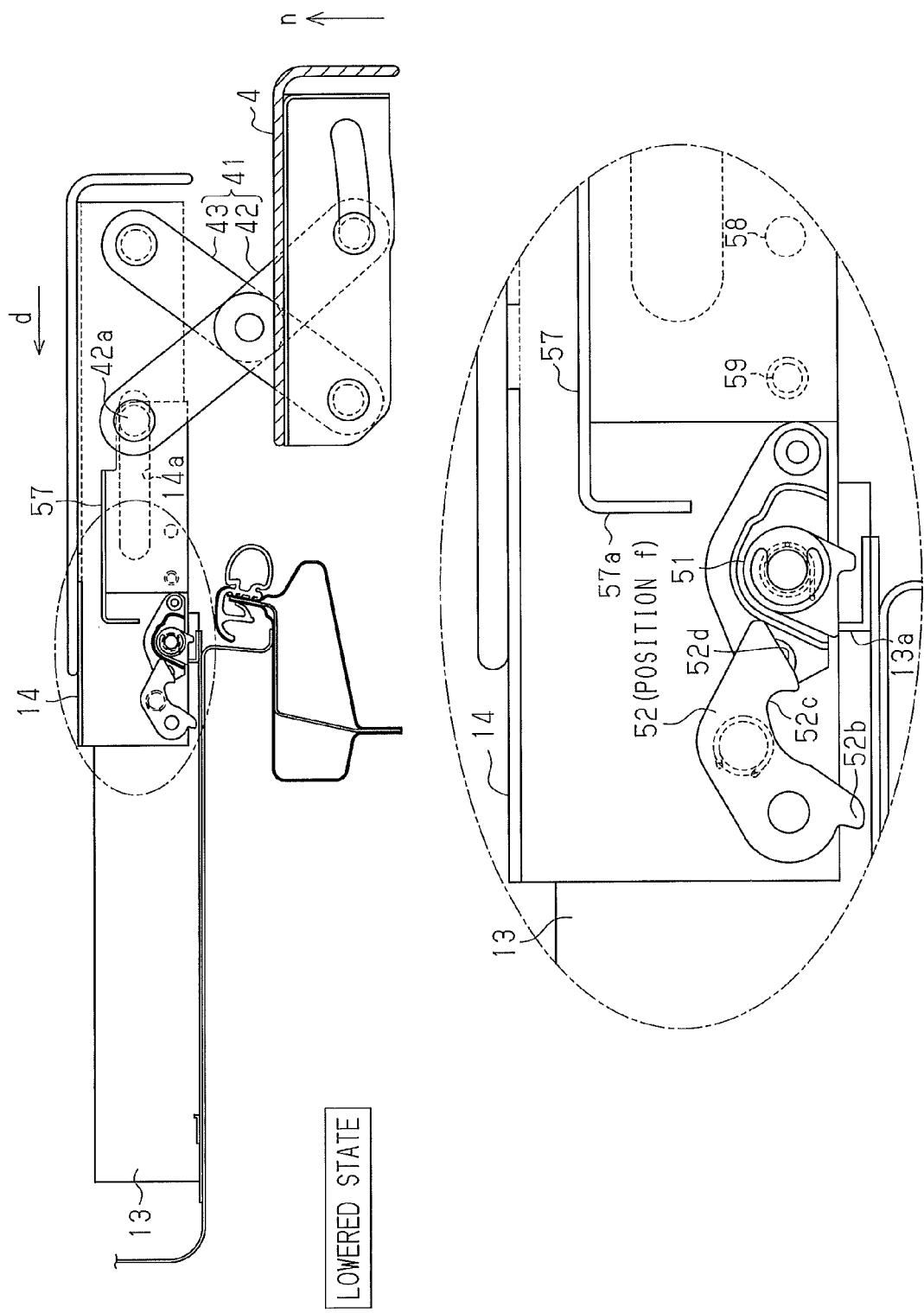
FIG. 26 is a cross-sectional view showing action of the vehicle step device shown in FIG. 17 and its enlarged view.
Figure 27:
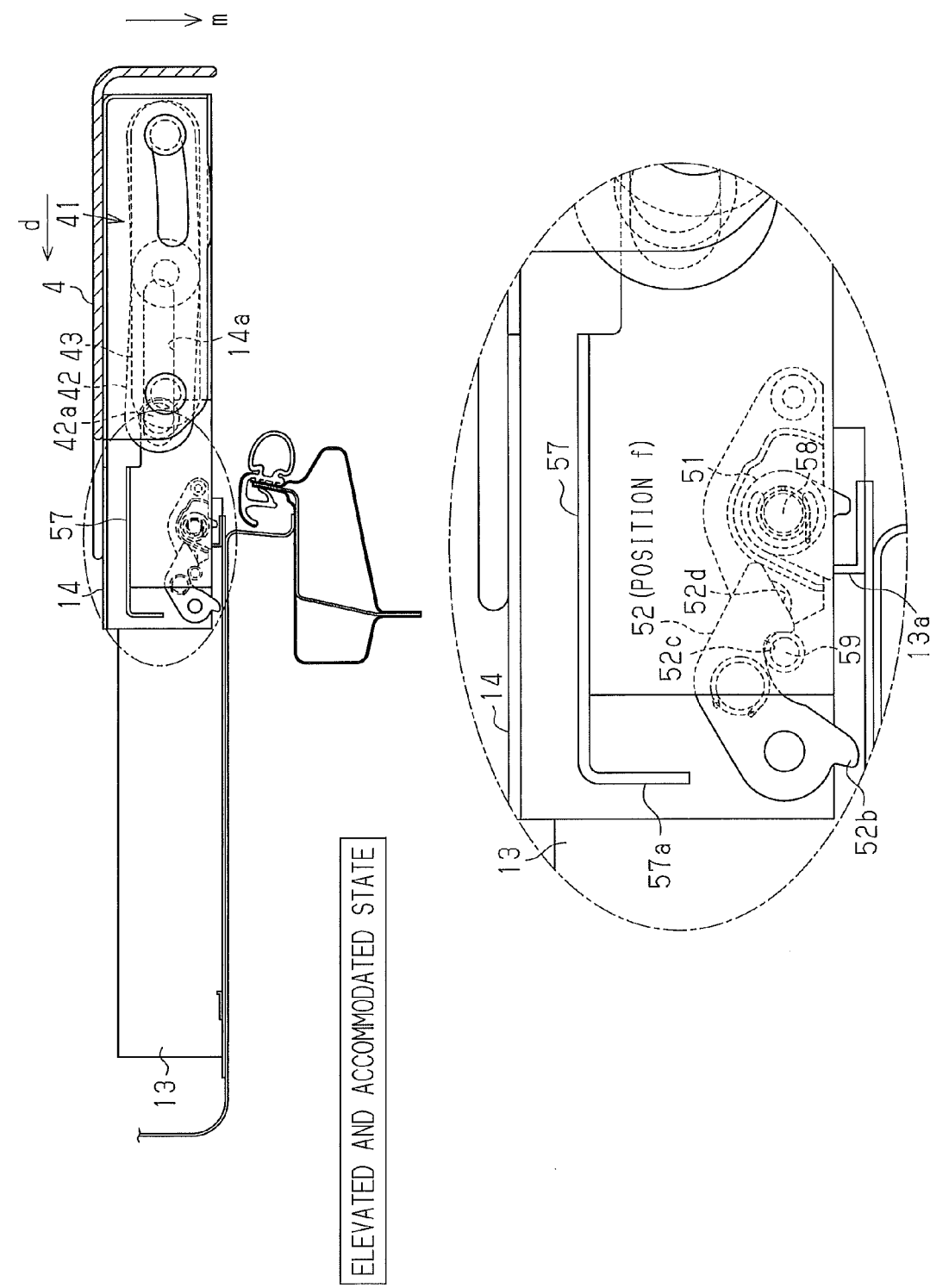
FIG. 27 is a cross-sectional view showing action of the vehicle step device shown in FIG. 17 and its enlarged view.

When the movable step 4 comes to the slide projecting position (see FIGS. 19, 25 and 30), the pawl 51c is pushed by the lever 13a and rotates in the direction of arrow b, the U-shaped opening 51b is directed to the direction of arrow c, and the pin 58 is brought into a state where the pin 58 can move in the direction of arrow c (see FIG. 25). At this time, the pin 63 provided on the vertically moving panel 57 enters the recess 60a of the vertically moving lever 60 (see FIG. 30). At the same time, the vertically moving lever 60 starts rotating in the direction of arrow i by the groove cam 61. The bush 35 enters the second recess 33b from the first recess 33a of the groove cam 33. With this, the slide lever 34 is held at this position.

Next, when the movable step 4 comes to a lowering-starting position (see FIGS. 20, 25 and 31), the pawl 60b pushes the pin 63 in the direction of arrow i. The vertically moving panel 57 moves in the direction of arrow c relative to the movable rails 14 such that the first end 42a of the first arm 42 of the X arms 41 moves in the elongated hole 14a in the direction of arrow c. At this time, the movable step 4 is lowered to the descent position (see FIG. 26) in the direction of arrow m. When the pawl 57a of the vertically moving panel 57 pushes the one side 52a of the hook 52, the hook 52 rotates from the position e (see FIG. 25) to the position f (see FIG. 26).

On the other hand, since a force is not applied to the pin 63 at the initial stage, the movable step 4 does not move when the vertically moving lever 60 rotates in the direction of arrow j from the lowered state (see FIGS. 21, 26 and 32) of the movable step 4. Thereafter, since the movable rails 14 are held by the slide lever 34, the vertically moving panel 57 moves in the direction of arrow d relative to the movable rails 14 when the pawl 60c starts pushing the pin 63 in the direction of arrow j. The first end 42a of the first arm 42 of the X arm 41 moves in the elongated hole 14a in the direction of arrow d, and the movable step 4 starts moving upward in the direction of arrow n.

When the vertically moving panel 57 moves in the direction of arrow d relative to the movable rails 14 and comes to the elevated and accommodated position (see FIG. 27), the pin 58 is accommodated in the U-grooved lock lever 51. The pin 59 abuts against a slanting surface 52d of the hook 52, and the pin 59 returns to a position where the pin 59 is fitted to the accommodating portion 52c of the hook 52 while pushing up the hook 52 toward the position e. At this time, the hook 52 is pushed up toward the position e but is not pushed up to such a level that the hook 52 returns to the position e. Therefore, when the pin 59 enters the accommodating portion 52c, the hook 52 is returned to the position f by the spring 56.

Next, when the slide lever 34 rotates in the direction of arrow h in the elevated and accommodated state of the movable step 4 (see FIGS. 19, 27 and 30), the movable rails 14 are pushed and slid in the direction of arrow d. At this time, the movable step 4 mounted on the movable rails 14 through the X arms 41 also slides in the direction of arrow d. However, since the pin 59 provided on the vertically moving panel 57 is fitted to the hook 52 provided on each movable rail 14, the first end 42a of the first arm 42 of each X arm 41 connected to the vertically moving panel 57 cannot move relative to the movable rail 14. Thus, the movable step 4 does not move downward in the direction of arrow m by its own weight. The U-grooved lock lever 51 separates away from the lever 13a, which has rotated the U-grooved lock lever 51 from the elevated and accommodated position in the direction of arrow b. Therefore, the U-grooved lock lever 51 is rotated by the spring 53 in the direction of arrow a, and the U-shaped opening 51b is directed in the direction of arrow n (see FIG. 24).

When the movable step 4 returns to the accommodated state (see FIGS. 24 and 28), the pawl 52b and the lever 13b abut against each other and the hook 52 rotates from the position f to the position e.

As described above in detail, according to the present embodiment, the following advantages can be obtained in addition to the advantages (1) to (3) and (5) of the first embodiment.

(1) In the present embodiment, the lock mechanism (lock lever 51, the hook 52 and the like), which connects and disconnects the movable rails 14 and the vertically moving panel 57 with and from each other, is provided. With this, it becomes unnecessary to operate the vertically moving lever 60 when the movable rails 14 (movable step 4) slide and project, and the vertically moving lever 60 can further be reduced in length (size).

(2) Especially, since it is possible to control the operation of the lock mechanism using the mechanical linkage structure, the system configuration can be simplified as compared with an electrically controlled lock mechanism.

Third Embodiment

A third embodiment according to the present invention will be described below based on FIGS. 33 to 49. In the third embodiment, as a lock mechanism that connects and disconnects the movable rails 14 and the vertically moving panel with and from each other, a structure that is different from that of the second embodiment is employed. Therefore, in the third embodiment, detailed explanation of the same portions as those of the second embodiment will be omitted.

Figure 38:
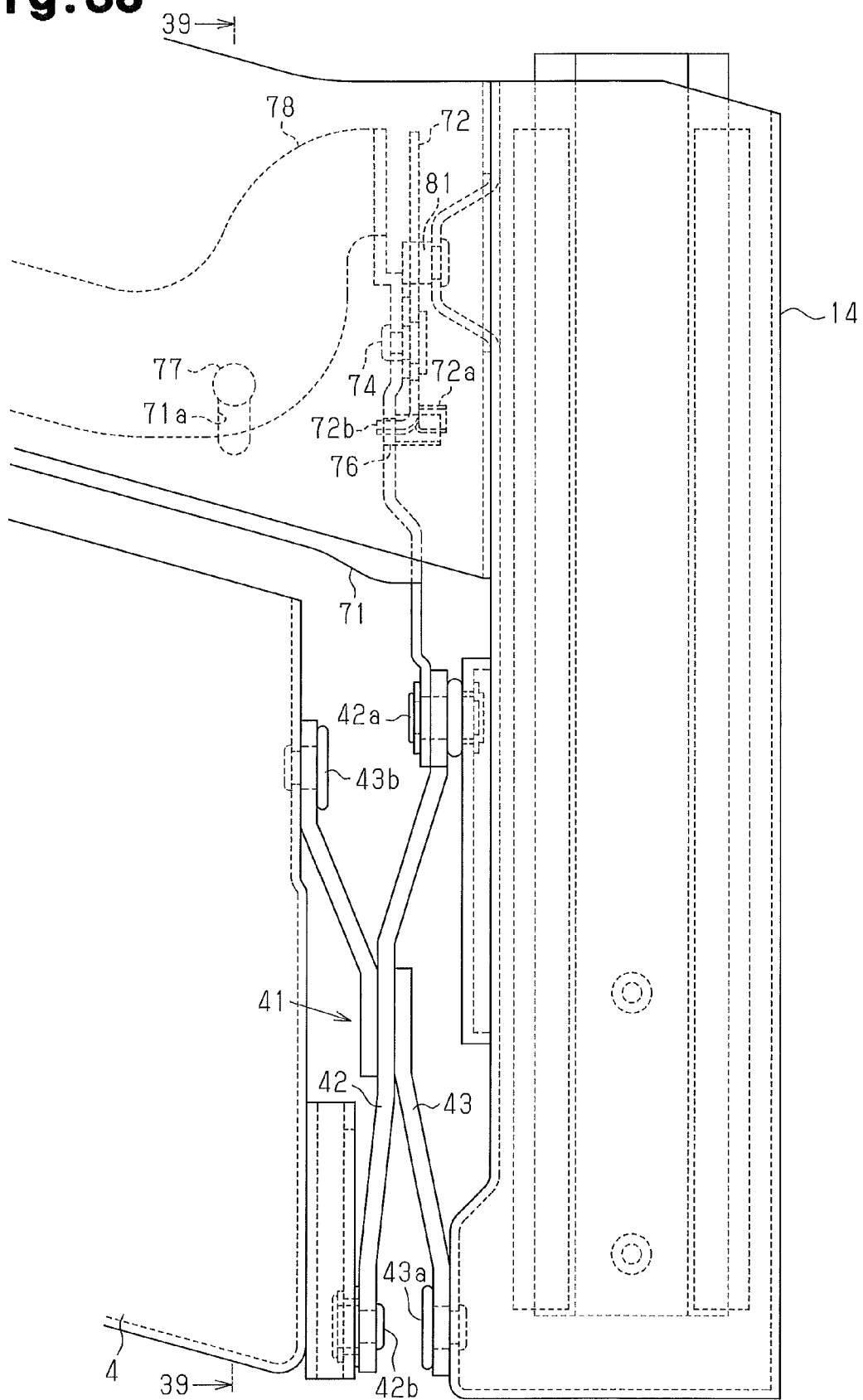
FIG. 38 is an enlarged view of FIG. 33.
Figure 39:
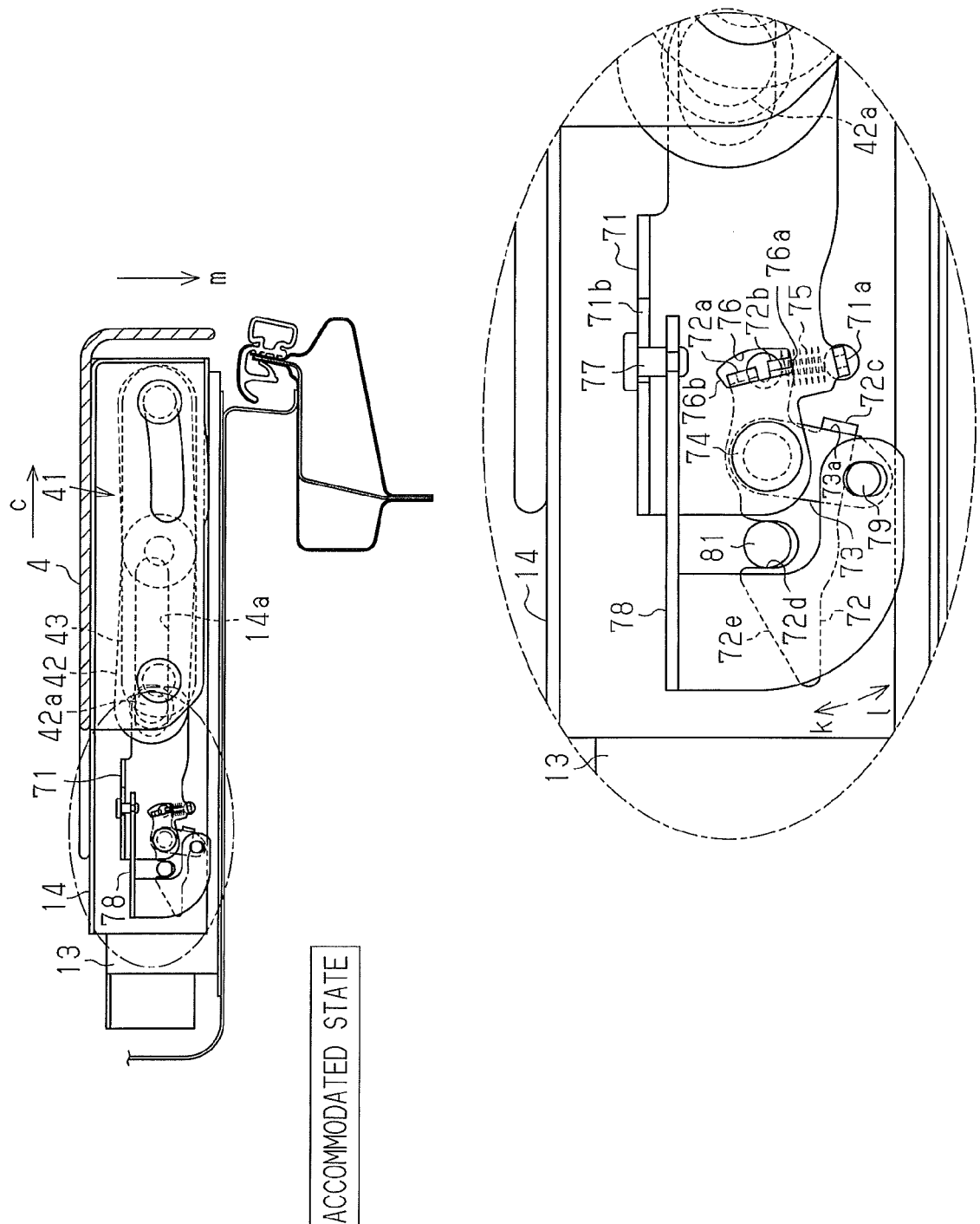
FIG. 39 is a cross-sectional view showing action of the vehicle step device shown in FIG. 33 and its enlarged view.
Figure 40:
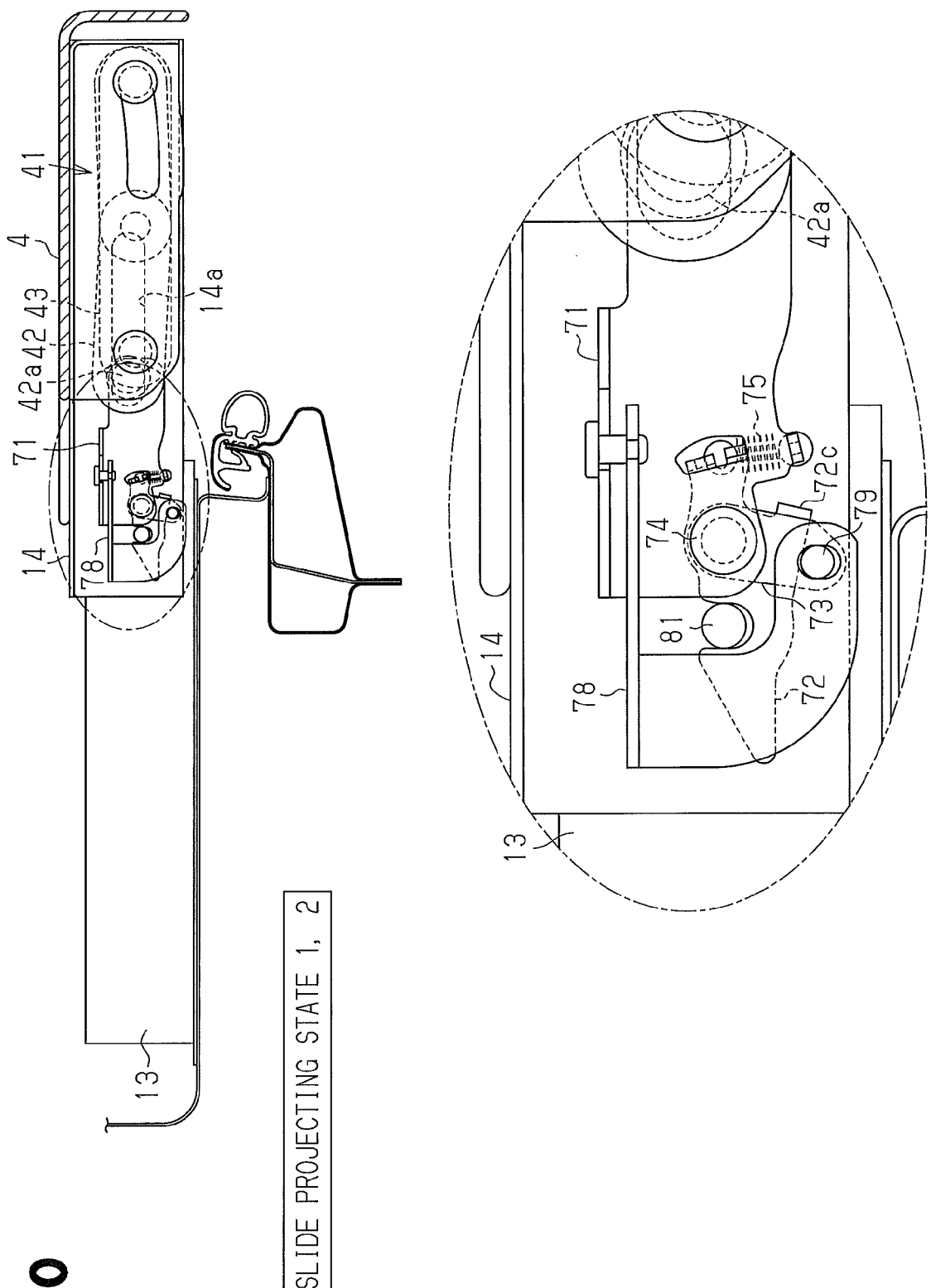
FIG. 40 is a cross-sectional view showing action of the vehicle step device shown in FIG. 33 and its enlarged view.
Figure 41:
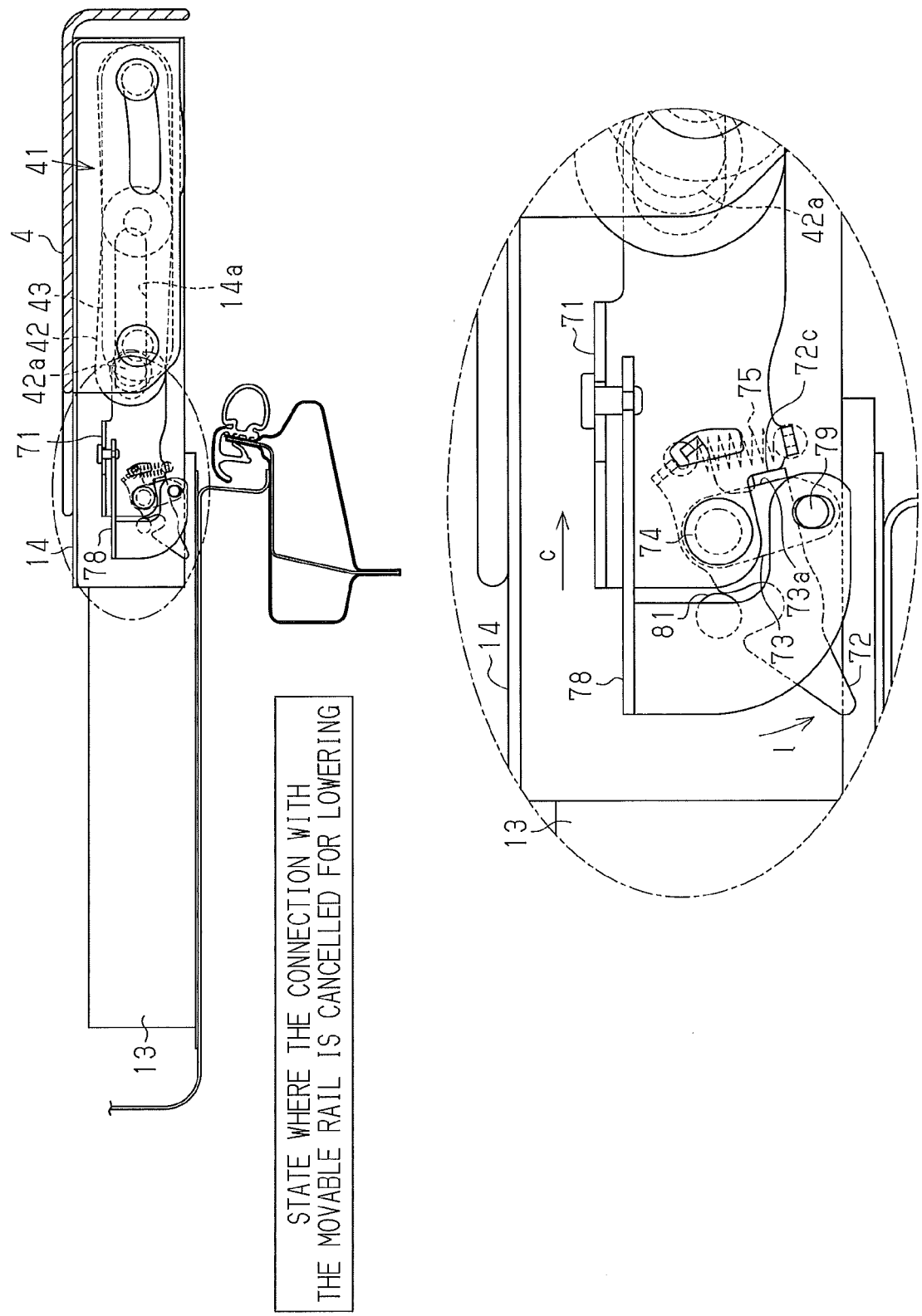
FIG. 41 is a cross-sectional view showing action of the vehicle step device shown in FIG. 33 and its enlarged view.
Figure 42:
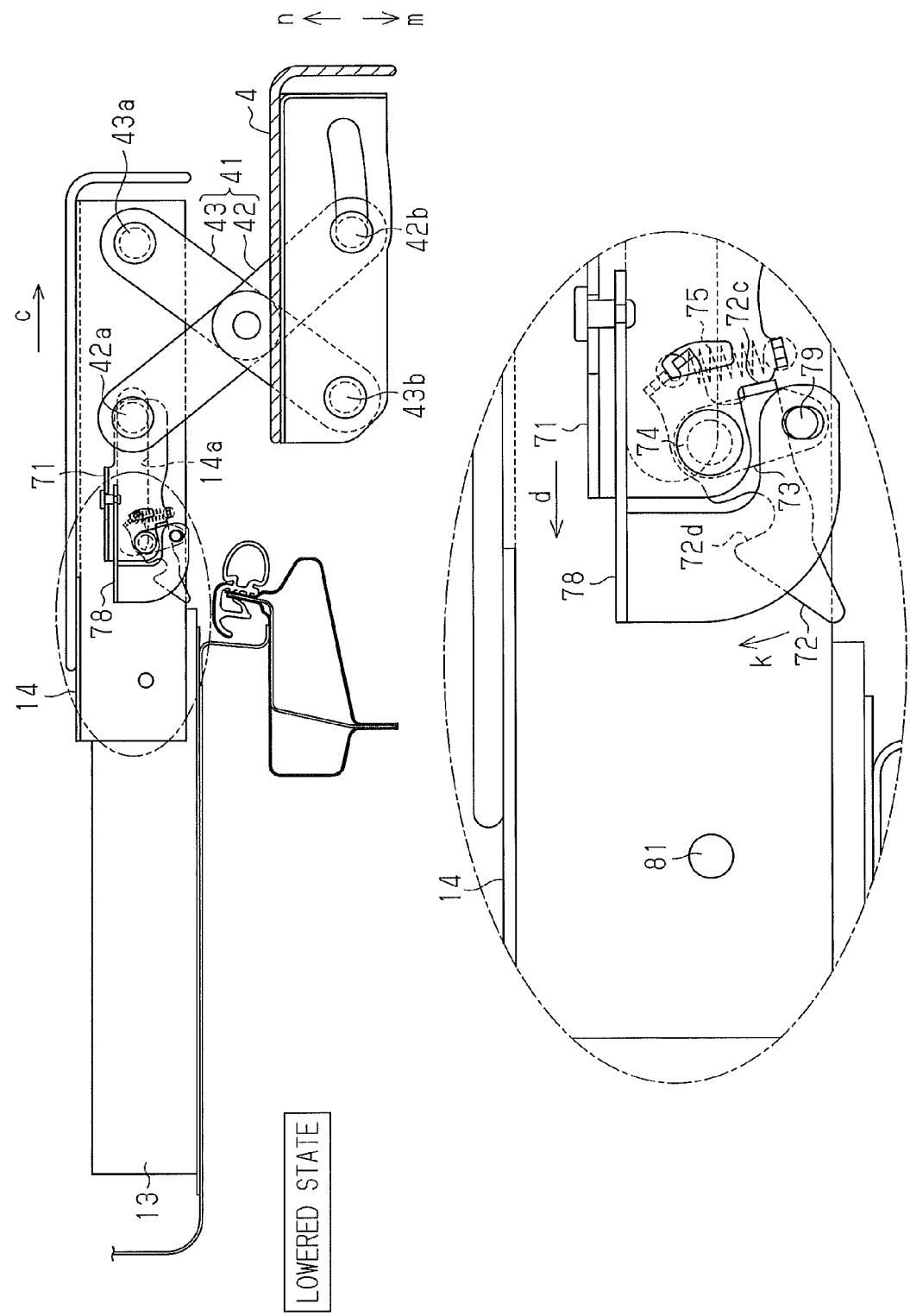
FIG. 42 is a cross-sectional view showing action of the vehicle step device shown in FIG. 33 and its enlarged view.
Figure 43:
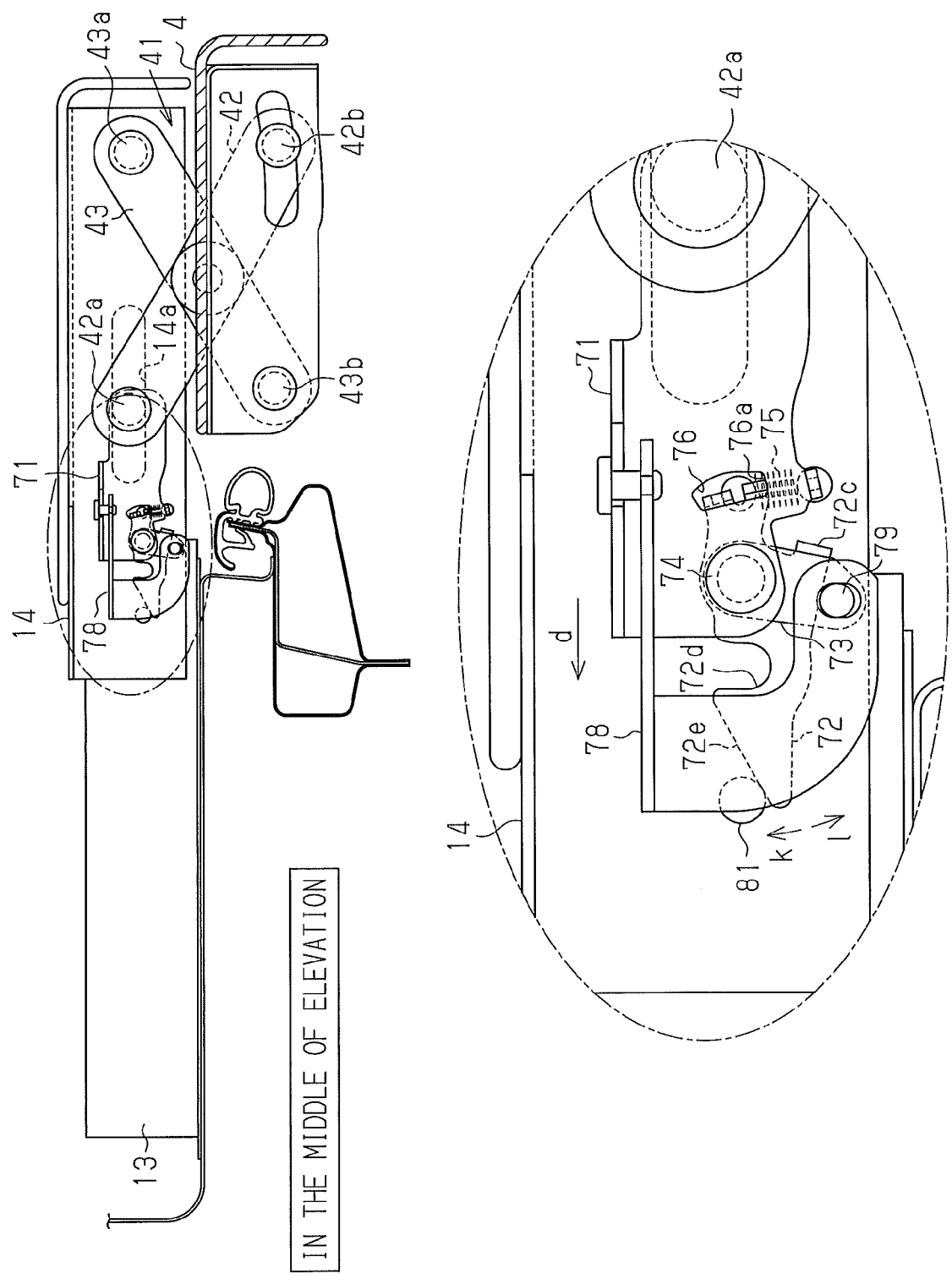
FIG. 43 is a cross-sectional view showing action of the vehicle step device shown in FIG. 33 and its enlarged view.
Figure 44:
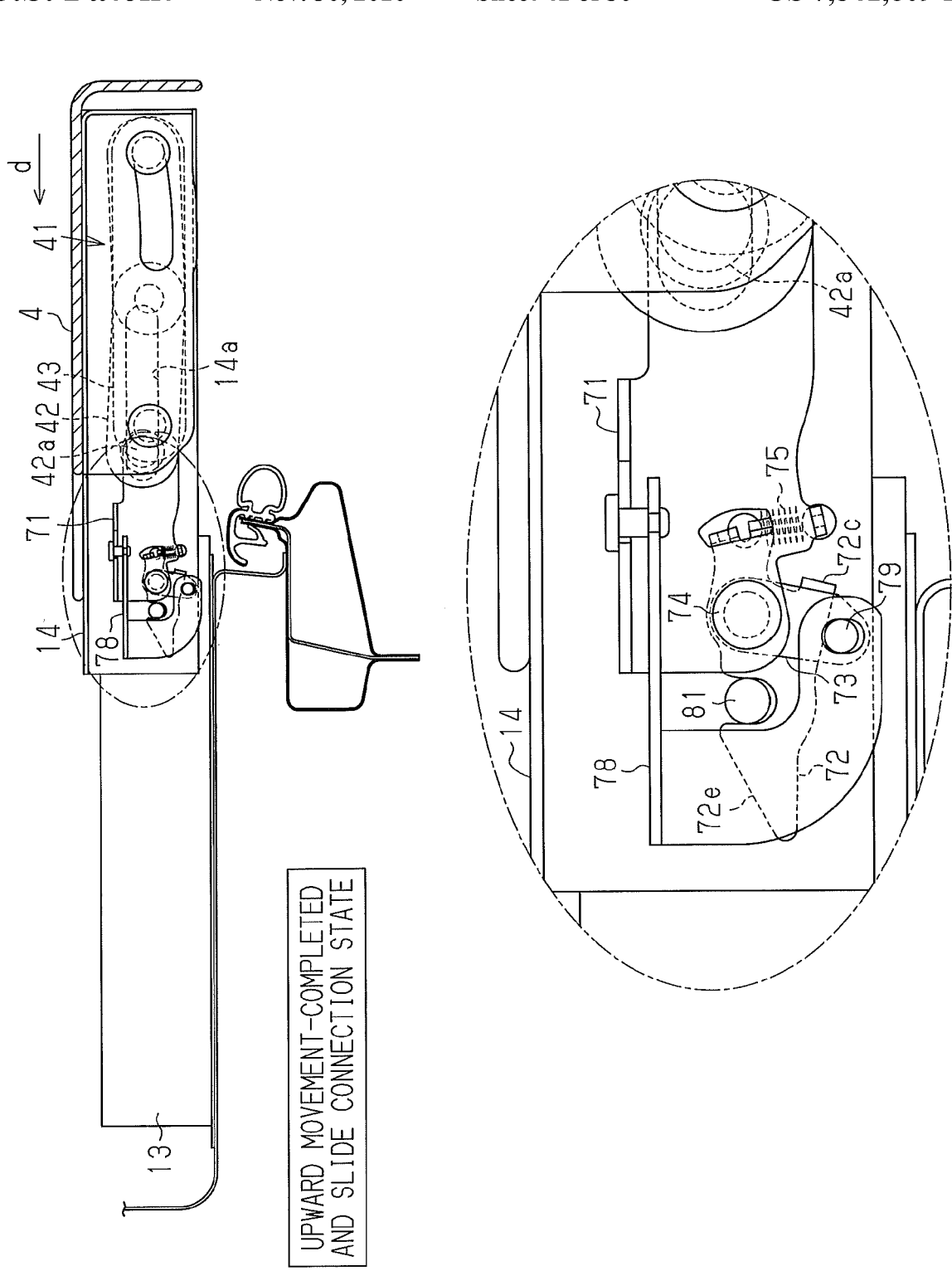
FIG. 44 is a cross-sectional view showing action of the vehicle step device shown in FIG. 33 and its enlarged view.
Figure 45:
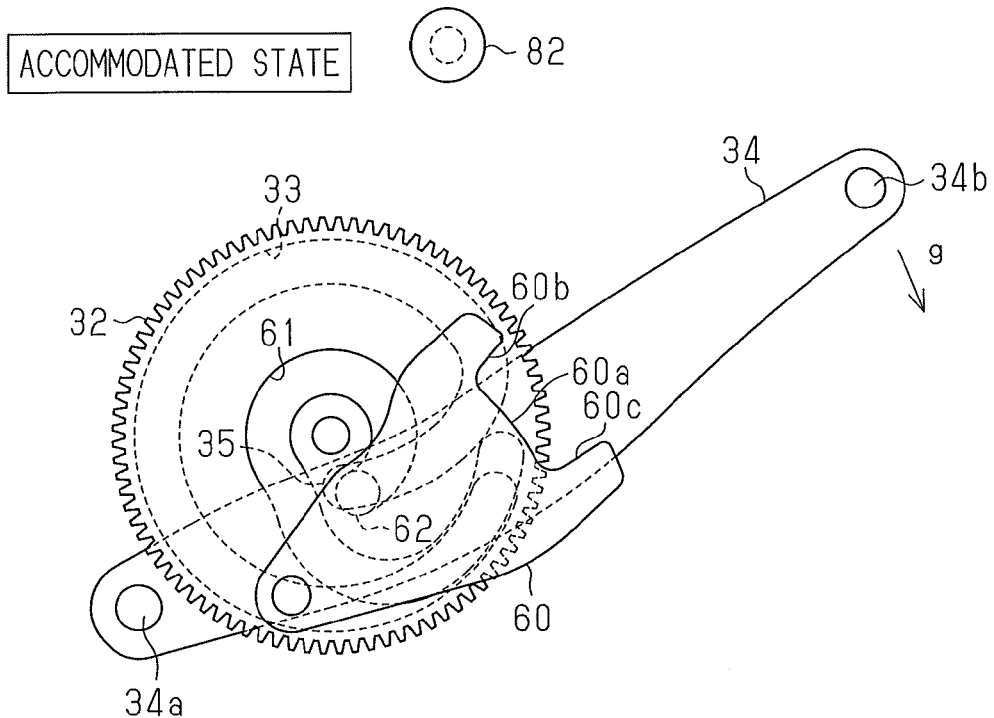
FIG. 45 is an enlarged plan view of cams and levers in the vehicle step device shown in FIG. 33.
Figure 46:
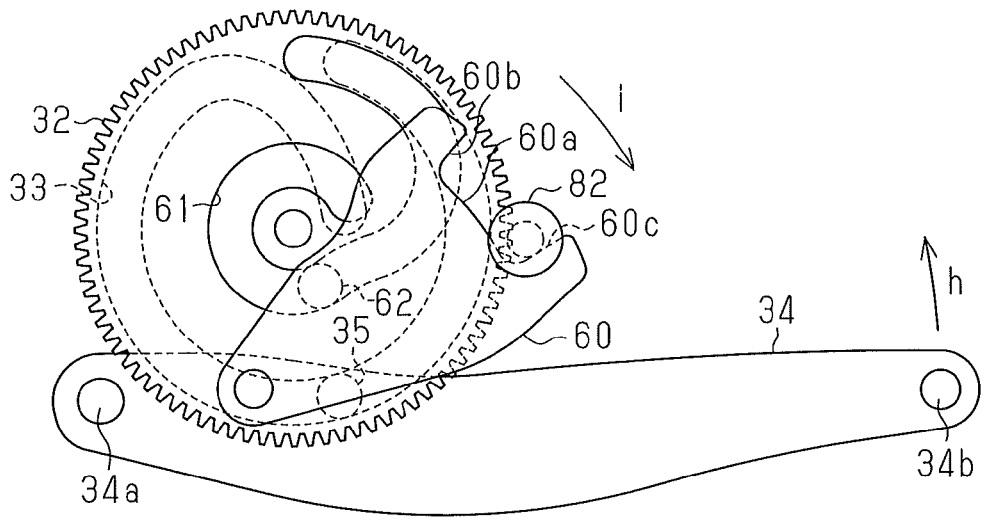
FIG. 46 is an enlarged plan view of the cams and the levers in the vehicle step device shown in FIG. 34.
Figure 47:
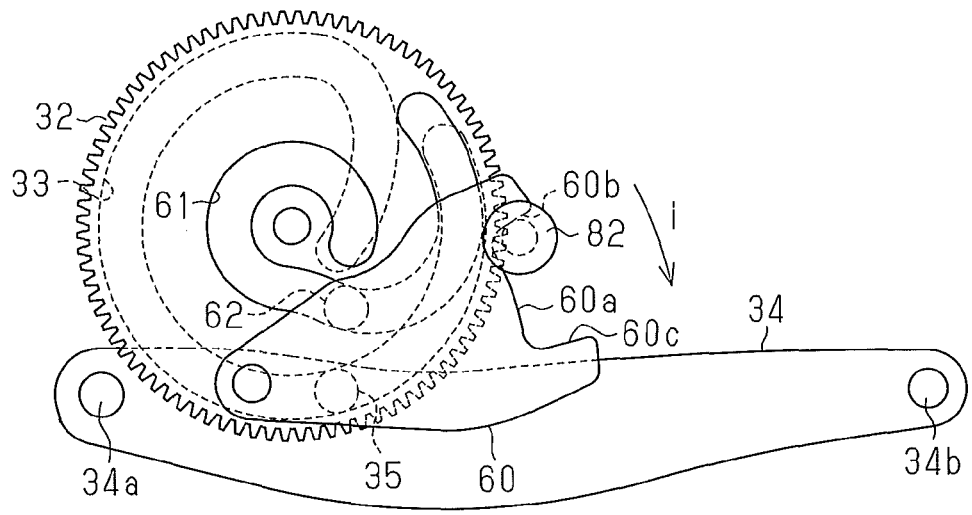
FIG. 47 is an enlarged plan view of the cams and the levers in the vehicle step device shown in FIG. 35.
Figure 48:
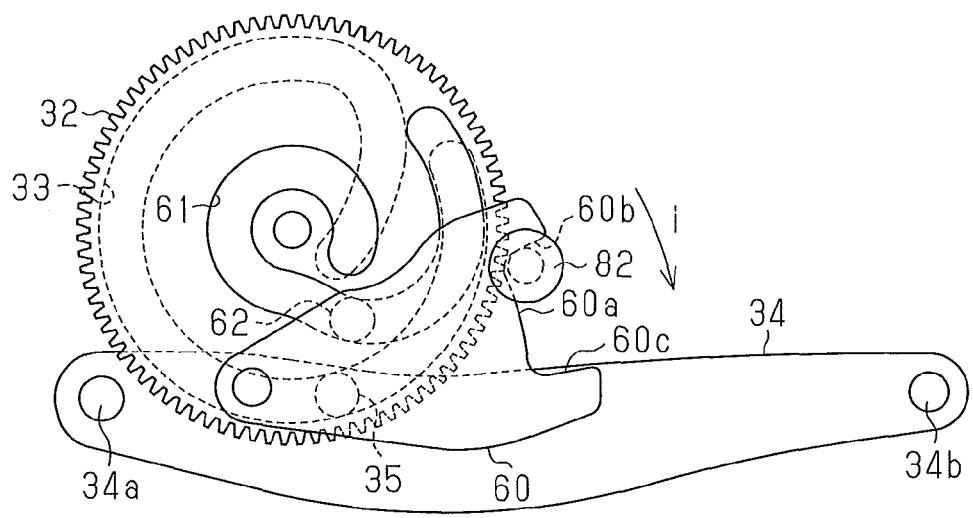
FIG. 48 is an enlarged plan view of the cams and the levers in the vehicle step device shown in FIG. 36.
Figure 49:
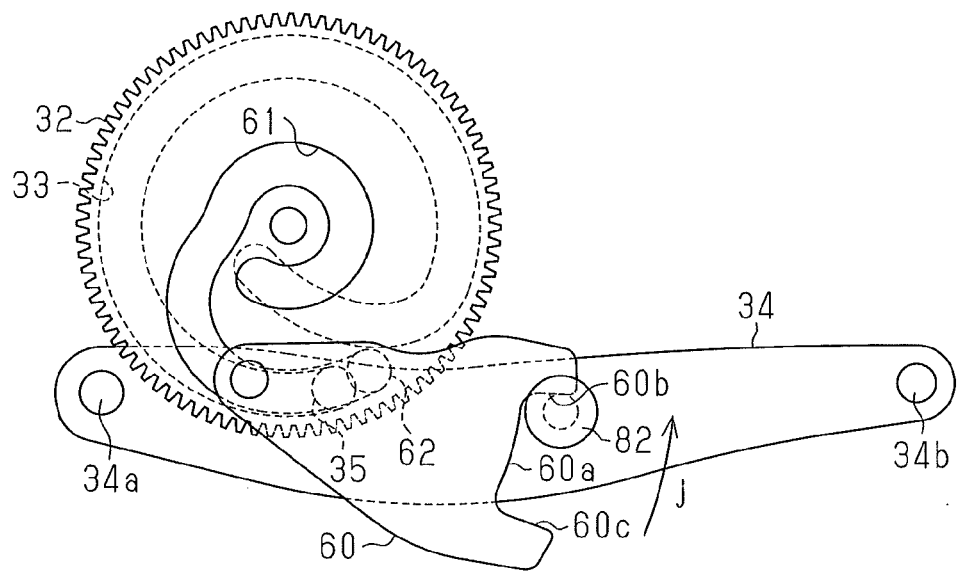
FIG. 49 is an enlarged plan view of the cams and the levers in the vehicle step device shown in FIG. 37.

As shown in FIGS. 38 and 39, in the present embodiment, a hook 72 and a lever 73 are rotatably connected to a shaft 74 on a side surface of a vertically moving panel 71 that integrally connects both X arms 41 with each other. A spring 75 is assembled between a pawl 72a and a pawl 71a of the vertically moving panel 71, and the spring 75 applies to the hook 72 a force for rotating the hook 72 in the direction of arrow k. A position of the hook 72 in its rotation direction is determined such that a pawl 72b of the hook 72 is fitted into an elongated hole 76 formed in a side surface of the vertically moving panel 71. The hook 72 and the lever 73 are in contact with each other at a pawl 72c and one side 73a.

An operation panel 78 is connected to the vertically moving panel 71 by fitting a pin 77 mounted on the operation panel 78 into an elongated hole 71b of the vertically moving panel 71. The operation panel 78 is connected also to the lever 73 by a pin 79.

A pin 81 is provided on a side surface of each movable rail 14 at a location where the pin 81 is fitted into a groove 72d of the hook 72 when the movable step 4 is at the same height as the movable rails 14. A pin 82 (see FIG. 33) that is connected to or disconnected from the vertically moving lever 60 is provided on the operation panel 78.

Here, action of the present embodiment will be described.

First, assume that the movable step 4 is in its accommodated state (see FIGS. 33, 38, 39 and 45). When the slide lever 34 is rotated in the direction of arrow g from this state, the movable rails 14 are pushed and slid in the direction of arrow c. The movable step 4 that is connected to the movable rails 14 through the X arm 41 also slides in the direction of arrow c. However, since the hook 72 provided on the vertically moving panel 71 is fitted to the pin 81 provided on the side surface of each movable rail 14, the first end 42a of the first arm 42 of each X arm 41 connected to the vertically moving panel 71 cannot move relative to the movable rail 14. Therefore, the movable step 4 does not move downward in the direction of arrow m by its own weight.

When the movable step 4 comes to a first slide projection position (see FIGS. 34, 40 and 46), the pin 82 provided on the operation panel 78 enters the recess 60a in the vertically moving lever 60. At the same time, the vertically moving lever 60 starts rotating in the direction of arrow i by the groove cam 61. The bush 35 enters the second recess 33b from the first recess 33a of the groove cam 33 and with this, the slide lever 34 is held at this position.

Next, when the movable step 4 comes to a second slide projection position (see FIGS. 35, 40 and 47), the pawl 60b of the vertically moving lever 60 starts pushing the pin 82 in the direction of arrow i. When the movable step 4 is lowered to a position where the movable rails 14 are disconnected (see FIGS. 36, 41 and 48), the operation panel 78 moves in the direction of arrow c, and the lever 73 connected to the operation panel 78 through the pin 79 rotates in the direction of arrow 1. When the one side 73a of the lever 73 pushes the pawl 72c of the hook 72 in the direction of arrow 1, the hook 72 rotates in the direction of arrow 1, the hook 72 is disengaged from the pin 81 provided on the side surface of each movable rail 14, and the operation panel 78 and the movable rail 14 are disconnected from each other.

When the operation panel 78 further moves in the direction of arrow c, the pawl 72b of the hook 72 abuts against the one side 76b of the elongated hole 76, rotation of the hook 72 is stopped, and a force received by the hook 72 is transmitted to the vertically moving panel 71 through the shaft 74. At this time, since the movable rails 14 are held by the slide lever 34, the vertically moving panel 71 moves in the direction of arrow c relative to the movable rails 14. The first end 42a of the first arm 42 of the X arm 41 moves in the elongated hole 14a in the direction of arrow c, and the movable step 4 moves downward in the direction of arrow m (see FIGS. 37, 42 and 49).

On the other hand, when the vertically moving lever 60 rotates in the direction of arrow i from the lowered state of the movable step 4 (see FIGS. 37, 42 and 49), since a force is not applied to the pin 82 at the initial stage, the movable step 4 is not moved. Thereafter, when the pawl 60c of the vertically moving lever 60 starts pushing the pin 82 in the direction of arrow j, the operation panel 78 moves in the direction of arrow d, and the lever 73 connected by the pin 79 rotates in the direction of arrow k. The hook 72 is rotated in the direction of arrow k by the spring 75, and the pawl 72b returns to a position where the pawl 72b abuts against the one side 76a of the elongated hole 76 and stops, i.e., a position where the pin 81 can be fitted into the groove 72d of the hook 72 (see FIG. 43).

Thereafter, a force received by the hook 72 is transmitted to the vertically moving panel 71 through the shaft 74. Since the movable rails 14 are held by the slide lever 34, the vertically moving panel 71 moves in the direction of arrow d relative to the movable rails 14. The first end 42a of the first arm 42 of the X arm 41 moves in the elongated hole 14a in the direction of arrow d, and the movable step 4 moves upward in the direction of arrow n.

When the movable step 4 comes to a position immediately before the upward movement-completed position, the pin 81 abuts against a slanting surface 72e of the hook 72 and rotates the hook 72 in the direction of arrow 1. Since the pin 81 is disengaged from the slanting surface 72e at the position where the upward movement of the movable step 4 is completed, the hook 72 is rotated in the direction of arrow k by the spring 75, and the operation panel 78 and the movable rails 14 are integrally connected to each other (see FIGS. 43 and 44).

Next, when the slide lever 34 further rotates in the direction of arrow h from the upward movement-completed slide connection position (see FIGS. 34, 40 and 46), the movable rails 14 are pushed and slid in the direction of arrow d. At this time, the movable step 4 connected to the movable rails 14 through the X arms 41 also slides in the direction of arrow d. However, since the hook 72 mounted on the vertically moving panel 71 is fitted to the pin 81 provided on the side surface of each movable rail 14, the first end 42a of the first arm 42 of each X arm 41 connected to the vertically moving panel 71 cannot move relative to the movable rail 14. Thus, the movable step 4 does not move downward in the direction of arrow m by its own weight.

As described above in detail, according to the present embodiment, the same advantages as those of the second embodiment can be obtained.

Fourth Embodiment

A fourth embodiment according to the present invention will be described below based on FIGS. 50 to 52. As a lock mechanism that connects and disconnects the movable rails 14 and the vertically moving panel 57 with and from each other, the fourth embodiment employs a structure that is different from that of the second embodiment is employed. Therefore, in the fourth embodiment, detailed explanation of the same portions as those of the second embodiment will be omitted. With the opening/closing operation of the slide door 2, the slide lever 34 rotates, the movable step 4 moves forward or backward (projects or retracts), the vertically moving lever rotates, the vertically moving panel 57 moves and the movable step 4 moves vertically of course.

Figure 50:
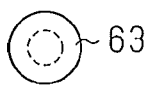
FIG. 50 is a plan view showing cams and levers in a vehicle step device according to a fourth embodiment of the present invention in a state where a movable step is retracted.
Figure 51:
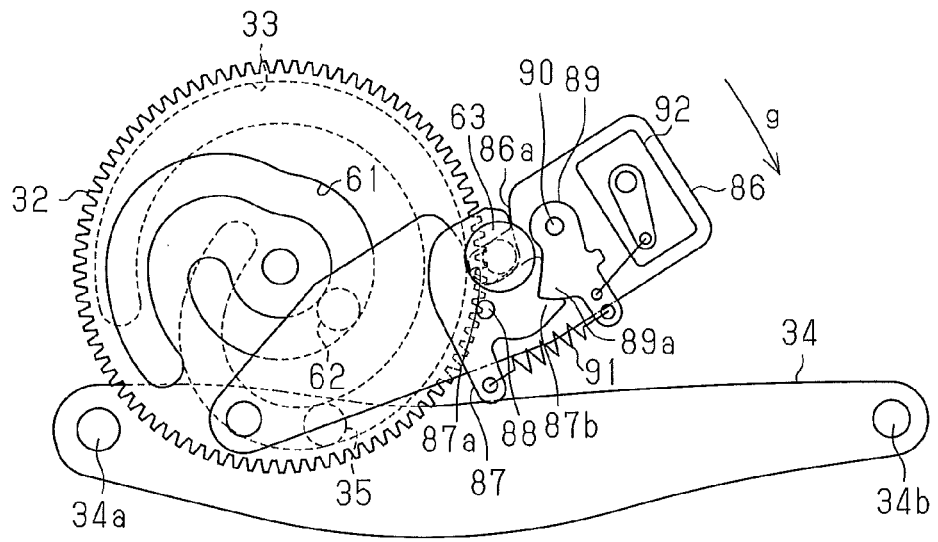
FIG. 51 is a plan view of the cams and the levers shown in FIG. 50 in a state where the movable step is projected.
Figure 52:
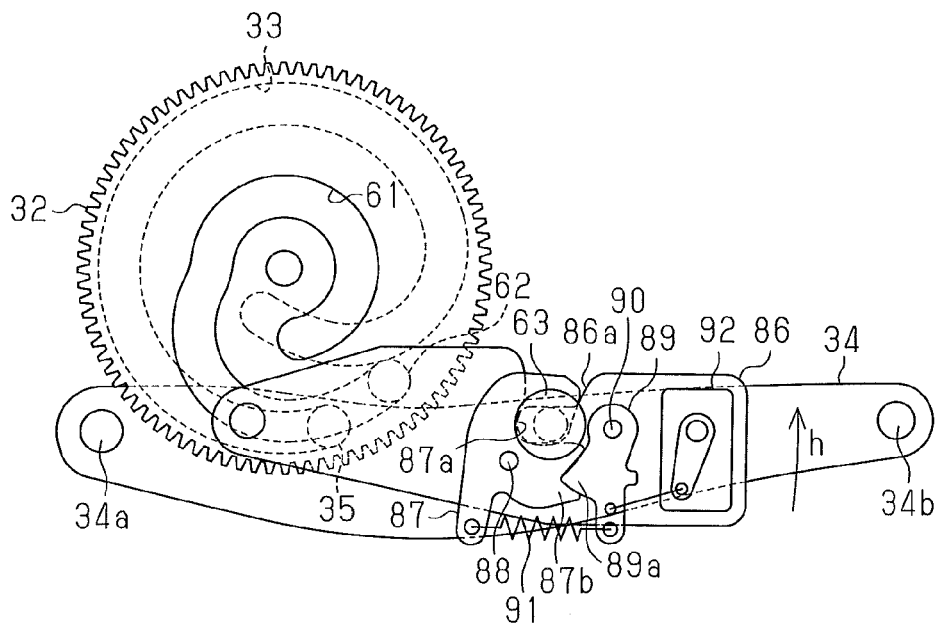
FIG. 52 is a plan view of the cams and the levers shown in FIG. 50 in a state where the movable step is lowered.

As shown in FIGS. 50 to 52, in the present embodiment, a vertically moving lever 86 that is rotatably connected to the plate cam bracket 100 (see FIG. 22) includes a groove 86a in which the pin 63 is received. A hook 87 is rotatably connected to an upper surface of the vertically moving lever 86 through a pin 88. The hook 87 has a groove 87a into which the pin 63 is fitted.

A lock lever 89 that limits rotation of the hook 87 is rotatably connected to an upper surface of the vertically moving lever 86 through a pin 90. A spring 91 is provided between the hook 87 and the lock lever 89. The hook 87 and the lock lever 89 are biased by a spring 91 in rotation directions respectively shown with arrows q and r such that the hook 87 and the lock lever 89 always pull each other.

Further, the hook 87 and the lock lever 89 respectively include pawls 87b and 89a. The pawls 87b and 89a stop the rotation of the hook 87 in the direction of arrow q when the pin 63 enters the groove 87a and rotates the hook 87 in the direction of arrow p and the groove 87a is directed in a direction substantially perpendicular to a rotation direction of the vertically moving lever 86.

A release actuator 92 is provided on an upper surface of the vertically moving lever 86. The release actuator 92 is connected to the lock lever 89 and rotates the lock lever 89 in the direction of arrow s, thereby canceling the meshed state between the pawls 87b and 89a. The release actuator 92 constitutes a lock release mechanism together with the hook 87 and the lock lever 89, and eliminates an operation time lag caused by the groove 86a of the vertically moving lever 86 and an operation timing deviation with respect to the position of the slide door 2 at the time of the downward movement and at the time of the upward movement.

Here, action of the present embodiment will be described.

First, assume that the movable step 4 is in its accommodated state (see FIG. 50). When the pin 63 enters the groove 87a of the hook 87 as the movable step 4 projects from this state, the hook 87 is pushed and rotated in the direction of arrow p. When the movable step 4 comes to a position where the slide projection is completed, the pawls 87b and 89a are meshed with each other by a force of the spring 91. Since the pin 63 cannot rotate the hook 87 in the direction of arrow q, the pin 63 moves integrally with the vertically moving lever 86 (see FIGS. 51 and 52) when the vertically moving lever 86 rotates in the direction of arrow g.

When it is necessary for the pin 63 to separate from the vertically moving lever 86 to accommodate the movable step 4, the release actuator 92 rotates in the direction of arrow t, the lock lever 89 rotates in the direction of arrow s and the meshed state between the pawls 87b and 89a is cancelled. The hook 87 can rotate in the direction of arrow q, the pin 63 pushes the groove 87a and separates from the vertically moving lever 86. Thereafter, when the operation of the release actuator 92 is cut, the hook 87 and the lock lever 89 return to their original states (see FIG. 50) by a force of the spring 91.

As described above in detail, according to the present embodiment, the same advantage as (1) of the second embodiment can be obtained.

Fifth Embodiment

A fifth embodiment according to the present invention will be described below based on FIGS. 53 to 55. The fifth embodiment is different from the first embodiment in that the fifth embodiment has a biasing member that biases the first ends 42a and 43a of both arms 42 and 43 connected to the movable rails 14 in a direction in which the first ends 42a and 43a separate from each other, i.e., in a direction in which the X arms 41 do not open. Detailed explanation of the same portions as those of the first embodiment will be omitted.

Figure 53:
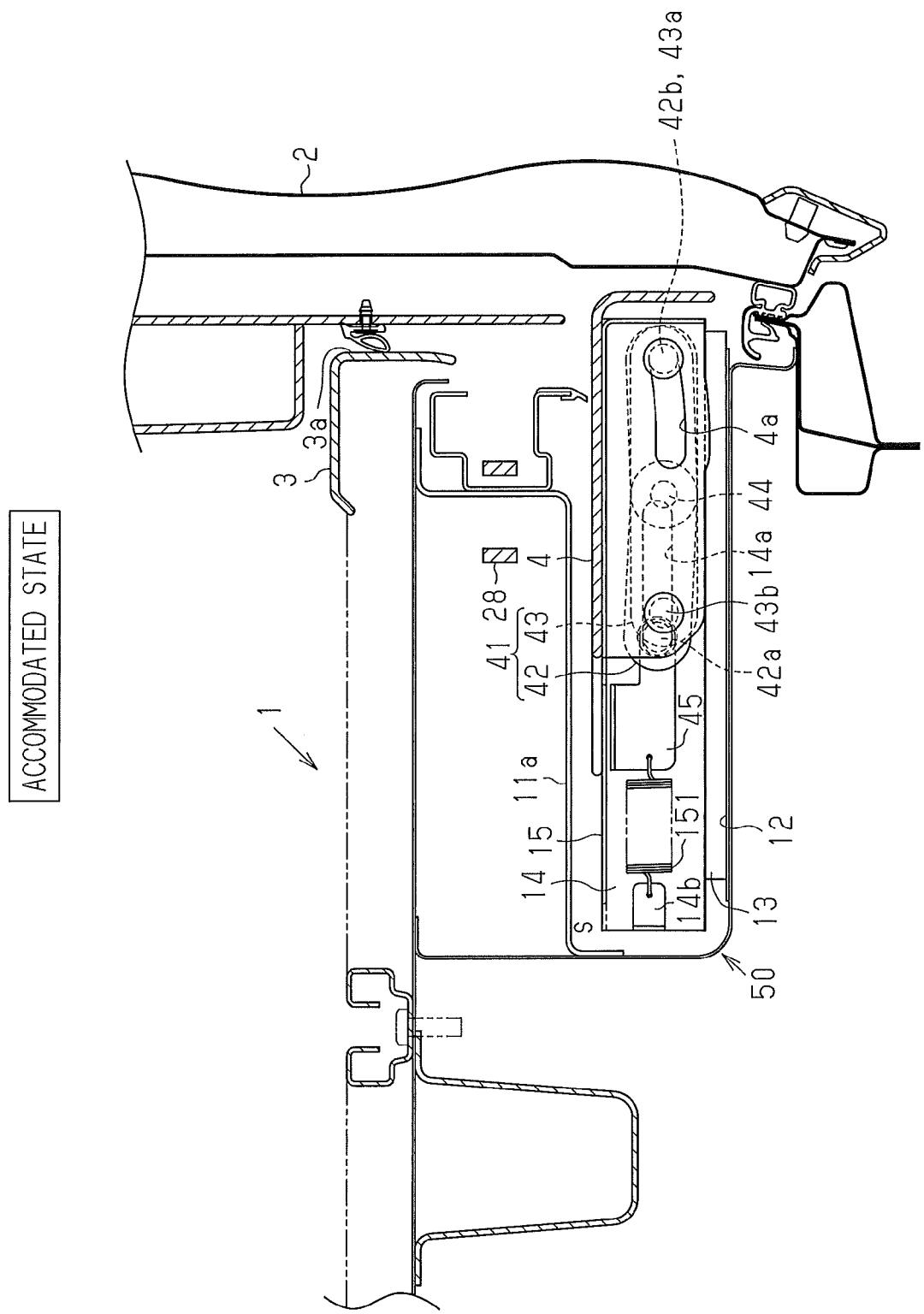
FIG. 53 is a cross-sectional view of a vehicle step device according to a fifth embodiment of the present invention, taken along line 5-5 in FIG. 1.

As shown in FIGS. 53 to 55, a plate-like mounting piece 14b is formed on an end of each movable rail 14 on the inner side of the vehicle (inner side in the widthwise direction of the vehicle). One end of a spring 151 as a biasing member is retained to the mounting piece 14b. The other end of the spring 151 is retained to the vertically moving panel 45. The spring 151 generates a biasing force in directions in which the mounting piece 14b and the vertically moving panel 45 approach each other. That is, the spring 151 biases the first end 42a of the first arm 42 of each X arm 41 connected to the movable rail 14 and the first end 43a of the second arm 43 connected to the movable rail 14 in a direction in which the first ends 42a and 43a separate from each other, i.e., in a direction in which the X arm 41 does not open.

The biasing force of the spring 151 is set greater than a force that pulls the first end 42a (vertically moving panel 45) of the first arm 42 by the weight of the movable step 4. This prevents the height of the movable step 4 from lowering by an amount of backlash existing at various connections due to its own weight. More specifically, the backlashes are caused in gaps that are set in the X arm 41 and the vertically moving panel 45 relating to the operation of the movable step 4, the vertically moving lever 37, the lever 38, the bush 39, the movable rail 14, the slide panel 15, the slide lever 34, the bush 35, the plate cam 32, the gear 30, the opening/closing mechanism 29 (drive belt 28 and the like) and the like, or variations among the products.

Since the reduction in the height of the movable step 4 is suppressed, the movable step 4 can move forward and backward from or into the accommodation space S (entrance 3a) integrally with the movable rails 14 without interfering with the step panel 12.

As described above in detail, according to the embodiment, the following advantages can be obtained in addition to the advantages (1) and (2) of the first embodiment.

(1) In the present embodiment, the first ends 42a and 43a of both arms 42 and 43 connected to the movable rails 14 are biased by the spring 151 in the direction in which the first ends 42a and 43a separate from each other, i.e., in the direction in which the X arm 41 does not open. Therefore, for example, it is possible to prevent the height of the movable step 4 from lowering due to its own weight by an amount of backlash of each movable rail 14 or each X arm 41 that supports the movable step 4 during the forward or backward movement of the movable rail 14. Since the height of the movable rails 14 can be set without taking the backlashes of the X arms 41 and the movable rails 14 into account, the height of the movable rails 14 can be set lower, and the height of the movable step 4 after it is lowered can be set lower.

(2) Since it is possible to prevent the movable step 4 from lowering by its own weight, it is possible to prevent the movable step 4 from interfering with the step panel 12 during forward and backward integral movement with the movable rails 14.

Sixth Embodiment

A sixth embodiment according to the present invention will be described below based on FIG. 56. The sixth embodiment is different from the fifth embodiment in that a biasing member that biases the X arm 41 in a direction in which the X arm 41 does not open is disposed on the movable step 4. Detailed explanation of the same portions as those of the fifth embodiment will be omitted.

FIG. 56 is a plan view of the slide door 2 in its fully closed state (accommodated state of the movable step 4). As shown in FIG. 56, a peripheral edge of the movable step 4 is bent downward and an internal space S1 is formed. A bracket 156 is fixed to the second end 42b of the first arm 42 of each X arm 41 in the internal space S1. Pulleys 157 are disposed at the outer edge of the movable step 4. Specifically, the pulleys 157 are rotatably supported on both ends of the movable step 4 in the front-rear direction of the vehicle in the internal space S1. A cable 159 is round around each pulley 157. One end of each cable 159 is retained to the spring 158 as the biasing member disposed in the internal space S1, and the other end of each cable 159 is retained to the bracket 156.

The spring 158 transmits its biasing force to the second end 42b of the first arm 42 of each X arm 41 through the cable 159, the pulley 157 and the bracket 156. The spring 158 biases the second end 42b of the first arm 42 of the X arm 41 connected to the movable step 4 and the second end 43b of the second arm 43 connected to the movable step 4 in a direction in which the second ends 42b and 43b separate from each other, i.e., in a direction in which the X arm 41 does not open.

The biasing force of the spring 158 is set greater than a force that pulls the second end 42b of the first arm 42 by the weight of the movable step 4. With this, the height of the movable step 4 is prevented from lowering due to its own weight by an amount of backlash existing in various connections.

As described above in detail, according to the present embodiment, the same advantages as those of the fifth embodiment can be obtained.

The above embodiments may be modified as follows.

In the fifth embodiment, as shown in FIG. 57, rollers 161 that project lower than the lowermost end of the movable step 4 and project inward of the vehicle than the end of the movable step 4 on the inner side of the vehicle (deeper side of the accommodation space S) may be disposed on both side surfaces of the movable step 4 in the front-rear direction of the vehicle, and a rolling surface 162 on which the rollers 161 roll as the movable rails 14 move forward and backward may be provided on the step panel 12 disposed on the lower side of each movable rail 14. More specifically, each roller 161 is connected to the movable step 4 such that the roller 161 can rotate around an axis that matches with the rotation axis of the second end 43b of the second arm 43 of the X arm 41, i.e., an axis of the second end 43b extending in a direction perpendicular to the longitudinal direction (forward and backward direction of the movable step 4) of the movable rails 14.

By providing the rollers 161 disposed on the movable step 4 inward of the vehicle, the movable step 4 is supported by the rolling surface 162 through the rollers 161 when the movable step 4 moves forward and backward integrally with the movable rails 14. That is, a gap between the lowermost end of the movable step 4 and the rolling surface 162 is determined in accordance with a projecting length of the roller 161 to the lower side of the movable step 4 irrespective of backlashes of the X arms 41 and the movable rails 14.

According to the above structure, the same advantages as those of the fifth embodiment can be obtained.

Especially, even if a passenger treads on the movable step 4 during the forward/backward movement of the movable step 4 that is integral with the movable rails 14, since the rollers 161 abut against the rolling surface 162 and receive the force, a sliding noise or an operation load caused by contact (e.g., metal contact) between the movable step 4 and the step panel 12 (rolling surface 162) is prevented from increasing.

Further, since the rollers 161 first abut against the end of the rolling surface 162 on the outer side of the vehicle, the movable step 4 can smoothly be guided into the accommodation space S even if the height of the movable step 4 is lowered due its own weight when the movable step 4 that is lifted by closing the X arms 41 is accommodated in the accommodation space S together with the movable rails 14.

The same roller and rolling surface (roller 161 and rolling surface 162) as those of the above modification (see FIG. 57) may be provided in the sixth embodiment. With this modified structure also, the same advantages as those of the modification can be obtained.

In each of the embodiments, an electric drive source (the slide door drive unit 21) for opening and closing the slide door 2 may be omitted. In this case also, it is possible to move the movable step 4 in synchronization with the manual opening and closing operations of the slide door 2.

In each of the embodiments, the movement of the movable step 4 from its accommodated position to the projecting and descent position may be completed when the movement of the slide door 2 from its fully closed position to its fully opened position is completed.

The invention claimed is:

1. A step device for a vehicle, comprising:
   a step provided on a vehicle entrance that is opened and closed by a vehicle door;
   a first transmitting mechanism that is operated in synchronization with opening and closing operations of the vehicle door; and
   a second transmitting mechanism that transmits, to the step, power of the opening and closing operations of the vehicle door transmitted through the first transmitting mechanism, thereby moving the step,
   wherein the second transmitting mechanism includes:
   a movable member that can move forward and backward with respect to a vehicle body;
   a slide lever for moving the movable member forward and backward;
   an arm mechanism having first and second arms that are provided between the movable member and the step and turnably connected to each other at their central portions in their longitudinal directions, the first and second arms each including a first end connected to the movable member and a second end connected to the step;
   a vertical movement lever that moves the first end of the first arm with respect to the movable member, thereby vertically moving the step;
   a plate cam that is rotated by the first transmitting mechanism;
   a follower member that is engaged with the plate cam and linked with the vertical movement lever;
   wherein the step is capable of being projected and retracted with respect to the vehicle body as the movable member moves forward and backward; and
   wherein, when the step is in its projecting state, the plate cam presses the follower member to operate the vertical movement lever as the plate cam rotates, thereby moving the step vertically.

2. The step device for a vehicle according to claim 1, comprising an electric drive source, wherein the first transmitting mechanism transmits power of the electric drive source to the vehicle door to open and close the vehicle door.

3. The step device for a vehicle according to claim, wherein the second transmitting mechanism further includes a lever that is rotatably connected to the vertical movement lever, and wherein the follower member is fixed to the lever.

4. The step device for a vehicle according to claim 1, wherein the follower member is a first follower member,
   wherein a second follower member that is engaged with the plate cam is fixed to the slide lever, and
   wherein the plate cam presses the second follower member as the plate cam rotates, thereby operating the slide lever and moving the movable member forward and backward.

5. The step device for a vehicle according to claim 1, comprising a biasing member that biases either the first ends of the first and second arms connected to the movable member or the second ends of the first and second arms connected to the step, in directions in which the first ends and the second ends separate from each other.

6. The step device for a vehicle according to claim 1, comprising:
   a roller provided on the step and projecting lower than the step; and
   a rolling surface that is provided below the step, wherein the roller rolls on the rolling surface as the movable member moves forward and backward.

7. The step device for a vehicle according to claim 1, comprising a lock mechanism that connects and disconnects the movable member and the first end of the first arm to and from each other.

* * * * *